United States Patent
Birn et al.

(10) Patent No.: US 10,740,315 B2
(45) Date of Patent: **\*Aug. 11, 2020**

(54) TRANSITIONING BETWEEN SYSTEM SHARING TYPES IN MULTI-TENANCY DATABASE SYSTEMS

(71) Applicant: SAP SE, Walldorf (DE)

(72) Inventors: Immo-Gert Birn, Philippsburg (DE); Kerstin Hoeft, Wiesloch (DE); Andrea Neufeld, Limburgerhof (DE); Uwe Schlarb, Oestringen (DE); Christian Stork, Bönen (DE); Welf Walter, Bad Schönborn (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 249 days.

This patent is subject to a terminal disclaimer.

(21) Appl. No.: 15/794,501

(22) Filed: Oct. 26, 2017

(65) Prior Publication Data

US 2019/0129986 A1     May 2, 2019

(51) Int. Cl.
    *G06F 16/00*     (2019.01)
    *G06F 16/22*     (2019.01)
    (Continued)

(52) U.S. Cl.
    CPC ........ *G06F 16/2282* (2019.01); *G06F 16/213* (2019.01); *G06F 16/217* (2019.01);
    (Continued)

(58) Field of Classification Search
    CPC .... G06F 16/2282; G06F 16/22; G06F 16/217; G06F 16/213; G06F 16/28; G06F 16/2343; H04L 9/0816; H04L 9/085
    See application file for complete search history.

(56) References Cited

U.S. PATENT DOCUMENTS 7,191,160 B2    3/2007   Hoeft et al.
7,302,678 B2    11/2007   Bohlmann et al.
(Continued)

FOREIGN PATENT DOCUMENTS

WO    WO 2013/132377 A1    9/2013
WO    WO 2016/049576 A1    3/2016

OTHER PUBLICATIONS

Non-Final Office Action issued in U.S. Appl. No. 15/794,335 dated May 24, 2019, 33 pages.
(Continued)

*Primary Examiner* — Tarek Chbouki
(74) *Attorney, Agent, or Firm* — Fish & Richardson P.C.

(57) ABSTRACT

The present disclosure teaches solutions for transitioning between database system sharing types. In one example, a tenant container includes a read-only table, a first writable table, and a mixed table for storing read-only and writable data. When transitioning to a sharing setup, a shared container is created and a shared table is created in the shared container. Data is copied from the read-only table to the shared table and the read-only table is dropped. A read-only view is created in the tenant container and a second shared table is created in the shared container. Read-only mixed data is copied from the mixed table to the second shared table and deleted from the mixed table, and after the deletion, the mixed table is renamed as the second writable table. A union view is created that provides unified access to the second shared table and the second writable table.

20 Claims, 65 Drawing Sheets

(51) Int. Cl.
*G06F 16/21* (2019.01)
*G06F 16/28* (2019.01)
*G06F 16/23* (2019.01)
*H04L 9/08* (2006.01)

(52) U.S. Cl.
CPC .......... *G06F 16/22* (2019.01); *G06F 16/2343* (2019.01); *G06F 16/28* (2019.01); *H04L 9/085* (2013.01); *H04L 9/0816* (2013.01)

(56) References Cited

U.S. PATENT DOCUMENTS

| | | |
|---|---|---|
| 7,325,233 B2 | 1/2008 | Kuck et al. |
| 7,392,236 B2 | 6/2008 | Rusch et al. |
| 7,421,437 B2 | 9/2008 | Hoeft et al. |
| 7,457,828 B2 | 11/2008 | Wenner et al. |
| 7,461,097 B2 | 12/2008 | Stahl et al. |
| 7,480,681 B2 | 1/2009 | Fecht et al. |
| 7,490,102 B2 | 2/2009 | Ivanova et al. |
| 7,519,614 B2 | 4/2009 | Glania et al. |
| 7,523,142 B2 | 4/2009 | Driesen et al. |
| 7,565,443 B2 | 7/2009 | Rossmanith et al. |
| 7,571,164 B2 | 8/2009 | Kuersch et al. |
| 7,587,705 B2 | 9/2009 | Benjes et al. |
| 7,631,303 B2 | 12/2009 | Debertin et al. |
| 7,634,771 B2 | 12/2009 | Benjes et al. |
| 7,647,251 B2 | 1/2010 | Baeuerle et al. |
| 7,650,597 B2 | 1/2010 | Bohlmann et al. |
| 7,657,575 B2 | 2/2010 | Eberlein et al. |
| 7,669,181 B2 | 2/2010 | Benjes et al. |
| 7,693,851 B2 | 4/2010 | Becker |
| 7,702,696 B2 | 4/2010 | Ziegler et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,774,319 B2 | 8/2010 | Schweigkoffer et al. |
| 7,788,319 B2 | 8/2010 | Schmidt et al. |
| 7,797,708 B2 | 9/2010 | Weber et al. |
| 7,844,659 B2 | 11/2010 | Baeuerle et al. |
| 7,894,602 B2 | 2/2011 | Mueller et al. |
| 7,934,219 B2 | 4/2011 | Baeuerle et al. |
| 7,962,920 B2 | 6/2011 | Gabriel et al. |
| 7,971,209 B2 | 6/2011 | Eberlein et al. |
| 8,005,779 B2 | 8/2011 | Baeuerle et al. |
| 8,069,184 B2 | 11/2011 | Becker et al. |
| 8,108,433 B2 | 1/2012 | Baeuerle et al. |
| 8,108,434 B2 | 1/2012 | Schlarb et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,315,988 B2 | 11/2012 | Glania et al. |
| 8,356,010 B2 | 1/2013 | Driesen |
| 8,356,056 B2 | 1/2013 | Schlarb et al. |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,413,150 B2 | 4/2013 | Lu et al. |
| 8,429,668 B2 | 4/2013 | Kowalkiewicz et al. |
| 8,434,060 B2 | 4/2013 | Driesen et al. |
| 8,467,817 B2 | 6/2013 | Said et al. |
| 8,473,515 B2 | 6/2013 | Cotner et al. |
| 8,473,942 B2 | 6/2013 | Heidel et al. |
| 8,479,187 B2 | 7/2013 | Driesen et al. |
| 8,484,167 B2 | 7/2013 | Glania et al. |
| 8,489,640 B2 | 7/2013 | Schlarb et al. |
| 8,504,980 B1 | 8/2013 | Kraft et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,612,927 B2 | 12/2013 | Brunswig et al. |
| 8,645,483 B2 | 2/2014 | Odenheimer et al. |
| 8,683,436 B2 | 3/2014 | Baeuerle et al. |
| 8,694,557 B2 | 4/2014 | Thimmel et al. |
| 8,706,772 B2 | 4/2014 | Hartig et al. |
| 8,719,826 B2 | 5/2014 | Baeuerle et al. |
| 8,751,437 B2 | 6/2014 | Teichmann et al. |
| 8,751,573 B2 | 6/2014 | Said et al. |
| 8,762,408 B2 | 6/2014 | Brand et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 | 8/2014 | Boulanov |
| 8,819,075 B2 | 8/2014 | Schlarb et al. |
| 8,850,432 B2 | 9/2014 | McGrath et al. |
| 8,856,727 B2 | 10/2014 | Schlarb et al. |
| 8,863,005 B2 | 10/2014 | Lehr et al. |
| 8,863,097 B2 | 10/2014 | Thimmel et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,886,596 B2 | 11/2014 | Effern et al. |
| 8,892,667 B2 | 11/2014 | Brunswig et al. |
| 8,904,402 B2 | 12/2014 | McGrath et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,938,645 B2 | 1/2015 | Schlarb et al. |
| 8,949,789 B2 | 2/2015 | Schlarb et al. |
| 8,972,934 B2 | 3/2015 | Driesen et al. |
| 8,978,035 B2 | 3/2015 | McGrath et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,009,708 B2 | 4/2015 | Lu et al. |
| 9,015,212 B2 | 4/2015 | David et al. |
| 9,020,881 B2 | 4/2015 | Ritter et al. |
| 9,021,392 B2 | 4/2015 | Baeuerle et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,038,021 B2 | 5/2015 | Schlarb et al. |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,176,801 B2 | 11/2015 | Baeuerle et al. |
| 9,182,979 B2 | 11/2015 | Odenheimer et al. |
| 9,182,994 B2 | 11/2015 | Schlarb et al. |
| 9,183,540 B2 | 11/2015 | Eberlein et al. |
| 9,189,226 B2 | 11/2015 | Driesen et al. |
| 9,189,520 B2 | 11/2015 | May et al. |
| 9,223,985 B2 | 12/2015 | Eberlein et al. |
| 9,229,707 B2 | 1/2016 | Borissov et al. |
| 9,244,697 B2 | 1/2016 | Schlarb et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,354,948 B2 | 5/2016 | Baeuerle et al. |
| 9,275,120 B2 | 6/2016 | Mayer et al. |
| 9,361,407 B2 | 6/2016 | Hutzel et al. |
| 9,378,233 B2 | 6/2016 | Lee et al. |
| 9,417,917 B1 | 8/2016 | Barber et al. |
| 9,430,523 B2 | 8/2016 | Falter et al. |
| 9,436,515 B2 | 9/2016 | Pohlmann |
| 9,442,977 B2 | 9/2016 | Falter et al. |
| 9,471,353 B1 | 10/2016 | Christopher et al. |
| 9,507,810 B2 | 11/2016 | Baeuerle et al. |
| 9,513,811 B2 | 12/2016 | Wein et al. |
| 9,575,819 B2 | 2/2017 | Baeuerle et al. |
| 9,590,872 B1 | 3/2017 | Jagtap et al. |
| 9,619,261 B2 | 4/2017 | Gaurav et al. |

(56) References Cited

U.S. PATENT DOCUMENTS

| | | | |
|---|---|---|---|
| 9,619,552 B2 | 4/2017 | Falter et al. |
| 9,639,567 B2 | 5/2017 | Lee et al. |
| 9,639,572 B2 | 5/2017 | Hutzel et al. |
| 9,641,529 B2 | 5/2017 | Kovacs et al. |
| 9,724,757 B2 | 8/2017 | Barrett |
| 9,734,230 B2 | 8/2017 | Sarferaz |
| 10,248,336 B1 | 4/2019 | Koujalagi et al. |
| 10,346,434 B1 | 7/2019 | Morkel et al. |
| 10,482,080 B2 | 11/2019 | Auer et al. |
| 2005/0052150 A1 | 3/2005 | Bender |
| 2006/0248507 A1 | 11/2006 | Benjes et al. |
| 2006/0248545 A1 | 11/2006 | Benjes et al. |
| 2007/0060609 A1 | 3/2007 | Anderson et al. |
| 2007/0156650 A1* | 7/2007 | Becker ................. G06F 16/958 |
| 2007/0156849 A1 | 7/2007 | Becker |
| 2007/0162512 A1* | 7/2007 | Kollar ................. G06F 16/27 |
| 2008/0059489 A1* | 3/2008 | Han ................. G06F 9/5066 |
| 2008/0120129 A1 | 5/2008 | Seubert et al. |
| 2008/0162509 A1* | 7/2008 | Becker ................. G06F 16/2379 |
| 2008/0162536 A1 | 7/2008 | Becker et al. |
| 2008/0162660 A1* | 7/2008 | Becker ................. G06F 16/958 709/213 |
| 2010/0030995 A1 | 2/2010 | Wang et al. |
| 2010/0070336 A1 | 3/2010 | Koegler et al. |
| 2010/0153341 A1 | 6/2010 | Driesen et al. |
| 2010/0161648 A1 | 6/2010 | Eberlein et al. |
| 2010/0299664 A1 | 11/2010 | Taylor et al. |
| 2011/0295839 A1 | 12/2011 | Collins et al. |
| 2012/0036136 A1 | 2/2012 | Srivastava et al. |
| 2012/0041988 A1 | 2/2012 | Driesen |
| 2012/0166620 A1 | 6/2012 | Said et al. |
| 2012/0173488 A1 | 7/2012 | Spielberg et al. |
| 2012/0173581 A1 | 7/2012 | Hartig et al. |
| 2012/0174085 A1 | 7/2012 | Driesen et al. |
| 2012/0254221 A1 | 10/2012 | Lai et al. |
| 2012/0330954 A1 | 12/2012 | Sivasubramanian et al. |
| 2012/0331016 A1 | 12/2012 | Janson et al. |
| 2013/0086322 A1 | 4/2013 | Pelletier et al. |
| 2013/0132349 A1 | 5/2013 | Hahn et al. |
| 2013/0275509 A1 | 10/2013 | Micucci et al. |
| 2013/0282761 A1 | 10/2013 | Tamm et al. |
| 2013/0290249 A1 | 10/2013 | Merriman et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0324917 A1 | 10/2014 | Haas et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0026131 A1* | 1/2015 | Schreter ................. G06F 16/221 707/638 |
| 2015/0046413 A1 | 2/2015 | Mihnea et al. |
| 2015/0095283 A1 | 4/2015 | Kristoffersen et al. |
| 2015/0100546 A1 | 4/2015 | Eberlein et al. |
| 2015/0121545 A1 | 4/2015 | Chandrasekaran |
| 2015/0142730 A1 | 5/2015 | Dakshanamurthy et al. |
| 2015/0178332 A1 | 6/2015 | Said et al. |
| 2015/0242520 A1 | 8/2015 | Li et al. |
| 2015/0347410 A1 | 12/2015 | Kim et al. |
| 2015/0363167 A1 | 12/2015 | Kaushik |
| 2016/0147529 A1 | 5/2016 | Coleman et al. |
| 2016/0224594 A1 | 8/2016 | Chow et al. |
| 2016/0246864 A1 | 8/2016 | Boldt et al. |
| 2016/0358109 A1 | 12/2016 | Kruempelmann |
| 2016/0371315 A1 | 12/2016 | Kwon et al. |
| 2017/0025441 A1 | 1/2017 | Mori |
| 2017/0262638 A1 | 9/2017 | Horowitz et al. |
| 2018/0096165 A1 | 4/2018 | Warshavsky et al. |
| 2018/0150541 A1 | 5/2018 | Tyercha et al. |
| 2018/0189370 A1 | 7/2018 | Bendel et al. |
| 2019/0042660 A1 | 2/2019 | Brown et al. |
| 2019/0129985 A1 | 5/2019 | Schlarb |
| 2019/0129988 A1 | 5/2019 | Auer |
| 2019/0129990 A1 | 5/2019 | Schlarb |
| 2019/0129991 A1 | 5/2019 | Auer et al. |
| 2019/0129997 A1 | 5/2019 | Auer |
| 2019/0130010 A1 | 5/2019 | Auer |
| 2019/0130121 A1 | 5/2019 | Birn |
| 2019/0370377 A1 | 12/2019 | Hauck et al. |

OTHER PUBLICATIONS

Non-Final Office Action issued in U.S. Appl. No. 15/794,362 dated May 24, 2019, 33 pages.
Communication and extended European Search Report in re to EPO application No. 17001917.8-1217, dated Mar. 15, 2018, 9 pages.
U.S. Appl. No. 14/960,983, filed Dec. 7, 2015, Eberlein et al.
U.S. Appl. No. 15/083,918, filed Mar. 29, 2016, Eberlein et al.
U.S. Appl. No. 15/087,677, filed Mar. 31, 2016, Eberlein et al.
U.S. Appl. No. 15/593,830, filed May 12, 2017, Eberlein et al.
U.S. Appl. No. 15/285,715, filed Oct. 5, 2016, Specht et al.
Non-final office action issued in U.S. Appl. No. 15/794,261 dated Nov. 14, 2019, 48 pages.
Communication and extended European Search Report in re to EPO application No. 17001948.3-1222, dated Feb. 9, 2018, 8 pages.
Communication and extended European Search Report in re to EPO application No. 17001969.9-1217, dated Mar. 1, 2018, 11 pages.
Communication and European Search Report received in re to EPO application No. 17001902.0-1222 dated Jan. 8, 2018, 15 pages.
Stefan Aulbach: "*Schema Flexibility and Data Sharing in Multi-Tenant Databases*", dated Dec. 5, 2011; 146 pages; retrieved from the Internet: URL: https://mediatum.ub.tum.de/doc/1075044/document.pdf [retrieved on Dec. 21, 2017].
EP Extended European Search Report in European Appln No. 17001049.0-1221, dated Jan. 11, 2018, 16 pages.
EP Extended European Search Report in European Appln. No. 18184931, dated Feb. 14, 2019, 13 pages.
Communication and European Search Report received in re to EPO application No. 17001872.5-1222, dated Jan. 8, 2018, 16 pages.
Non-final office action issued in U.S. Appl. No. 15/794,381 dated Nov. 6, 2019, 46 pages.
Non-final office action issued in U.S. Appl. No. 15/794,368 dated Nov. 8, 2019, 14 pages
Communication and extended European Search Report in re to EPO application No. 17001922.8-1217, dated Mar. 6, 2018, 12 pages.
Communication and extended European Search Report in re to EPO application No. 17001916.0-1217, dated Mar. 22, 2018, 10 pages.
Zhi Hu Wang et al. "*A Study and Performance Evaluation of the Multi-Tenant Data Tier Design Patterns for Service Oriented Computing*", E-Business Engineering, 2008, ICEBE '08, IEEE International Conference on, Oct. 22, 2008, pp. 94-101, XP055453782.
Adaptive Server Et al. "*Reference Manual: Commands*", Jul. 31, 2012, XP055456066, Retrieved from the Internet: URL: http://infocenter.sybase.com/help/topic/com.sybase.infocenter.dc36272.1572/pdf/commands.pdf [retrieved on Mar. 2, 2018] 864 pages.
Non-Final office Action issued in U.S. Appl. No. 15/996,804 dated Mar. 6, 2020, 40 pages.
Non-Final office action issued in U.S. Appl. No. 15/794,424 dated Dec. 17, 2019, 52 pages.

\* cited by examiner

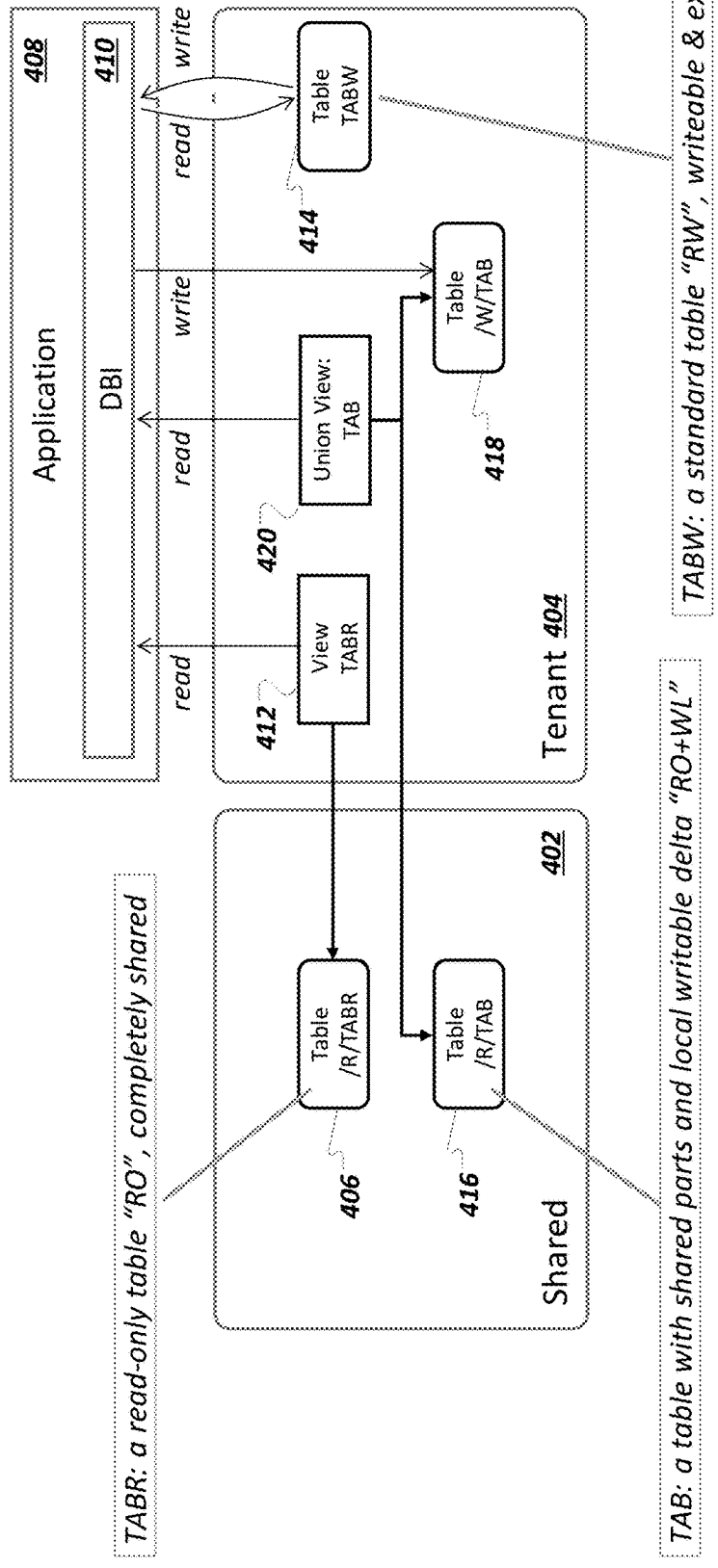

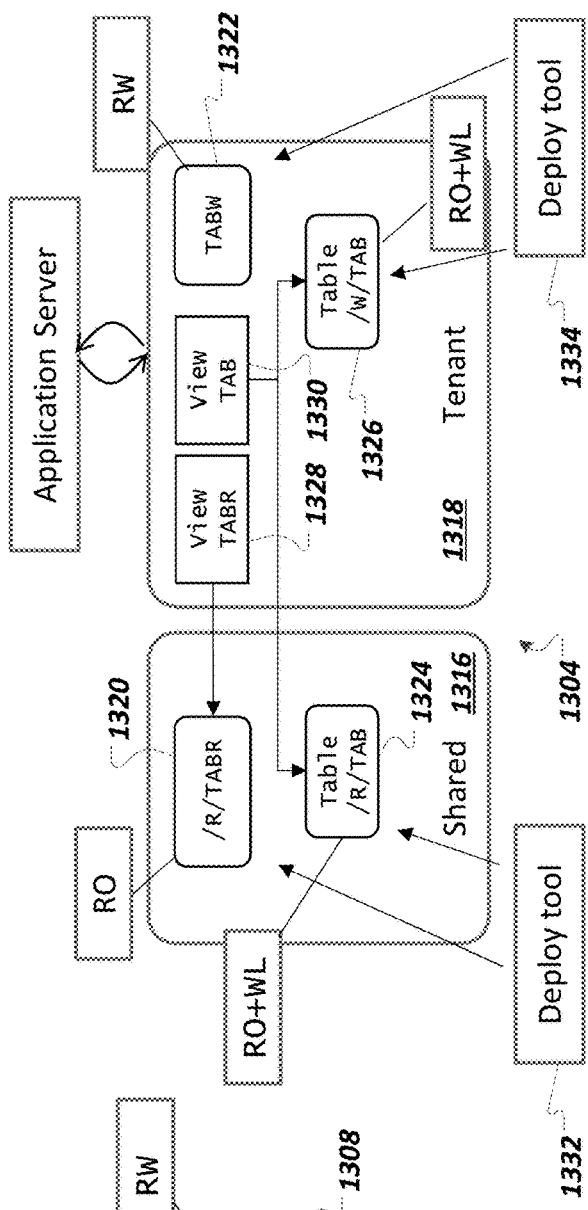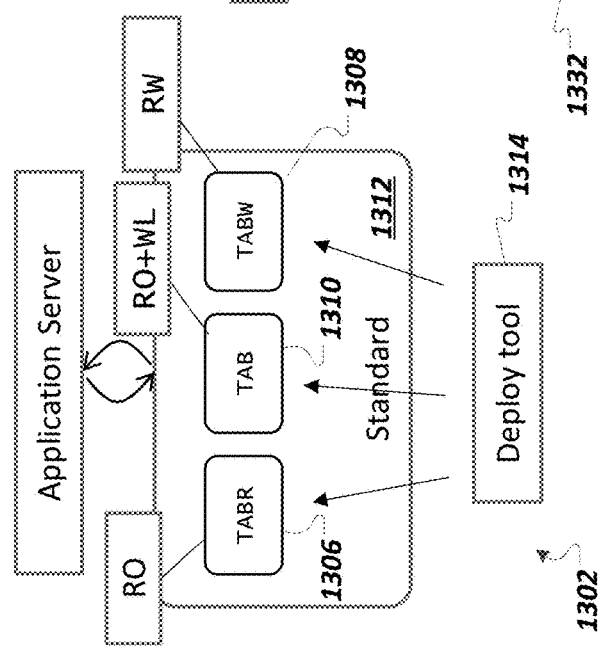
FIG. 13A 1300

| Processing | Standard 1352 | Shared 1354 | Tenant 1356 |
|---|---|---|---|
| DB Object Creation 1358 | All objects: RO, RW, RO+WL 1364 | Shareable objects only: RO, RO+WL 1366 | Local tables: RW: a table RO+WL: table /W/TAB View to RO table in shared Union view on table in shared and local for RO+WL 1368 |
| DB Content Deployment 1360 | To all tables 1370 | To shared tables only: RO and RO+WL 1372 | To local tables only: RO+WL (redirecting deployment to /W/TAB) and RW. 1374 |
| Write operations by application 1362 | To all objects 1376 | No write operation by application allowed 1378 | To local tables only: RO: no RO+WL: re-directed to /W/TAB RW: yes 1380 |

FIG. 13B 1350

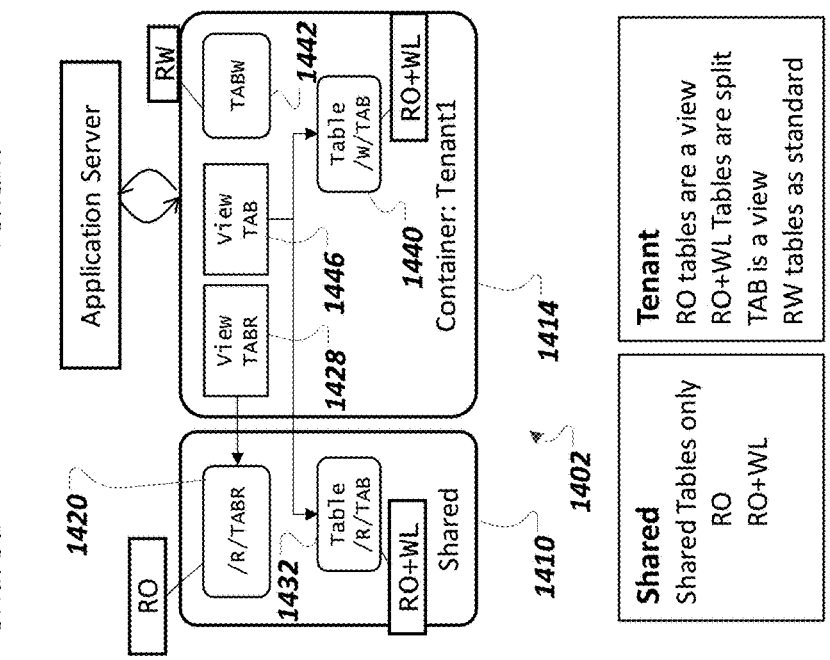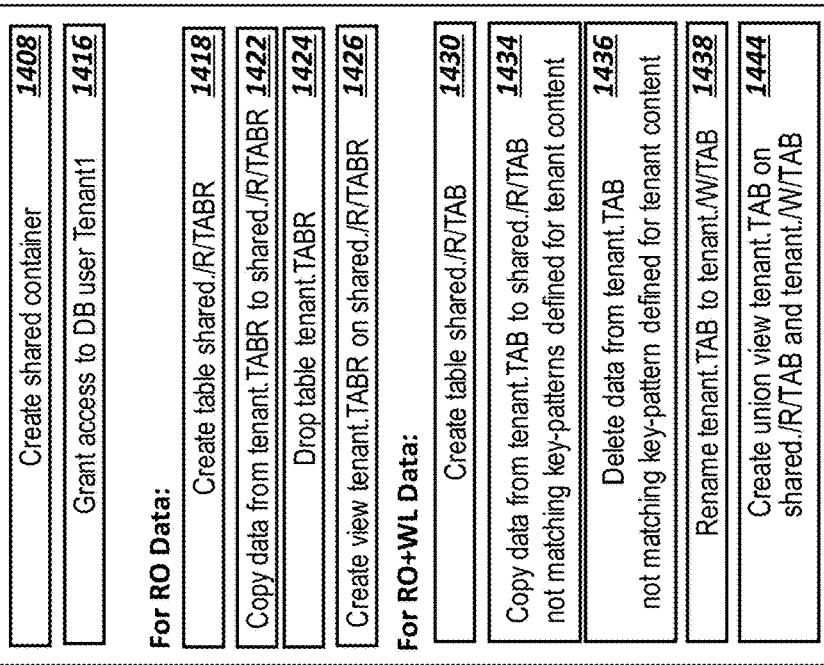
FIG. 14 1400

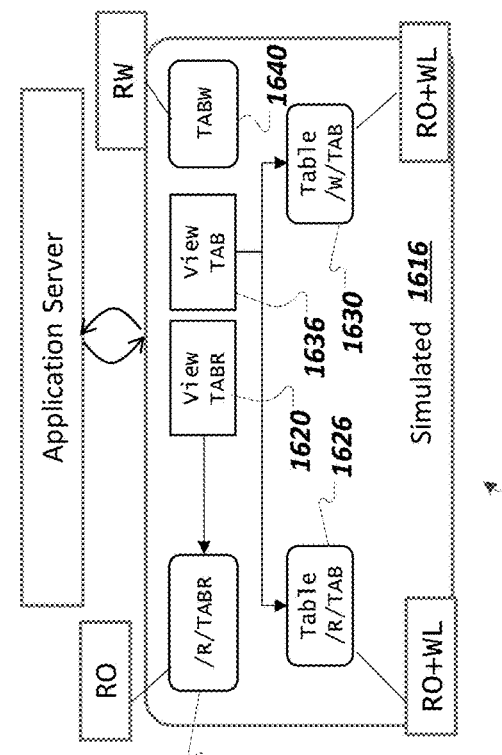
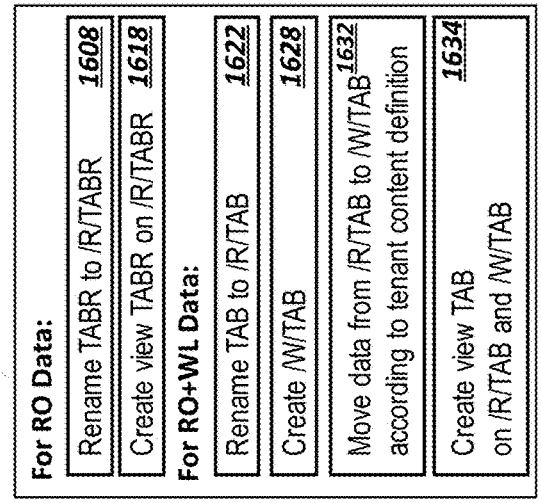
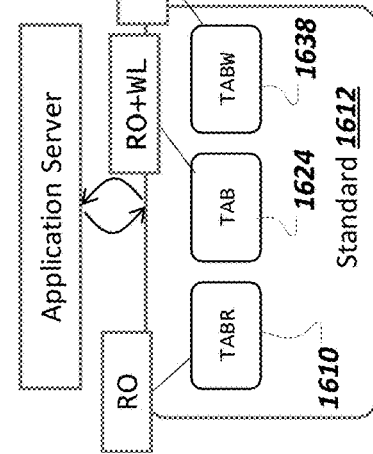
FIG. 16

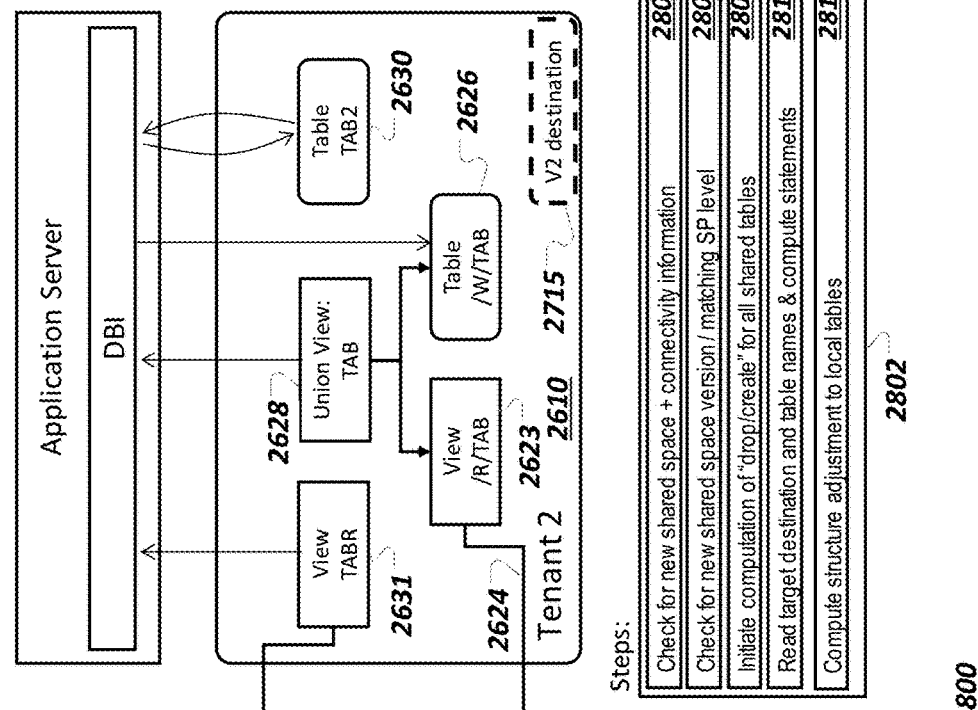
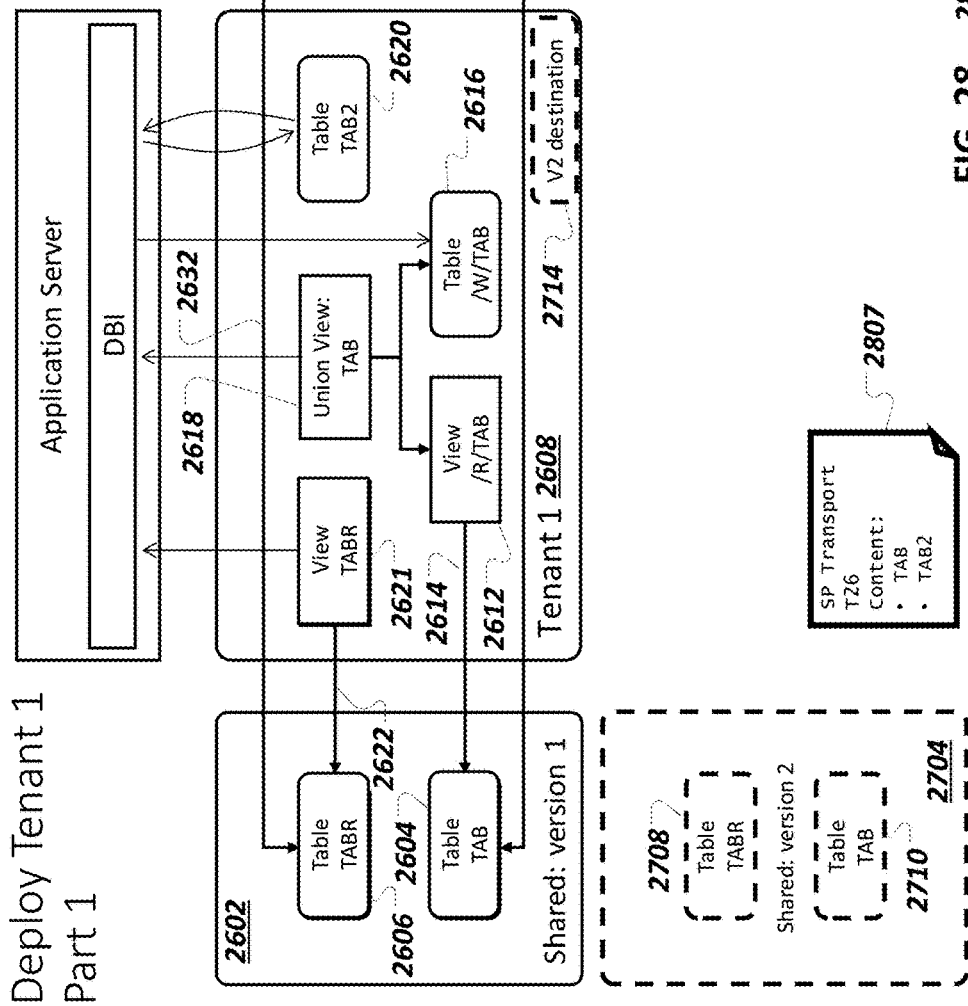
FIG. 28  2800

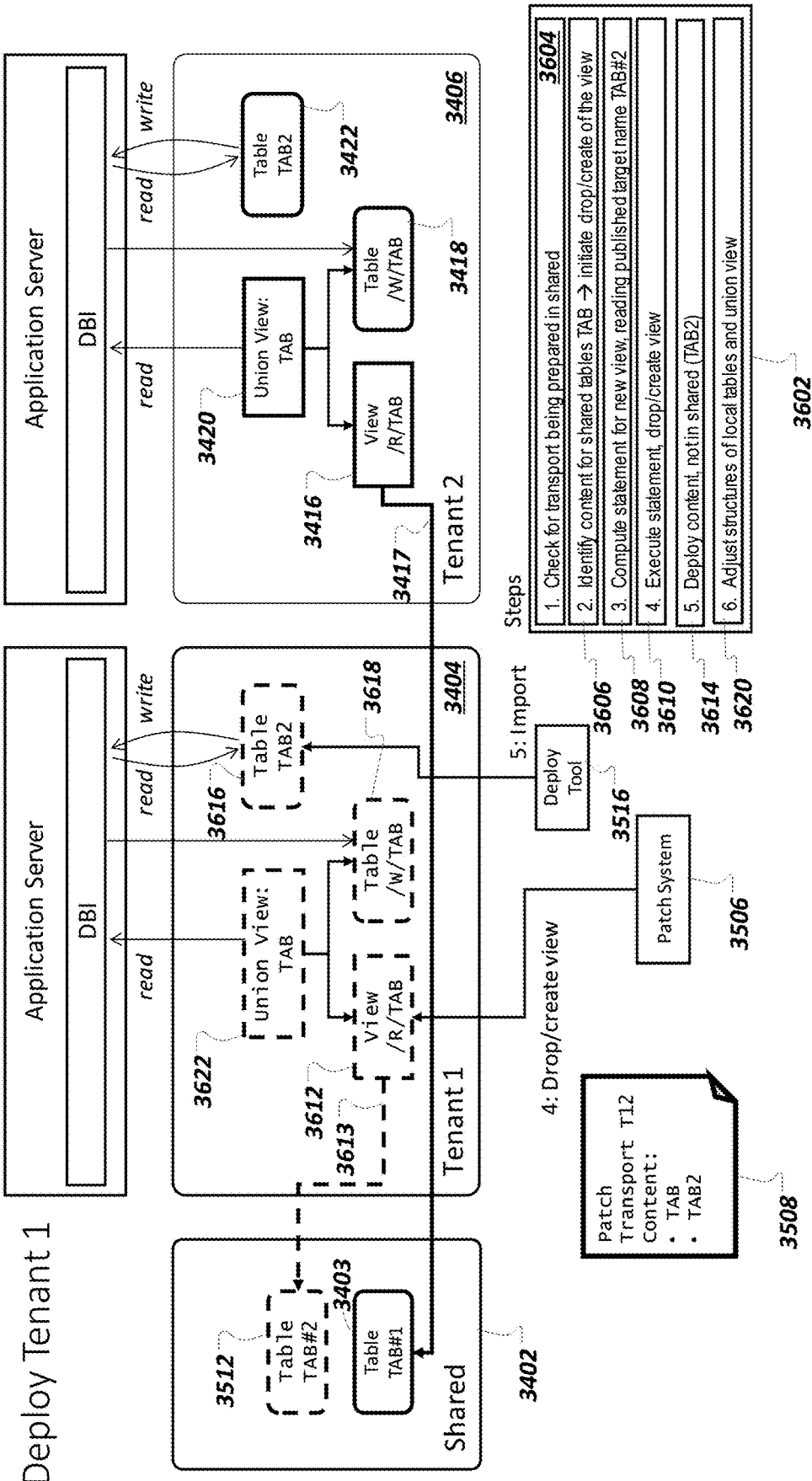

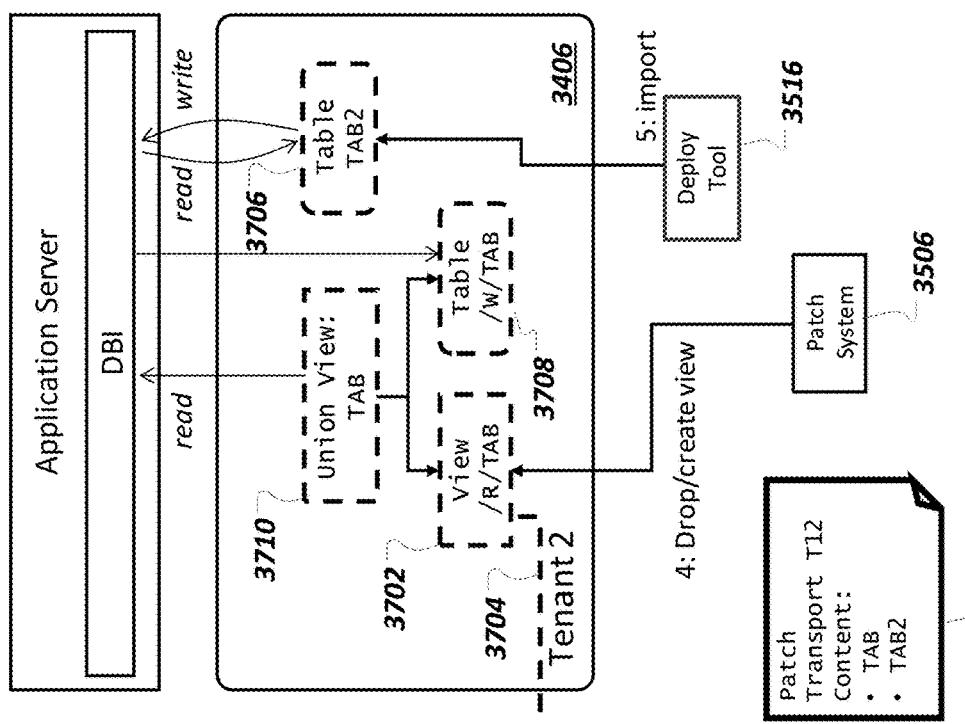
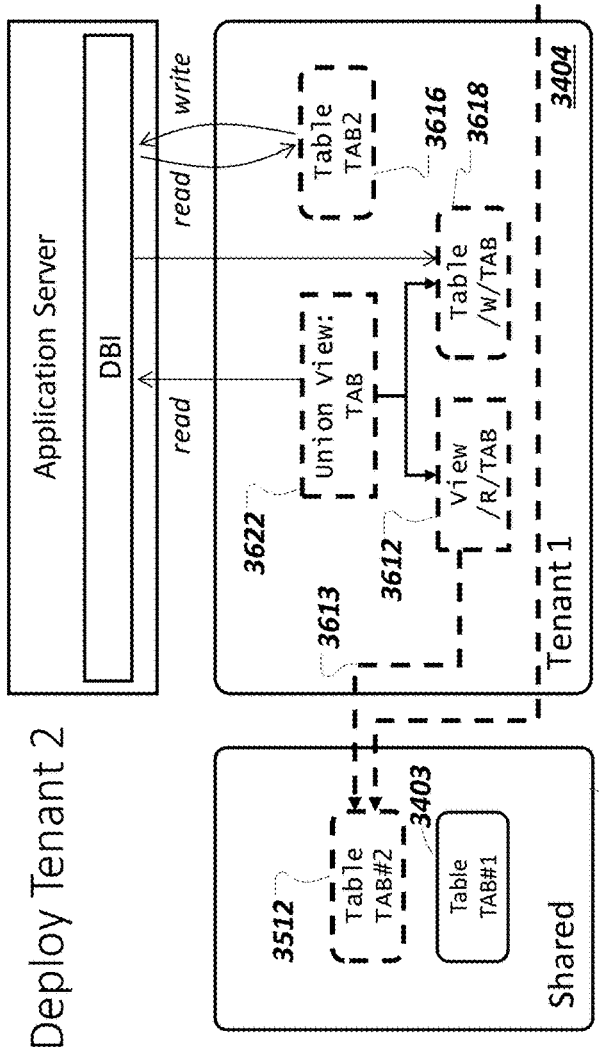
FIG. 37 *3700*

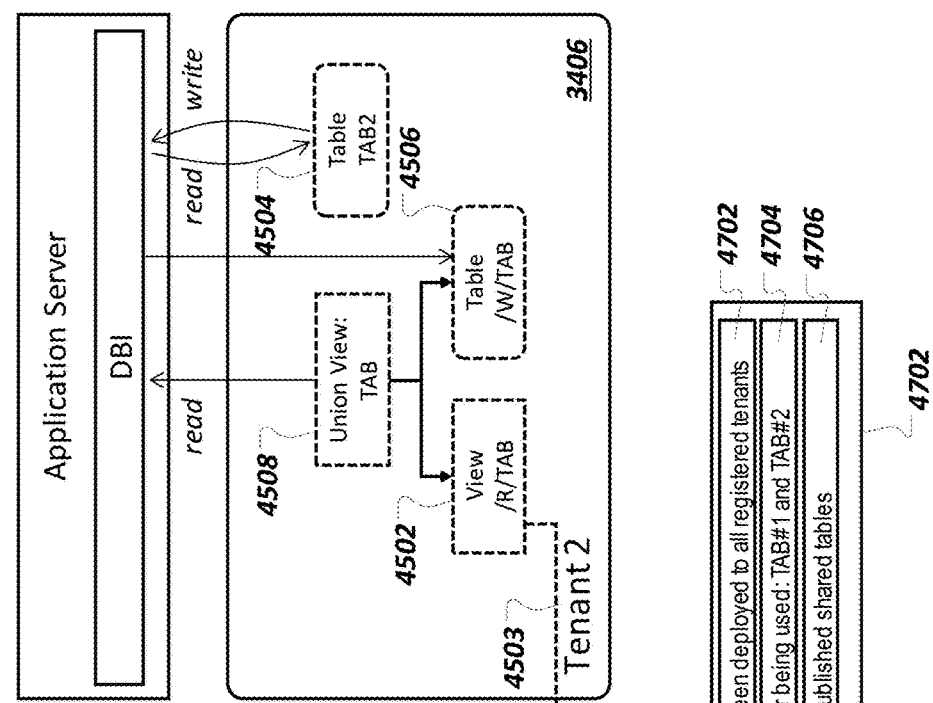
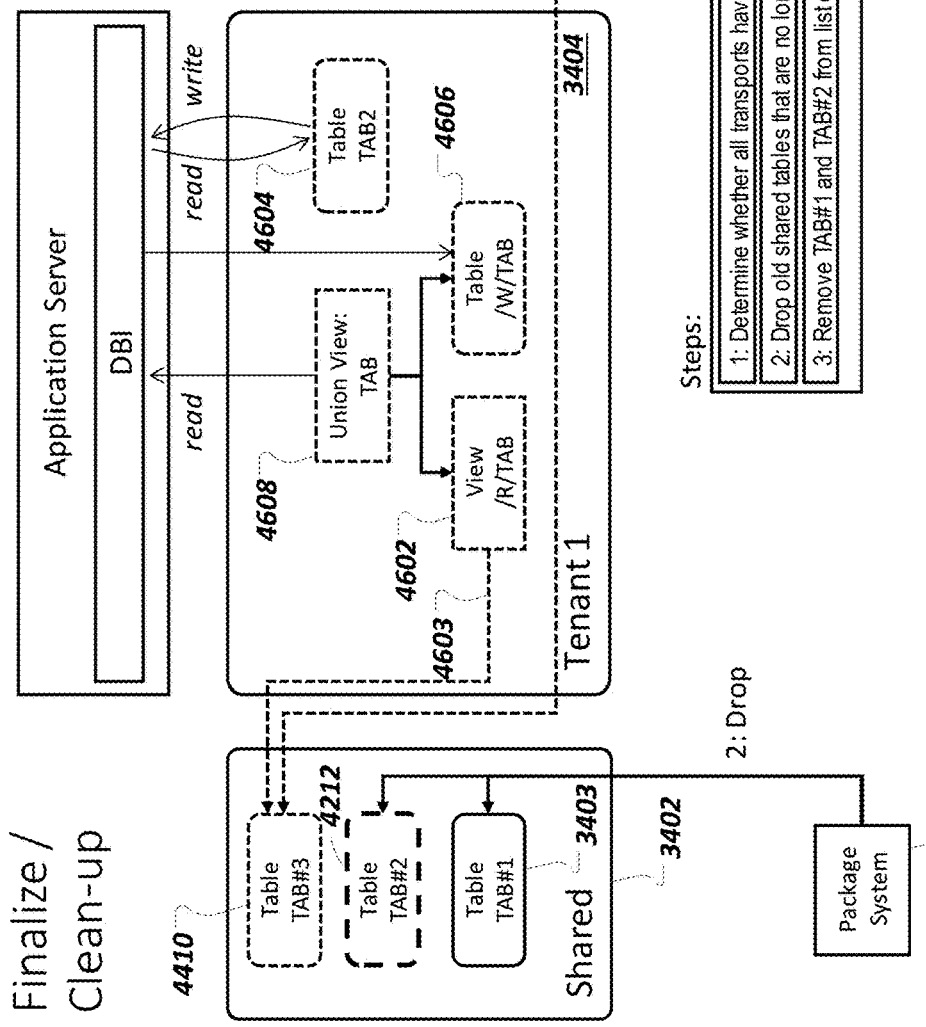
FIG. 47

| To \ From | Local (L) _5102_ | Shared read-only (R) _5108_ | Split (W) _5112_ |
|---|---|---|---|
| Local (L) _5110_ | - | Drop view / create table. _5116a_  _5116b_  Copy data from shared. _5116c_  _5116_ | Copy data from shared to local. _5120a_  _5120b_  _5120_  Establish one table. |
| Shared read-only (R) _5104_ | Drop local table _5122a_  Create view to shared. _5122b_  _5122_ | - | Drop local table /W/TAB. _5118a_  _5118b_  Drop union view. _5118_  _5118c_  Create view to shared. |
| Split (W) _5106_ | _5124_  Copy current data along key patterns to /W/TAB. _5124a_  Drop the old table. _5124b_  _5124c_  Create the union view. | Drop view to shared. _5114a_  Create /W/TAB. _5114b_  _5114c_  Create union view. _5114_ | - |

FIG. 51 _5100_

TRANSITIONING BETWEEN SYSTEM SHARING TYPES IN MULTI-TENANCY DATABASE SYSTEMS

CROSS-REFERENCE TO RELATED APPLICATIONS

This application is a co-pending application of U.S. application Ser. No. 15/794,261, filed on Oct. 26, 2017 entitled "SYSTEM SHARING TYPES IN MULTI-TENANCY DATABASE SYSTEMS"; and is also a co-pending application of U.S. application Ser. No. 15/794,305, filed on Oct. 26, 2017 entitled "DATA SEPARATION AND WRITE REDIRECTION IN MULTI-TENANCY DATABASE SYSTEMS"; and is also a co-pending application of U.S. application Ser. No. 15/794,501, filed on Oct. 26, 2017 entitled "TRANSITIONING BETWEEN SYSTEM SHARING TYPES IN MULTI-TENANCY DATABASE SYSTEMS"; and is also a co-pending application of U.S. application Ser. No. 15/794,368, filed on Oct. 26, 2017 entitled "KEY PATTERN MANAGEMENT IN MULTI-TENANCY DATABASE SYSTEMS"; and is also a co-pending application of U.S. application Ser. No. 15/794,335, filed on Oct. 26, 2017 entitled "DEPLOYING CHANGES IN A MULTI-TENANCY DATABASE SYSTEM"; and is also a co-pending application of U.S. application Ser. No. 15/794,381, filed on Oct. 26, 2017 entitled "DEPLOYING CHANGES TO KEY PATTERNS IN MULTI-TENANCY DATABASE SYSTEMS"; and is also a co-pending application of U.S. application Ser. No. 15/794,362, filed on Oct. 26, 2017 entitled "EXCHANGING SHARED CONTAINERS AND ADAPTING TENANTS IN MULTI-TENANCY DATABASE SYSTEMS"; the entire contents of each and as a whole, are incorporated herein by reference.

TECHNICAL FIELD

The present disclosure relates to computer-implemented methods, software, and systems for transitioning between system sharing types in multi-tenancy database systems.

BACKGROUND

A multi-tenancy software architecture can include a single instance of a software application that runs on a server and serves multiple tenants. A tenant is a group of users who share a common access to the software instance. In a multitenant architecture, the software application can be designed to provide every tenant a dedicated share of the instance—including tenant-specific data, configuration, user management, and tenant-specific functionality. Multi-tenancy can be used in cloud computing.

SUMMARY

The present disclosure involves systems, software, and computer implemented methods for transitioning between system sharing types in multi-tenancy database systems. One example method includes identifying a tenant container that includes a read-only table, a first writable table, and a mixed table for storing read-only and writable data. A shared container is created. A shared table is created in the shared container. Data is copied from the read-only table to the shared table. The read-only table is dropped. A read-only view is created in the tenant container. A second shared table is created in the shared container. Read-only mixed data is copied from the mixed table to the second shared table and deleted from the mixed table. The mixed table is renamed to be the second writable table. A union view is created that provides unified access to the second shared table and the second writable table.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4A illustrates an example system that illustrates the splitting of data for a tenant.

FIG. 13A illustrates an example system that includes a standard system with a standard system-sharing type and a shared/tenant system with a shared/tenant system-sharing type.

FIG. 13B is a table that illustrates processing that can be performed for standard, shared, and tenant database containers.

FIG. 14 illustrates a system for transitioning from a standard system to a shared/tenant system.

FIG. 16 illustrates a system for transitioning from a standard system to a simulated system.

FIGS. 27-31 are illustrations of example systems that are upgraded in part by exchanging a shared database container.

FIGS. 36 and 37 illustrate systems for deploying a patch to a tenant database container.

FIGS. 43-47 illustrate example systems for deploying multiple patches to a database system.

FIG. 51 is a table that illustrates a transition from a first table type to a second, different table type.

DETAILED DESCRIPTION

In a multi-tenancy architecture, resources can be shared between applications from different customers. Each customer can be referred to as a tenant. Shared resources can include, for example, vendor code, application documentation, and central runtime and configuration data. Multi-tenancy can enable improved use of shared resources between multiple application instances, across tenants, which can reduce disk storage and processing requirements. Multi-tenancy can enable centralized software change management for events such as patching or software upgrades.

A content separation approach can be used to separate shared data from tenant-specific data. Multi-tenancy approaches can be applied to existing applications that were built without data separation as a design criterion. If multi-tenancy is implemented for an existing system, applications can execute unchanged. Applications can be provided with a unified view on stored data that hides from the application which data is shared and which data is tenant-local. Other advantages are discussed in more detail below.

Figure 1:
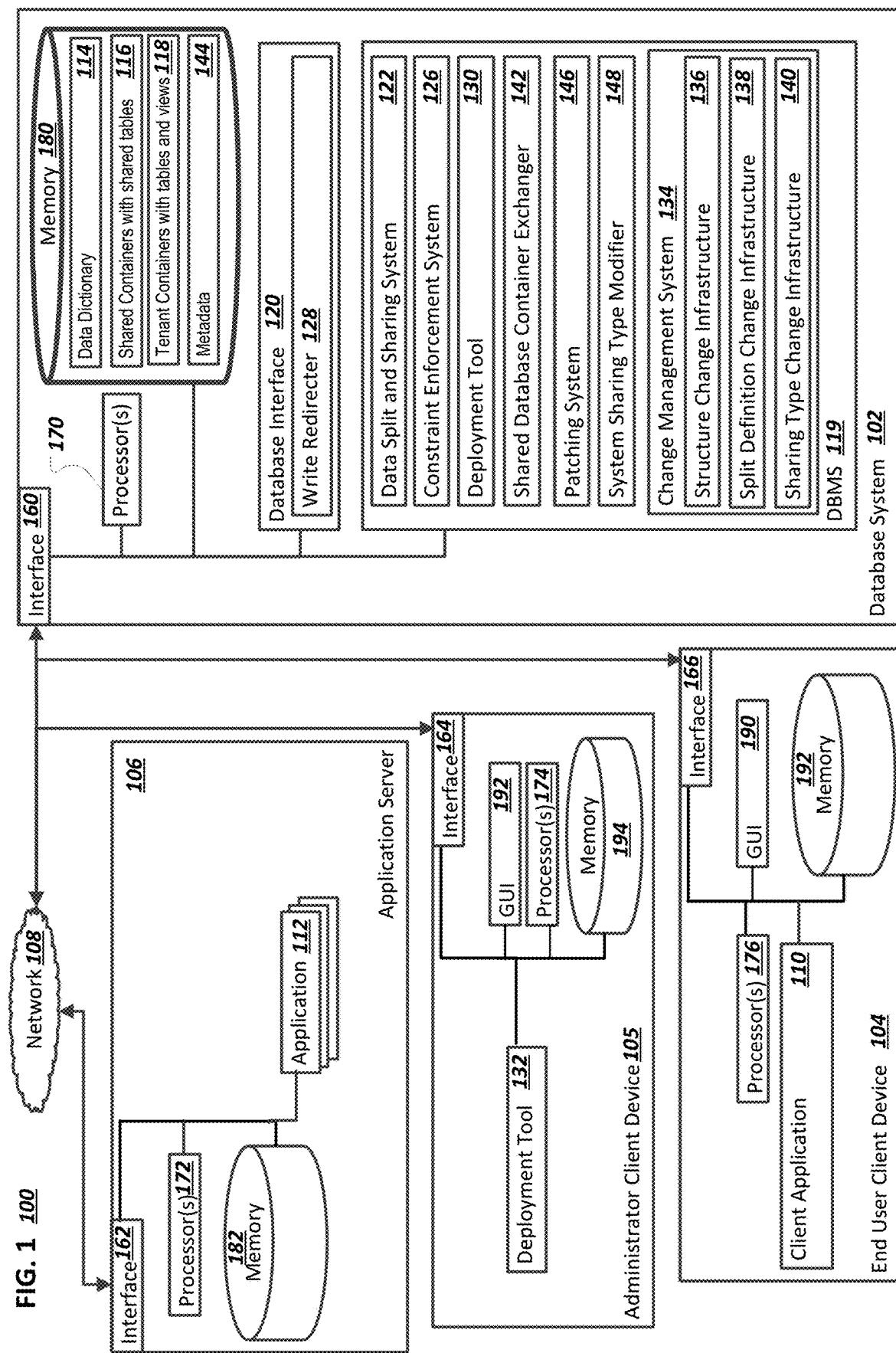
FIG. 1 is a block diagram illustrating an example system for multi-tenancy.

FIG. 1 is a block diagram illustrating an example system 100 for multi-tenancy. Specifically, the illustrated system 100 includes or is communicably coupled with a database system 102, an end user client device 104, an administrator client device 105, an application server 106, and a network 108. Although shown separately, in some implementations, functionality of two or more systems or servers may be provided by a single system or server. In some implementations, the functionality of one illustrated system or server may be provided by multiple systems or servers. For example, although illustrated as a single server 102, the system 100 can include multiple application servers, a database server, a centralized services server, or some other combination of systems or servers.

An end user can use an end-user client device 104 to use a client application 110 that is a client version of a server application 112 hosted by the application server 106. In some instances, the client application 110 may be any client-side application that can access and interact with at least a portion of the illustrated data, including a web browser, a specific app (e.g., a mobile app), or another suitable application. The server application 112 can store and modify data in tables provided by a database system. The tables are defined in a data dictionary 114 and reside in either shared database containers 116 and/or tenant database containers 118, as described below. The server application 112 can access a database management system 119 using a database interface 120.

The database management system 119 can provide a database that includes a common set of tables that can be used by multiple application providers. Each application provider can be referred to as a customer, or tenant, of the database system. The database system 102 can store tenant-specific data for each tenant. However, at least some of the data provided by the database system 102 can be common data that can be shared by multiple tenants, such as master data or other non-tenant-specific data. Accordingly, common, shared data can be stored in one or more shared database containers 116 and tenant-specific data can be stored in one or more tenant database containers 118 (e.g., each tenant can have at least one dedicated tenant database container 118). As another example, a shared database container 116 can store common data used by multiple instances of an application and the tenant database containers 118 can store data specific to each instance.

A data split and sharing system 122 can manage the splitting of data between the shared database containers 116 and the tenant database containers 118. The shared database containers 116 can include shared, read-only tables that include shared data, where the shared data can be used by multiple tenants as a common data set. The tenant database containers 118 can include writable tables that store tenant-specific data that may be modified by a given tenant. Some application tables, referred to as mixed, or split tables, may include both read-only records that are common and are shared among multiple tenants and writable records that have been added for a specific tenant, or that are editable by or for a specific tenant before and/or during interactions with the system. Rather than store a separate mixed table for each tenant, the read-only records of a mixed table can be stored in shared, read-only portion in a shared database container 116. Writable mixed-table records that may be modified by a given tenant can be stored in a writable portion in each tenant database container 118 of each tenant that uses the application. Data for a given object can be split across tables of different types. The data split and sharing system 122 can enable common portions of objects to be stored in a shared database container 116. The data dictionary 114 can store information indicating which tables are shared, whether fully or partially.

The server application 112 can be designed to be unaware of whether multi-tenancy has been implemented in the database system 102. The server application 112 can submit queries to the database system 102 using a same set of logical table names, regardless of whether multi-tenancy has been implemented in the database system 102 for a given tenant. For example, the server application 112 can submit a query using a logical name of a mixed table, and the database system 102 can return query results, regardless of whether the mixed table is a single physical table when multi-tenancy has not yet been implemented, or whether the mixed table is represented as multiple tables, including a read-only portion and a writable portion, in different database containers.

The multi-tenancy features implemented by the data split and sharing system 122 can allow an application to be programmed to use a single logical table for mixed data storage while still allowing the sharing of common vendor data between different customers. An application which has not been previously designed for data sharing and multi tenancy can remain unchanged after implementation of multi-tenancy. The data sharing provided by multi-tenancy can reduce data and memory footprints of an application deployment.

Storing data for the mixed table in multiple physical tables can introduce potential problems, such as a possibility of duplicate records. A constraint enforcement system 126 can be used to define key patterns which describe which records are allowed to be stored in a writable portion for a given mixed table, which can be used to prevent duplicate records. The database interface 120 can be configured to determine that an incoming query is a write query for a mixed table that is represented as multiple physical tables in the database system 120, and in response, use a write redirecter 128 to ensure that the write query operates only on a write portion of a mixed table. The use of write redirection and key patterns can help with enforcement of data consistency, both during application operation and during content deployment done by a deployment tool 130.

The deployment tool 130 can be used, for example, to deploy new content for the database system 102 after installment of tenant applications. An administrator can initiate a deployment using a deployment administrator application 132 on an administrator client device 105, for example.

Other than new data, other changes can be deployed to the database system 102 for an application. For example, for a new software version one or more of the following can occur: new content, changes to content, deletion of content, changes to table structure, changes to which tables are shared and which tables are not shared, and changes to key pattern definitions that define which content records are shared and which are tenant local. The deployment tool 130 can use a change management system 134 to determine how to make each of the required changes. The change management system 134 includes infrastructures for managing and making different types of changes. For example, the change management system includes a structure change infrastructure 136 for managing table structure changes, a split definition infrastructure 138 for managing changes to key patterns, and a sharing type change infrastructure 140 for managing changes to which tables are shared among tenants. The change management system 134 can manage when and in which order or combination the respective sub infrastructures are invoked.

When a deployment is for an upgrade or a new feature set, changes can occur to a number of tables used by an application. The deployment tool 130 can use an approach of exchanging a shared database container 116, which can be more efficient than making changes inline to an existing shared database container 116. A shared database container exchanger 142 can prepare a new shared database container 116 for the deployment tool 130 to deploy. The deployment tool 130 can link tenant database containers 118 to the new shared database container 116. The existing shared database container 116 can be dropped after all tenants have been upgraded. Deployment status can be stored in metadata 144 while an upgrade is in process.

The approach of exchanging a shared database container 116 can allow tenants to be upgraded individually—e.g., each tenant can be linked to the new shared database container 116 during an individual downtime window that can be customized for each tenant. If an upgrade for one tenant fails, a deployment for that tenant can be retried, and other tenant deployments can remain unaffected. The deploying of the new shared database container 116 can reduce downtime because the new shared database container 116 can be deployed during uptime while the existing shared database container 116 is in use.

When a deployment is for an emergency patch, a relatively smaller number of tables may be affected, as compared to larger software releases. The deployment tool 130 can use a patching system 146 to make necessary changes inline to an existing shared database container 116, rather than exchanging the existing shared database container 116. Changes for a patch can be deployed to shared tables that are initially hidden from tenants. This can enable tenants to be individually linked to the hidden table versions, which can enable individual tenant-specific upgrade windows and fallback capability, similar to the exchanged shared database container approach. The patching system 146 can also enable a queue of patches to be applied. For example, deployment of a first patch can be in progress for a set of tenants, with some but not all of the tenants having the first patch applied. A problem can occur with a tenant who has already been upgraded with the first patch. A second patch can be developed to fix the problem, and the second patch can be applied to that tenant. The other tenants can be upgraded with the first patch (and possibly the second patch) at a later time.

Needs of an application system or a customer/tenant may change over time. A database used for a set of customers may initially be relatively small, and may not include enough data to warrant implementation of multi-tenancy for that application/database/customer. For example, a choice may be made to use one database container for that customer, since higher performance may be obtained if only one vs. several database containers are used. A customer may grow over time, may have a larger database, may run more application instances, etc. A particular database may be used by more tenants than in the past. The database system 102 can support a changing from one type of system setup to another, as needs change. For example, a system sharing type modifier 148 can change the database system 102 from a standard setup (e.g., one database container, with no multi-tenancy) for a given customer to a shared/tenant setup that uses a shared database container 116 for shared content and tenant database containers 118 for tenant-specific content. When testing for a change to multi-tenancy, a simulated setup can be used for the database system 102. A system sharing type can be stored as a system setting in the metadata 144. The deployment tool 130, the database interface 120, and the data split and sharing system 122 can alter behavior based on the system sharing type. The server application 112 can run without being aware of a current system sharing type, and whether a system sharing type has been changed from one type to another.

As used in the present disclosure, the term "computer" is intended to encompass any suitable processing device. For example, although FIG. 1 illustrates a single database system 102, a single end-user client device 104, a single administrator client device 105, and a single application server 106, the system 100 can be implemented using a single, stand-alone computing device, two or more database systems 102, two or more application servers 106, two or more end-user client devices 104, two or more administrator client devices 105, etc. Indeed, the database system 102, the application server 106, the administrator client device 105, and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the database system 102, the application server 106, the administrator client device 105, and the client device 104 may be adapted to execute any operating system, including Linux, UNIX, Windows, Mac OS®, Java™, Android™, iOS or any other suitable operating system. According to one implementation, the application server 106 and/or the database system 102 may also include or be communicably coupled with an e-mail server, a Web server, a caching server, a streaming data server, and/or other suitable server.

Interfaces 160, 162, 164, and 166 are used by the database system 102, the application server 106, the administrator client device 105, and the client device 104, respectively, for communicating with other systems in a distributed environment—including within the system 100—connected to the network 108. Generally, the interfaces 160, 162, 164, and 166 each comprise logic encoded in software and/or hardware in a suitable combination and operable to communicate with the network 108. More specifically, the interfaces 160, 162, 164, and 166 may each comprise software supporting one or more communication protocols associated with communications such that the network 108 or interface's hardware is operable to communicate physical signals within and outside of the illustrated system 100.

The database system 102, the application server 106, the administrator client device 105, and the client device 104, each respectively include one or more processors 170, 172, 174, or 176. Each processor in the processors 170, 172, 174, and 176 may be a central processing unit (CPU), a blade, an application specific integrated circuit (ASIC), a field-programmable gate array (FPGA), or another suitable component. Generally, each processor in the processors 170, 172, 174, and 176 executes instructions and manipulates data to perform the operations of a respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database system 102 and the application server 106 respectively include memory 180 or memory 182. In some implementations, the database system 102 and/or the application server 106 include multiple memories. The memory 180 and the memory 182 may each include any type of memory or database module and may take the form of volatile and/or non-volatile memory including, without limitation, magnetic media, optical media, random access memory (RAM), read-only memory (ROM), removable media, or any other suitable local or remote memory component. Each of the memory 180 and the memory 182 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the respective computing device.

The end-user client device 104 and the administrator client device 105 may each be any computing device operable to connect to or communicate in the network 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 110 or the deployment tool 132, respectively. A client application is any type of application that allows a client device to request and view content on the client device. In some implementations, a client application can use parameters, metadata, and other information received at launch to access a particular set of data from the database system 102. In some instances, a client application may be an agent or client-side version of the one or more enterprise applications running on an enterprise server (not shown).

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the database system 102, or the client device itself, including digital data, visual information, or a graphical user interface (GUI) 190 or 192, respectively.

The GUI 190 and the GUI 192 each interface with at least a portion of the system 100 for any suitable purpose, including generating a visual representation of the client application 110 or the deployment tool 132, respectively. In particular, the GUI 1902 and the GUI 192 may each be used to view and navigate various Web pages. Generally, the GUI 190 and the GUI 192 each provide the user with an efficient and user-friendly presentation of business data provided by or communicated within the system. The GUI 190 and the GUI 192 may each comprise a plurality of customizable frames or views having interactive fields, pull-down lists, and buttons operated by the user. The GUI 190 and the GUI 192 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of end-user client devices 104 and administrator client devices 105 associated with, or external to, the system 100. Additionally, there may also be one or more additional client devices external to the illustrated portion of system 100 that are capable of interacting with the system 100 via the network 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Data Split

Figure 2:
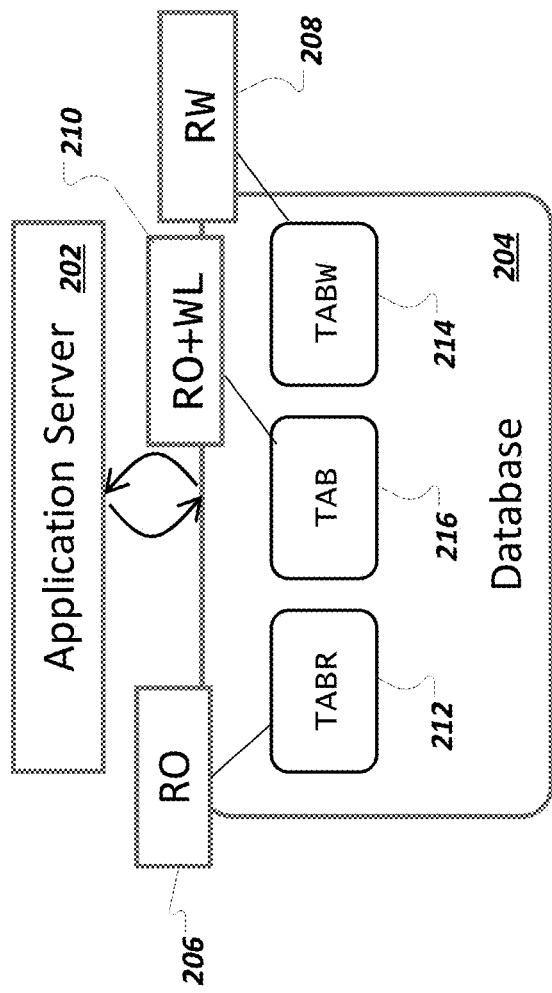
FIG. 2 illustrates an example system for an application with a standard database setup.

FIG. 2 illustrates an example system 200 for an application with a standard database setup. An application server 202 accesses a database 204, when executing application requests received from client applications. The database 204 can be a database container for a particular tenant, for example, or a database that includes data for multiple tenants. As respectively indicated by access levels 206, 208, and 210, the database 204 includes, for a particular tenant, a read-only table 212 named "TABR", a writable table 214 named "TABW", and a mixed table 216 named "TAB". Although one table of each of read-only, writable, and mixed table types are illustrated, a given tenant may have multiple tables of some or all of those table types.

The read-only table 212 includes vendor-delivered data, such as vendor code, character code pages, application documentation, central runtime and configuration data, and other vendor-provided data. The tenant, or applications associated with the tenant, do not write or modify data in the read-only table 212. The read-only table 212 is read-only from a tenant application perspective. The writable table 214 includes only tenant-specific data. The writable table 214 is generally shipped empty and does not include vendor-delivered data. Content is only written into the writable table 214 by the tenant or applications associated with the tenant. The writable table 214 can include business transaction data, for example. The mixed table 216 includes both read-only records that are not modified by tenant applications and records that may be modified by tenant applications. The mixed table 216 can include both vendor-delivered data and tenant-created data. An example mixed table can be a documentation table that includes shipped documentation data, tenant-added documentation data, and documentation data that was provided by the vendor but subsequently modified by the tenant. For example, the mixed table 216 can include default text values (which may be customized by particular tenants) for use in user interface displays, in various languages. In some implementations, the mixed-table 216 is an extendable table that includes fields that have been added by a tenant application or customer.

Figure 3:
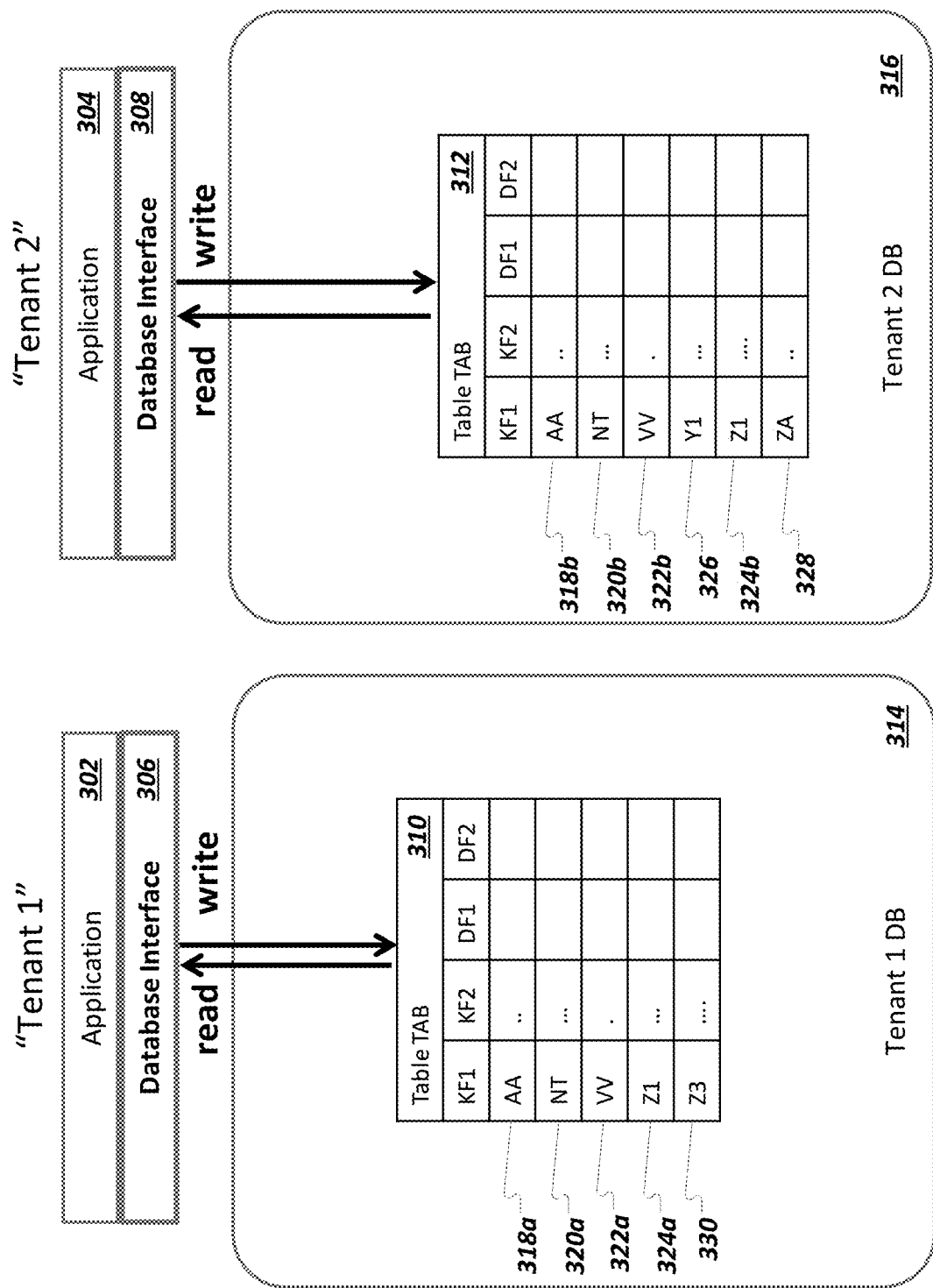
FIG. 3 illustrates an example non multi-tenancy system in which same content is stored for multiple, different tenants in different database containers.

FIG. 3 illustrates an example non-multi-tenancy system 300 in which same content is stored for multiple, different tenants in different database containers. The system 300 includes applications 302 and 304 that use database interfaces 306 and 308 to access tables 310 and 312 in tenant database containers 314 and 316, respectively. Although the applications 302 and 304 and the database interfaces 306 and 308 are shown separately, in some implementations, the applications 302 and 304 are a same application, and the database interfaces 306 and 308 are a same database interface, on a single application server.

The tables 310 and 312 are each mixed tables that include both records common to multiple tenants and records unique to (e.g., added by) a respective tenant. For example, both the table 310 and the table 312 include common records that were shipped by a vendor (e.g., records 318a-318b, 320a-320b, and 322a-322b). These common records can be deployed to the tables 310 and 312 when a respective application 302 or 304 is deployed for a respective tenant. The common records can be records that are not changed by respective applications. Storing the common records separately for each tenant results in an increase of storage and maintenance costs, as compared to storing common records in one shared location. As described below, when implementing multi-tenancy, common, shared records can be moved to a shared table. Each table 310 and 312 also includes records written by a respective tenant application 302 or 304, for example, records 324*a* and 324*b* (which happen to have a same key), and records 326 and 328 and 330, which are only in their respective tables.

FIG. 4A illustrates an example system 400 that illustrates the splitting of data for a tenant. The system 400 can be used for content separation—the separation of shared content used by multiple tenants from tenant-specific data used respectively by individual tenants. The system 400 includes a shared database container 402, and a tenant database container 404 for a given tenant. Table and view names are illustrative and examples only-any table name and any table name variation scheme can be used.

The shared database container 402 includes shared content used by multiple tenants including the given tenant. The shared content can include vendor-provided content and can enable the sharing of vendor-delivered data between multiple tenants. Although illustrated as a shared database container 402, shared content can also be stored in a shared database in general, or by using a shared database schema.

The shared database container 402 includes a TABR table 406, corresponding to the read-only table 212 of FIG. 2, that includes only read-only records. The TABR table 406 is configured to be read-only and shareable, to the given tenant associated with the tenant database container 406 and to other tenants. An application 408 running for the given tenant can submit queries that refer to the table name "TABR". A database interface (DBI) 410 can receive a query from an application and submit a query including the TABR table name to the tenant database container 404.

The tenant database container 404 includes a TABR view 412 that can be used when the query is processed for read-only access to the TABR table 406. The TABR table 406 can be accessible from the tenant database container 404 using remote database access, for example. As another example, if multiple tenants reside in a same database, the TABR table 406 can reside in the same database as the multiple tenants. In general, each tenant can have their own database schema or container and can access the TABR table 406 using cross-schema access, cross-container access, or remote database access.

The tenant database container 404 includes a TABW table 414, which in some instances corresponds to the writable table 214 of FIG. 2. The TABW table 414 can include non-shared, or tenant-specific, application data for the given tenant. The TABW table 414 can be a table that is shipped empty, with records being added to the TABW table 414 for the given tenant in response to insert requests from the application 408. Alternatively, TABW table 414 may include an initial set of data that can be updated and modified by the tenant or in a tenant-specific manner. An insert query submitted by the application 408 can include the TABW table name, and the DBI 410 can provide write access to the TABW table 414, without the use of a view.

The application 408 can submit a query that includes a "TAB" table name that corresponds to the mixed table 216 of FIG. 2. When implementing multi-tenancy, records from the mixed table 216 can be split, to be included in either a read-only table 416 with name "/R/TAB" that is included in the shared database container 402 or a writable table 418 with name "/W/TAB" that is included in the tenant database container 404. The use and identification of the names "/R/TAB" and "/W/TAB" is discussed in more detail below. The read-only table 416 can include records common to multiple tenants that had previously been included in multiple tenant tables for multiple tenants. The read-only table 416 can be a shared repository that multiple tenants use to access the common data and records. The writable table 418 includes records from the mixed table 216 that are specific to the given tenant associated with the tenant database container 404. A union view 420 with a same name of TAB as the mixed table 216 provides a single point of access for the application 408 to the read-only table 416 and the writable table 418.

The application 408 may have been previously configured, before implementation of multi-tenancy, to submit queries that include the "TAB" table name. The application 408 can continue to submit queries using the original "TAB" table name after implementation of multi-tenancy, using a single logical table name for access to the mixed records collectively stored in the writable table 418 and the read-only table 416. The union view 420 provides a unified view on the mixed record data that hides, from the application 408, details regarding which data is shared and which data is tenant-local. A query performed on the union view 420 may return records from the read-only table 416, the writable table 420, or a combination of records from both tables, and the application 420 is unaware of the source of the records returned from the query. The use of the union view 420 enables multi-tenancy to be compatible with existing applications such as the application 408—e.g., the application 408 and other applications can continue to be used without modification. Such an approach avoids significant rewriting of applications as compared to applications being aware of both the writable table 418 and the read-only table 416 and needing modifications to query two tables instead of one table. Queries and views that include a reference to the mixed table can continue to be used without modification. The use of the union view 420 enables the application 408 to access the data split into the writable table 418 and the read-only table 416 using a single query.

The DBI 410 can be configured to determine whether a query that includes the TAB table name is a read query or a write query. If the query is a read query, the DBI 410 can submit the read query to the tenant database container 404, for a read operation on the union view 420. The union view 420 provides unchanged read access to the joint data from the writable table 418 and the read-only table 416.

If the query is a write query (e.g., INSERT, UPDATE, DELETE, SELECT FOR UPDATE), the DBI 410 can, before submitting the query to the tenant database container 404, automatically and transparently (from the perspective of the application 408) perform a write intercept operation, which can include changing a TAB reference in the query to a "/W/TAB" reference, which can result in write operations being performed on tenant-local data in the writable table 418 instead of the union view 420. Write queries for the mixed table can be submitted, unchanged, by the application 408, since write access is redirected to the writable table 418. The union view 420 can be configured to be read-only so that a write operation would be rejected if it was attempted to be performed on the union view 420. A write operation may be ambiguous, as to which of the writable table 418 or the read-only table 416 should be written to, if write queries were allowed to be received for the union view 420.

The storing of shared content in the TABR table 406 and the read-only table 416 can result in a reduced memory footprint as compared to storing common data separately for each tenant. Storing common data in a shared location can reduce resource consumption during lifecycle management procedures and simplify those procedures. Lifecycle management can include application development, assembly, transport, installation, and maintenance. Storing common data in one location can simplify software change management, patching, and software upgrades.

Figure 4B:
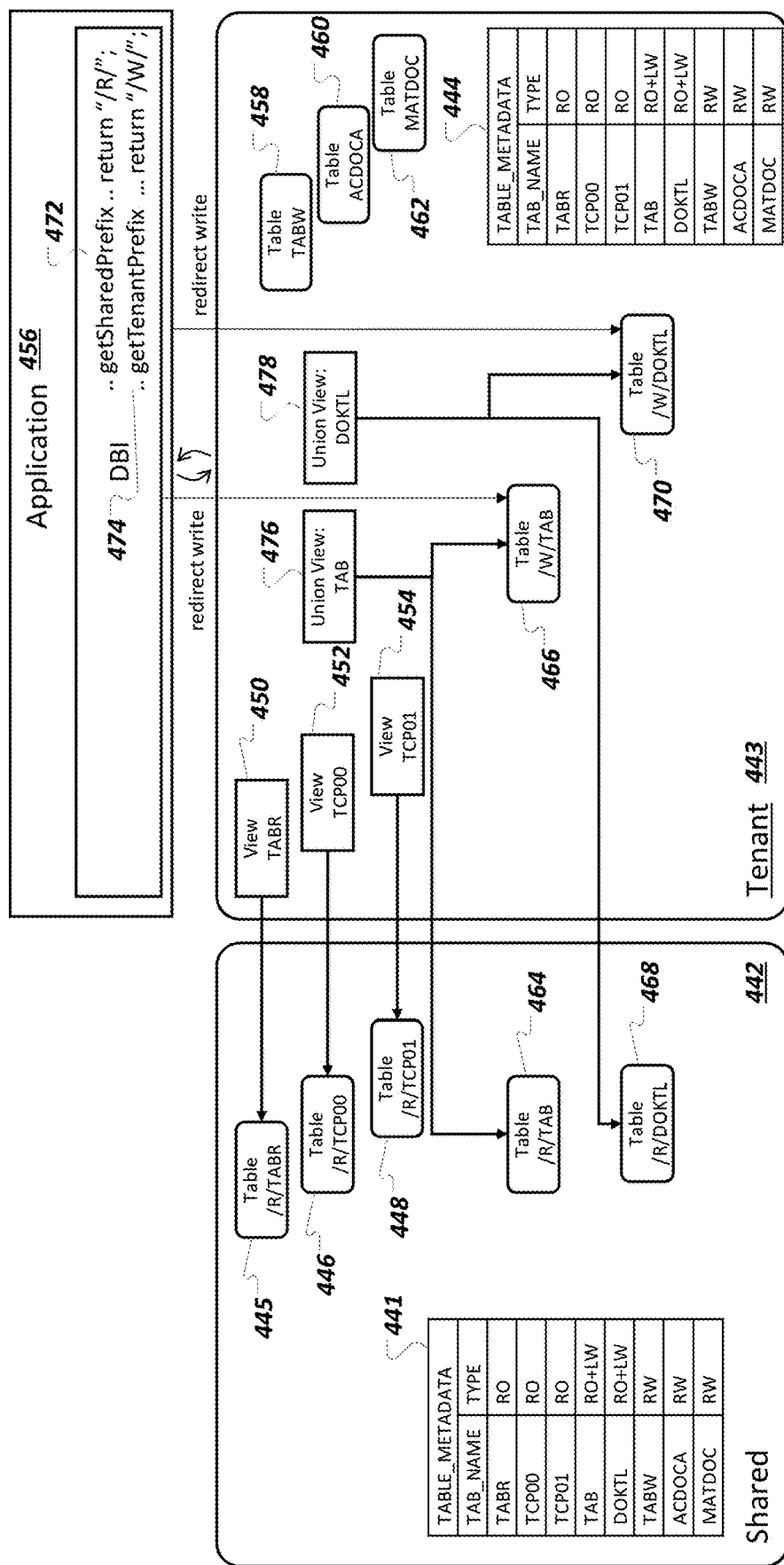
FIG. 4B illustrates an example multi-tenancy system that includes multiple tables of each of multiple table types.

FIG. 4B illustrates an example multi-tenancy system 440 that includes multiple tables of each of multiple table types. Before implementation of multi-tenancy, a database system can have multiple tables of each of the read-only, writable, and mixed table types. For example, as illustrated by table metadata 441, tables "TABR", "TCPOO", AND "TCP01" are read-only tables, tables "TAB" and "DOKTL" are mixed tables, and tables "TABW", "ACDOCA", and "MATDOC" are read/write (e.g., writable) tables. Table metadata can exist in a shared database container 442 and/or can exist in a tenant database container 443, as illustrated by metadata 444.

Implementation of multi-tenancy can result in the inclusion of the read-only tables in the shared database container 442, as illustrated by read-only tables 445, 446, and 448. Read-only views 450, 452, and 454 can be created in the tenant database container 443 for the read-only tables 444, 446, and 448, respectively, to provide read access for an application 456. Implementation of multi-tenancy can result in the inclusion of writable tables in the tenant database container 443, as illustrated by writable tables 458, 460, and 462.

Each mixed table can be split into a read-only table in the shared database container 442 and a writable table in the tenant database container 443. For example, a read-only table "/R/TAB" 464 and a writable table "/W/TAB" 466 replace the mixed table "TAB". As another example, a read-only table "/R/DOKTL" 468 and a writable table "/W/DOKTL" 470 replace the mixed table "DOKTL".

In some implementations, a deployment tool automatically generates names for the read-only and writable tables that replace a mixed table. A generated name can include a prefix that is appended to the mixed table name. Prefixed can be predetermined (e.g., "/R/", "/W/") or can be identified using a prefix lookup. For example, APIs getSharedPrefix 472 and getTenantPrefix 474 can be invoked and can return "/R/" for a shared prefix and "/W/" for a writable (e.g., tenant) prefix, respectively (or other character strings). The APIs 472 and 474 can look up a respective prefix in a preconfigured table, for example. In some implementations, a different naming scheme is used, that uses suffixes or some other method to generate table names. In some implementations, other APIs can generate and return a full shared table name or a full writable table name, rather than a shared or tenant prefix.

For each mixed table, a union view is created in the tenant database container 443 that provides a single point of access to the application 456 to records in the read-only table and the writable table corresponding to the mixed table. For example, a union view 476 provides unified access to the read-only table 464 and the writable table 466. As another example, a union view 478 provides unified access to the read-only table 468 and the writable table 470.

Figure 4C:
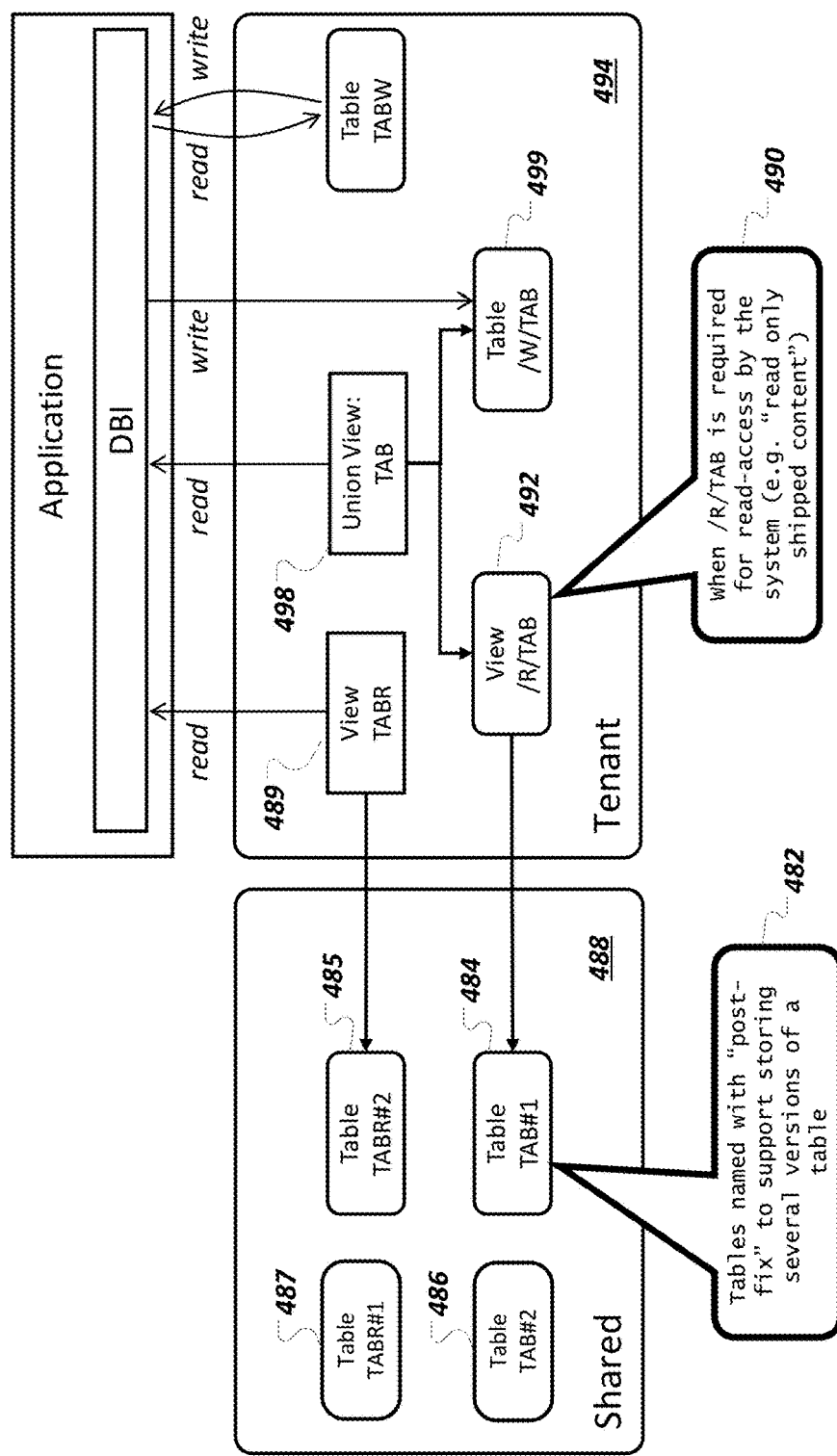
FIG. 4C illustrates an example multi-tenancy system that uses a suffix table naming scheme.

FIG. 4C illustrates an example multi-tenancy system 480 that uses a suffix table naming scheme. As illustrated by note 482, read-only tables 484, 485, 486, and 487 included in a shared database container 488 can include a suffix that enables the storing of several versions of a table. A read-only view 489 provides read access to the read-only table 485, which is a currently-configured version (e.g., "TABR #2") of a given read-only table. To gain access to a different version (e.g., "TABR #1") of the given read-only table, the read-only view 489 can be reconfigured to be associated with the read-only table 487. Multiple versions of a table can be used during deployment of an upgrade, as described in more detail below.

As illustrated by note 490, a read-only view 492 can be included in a tenant database container 494, such as if an application 496 needs read access to shipped, read-only content that was included in a mixed table that is now stored in the read-only table 484. A union view 498 can provide unified access to the read-only view 492 and writable mixed-table records now included in a writable table 499. The read-only view 492 can be re-configured to access the table 486 that is a different version (e.g., "TAB #2") of the read-only table 484.

Figure 5:
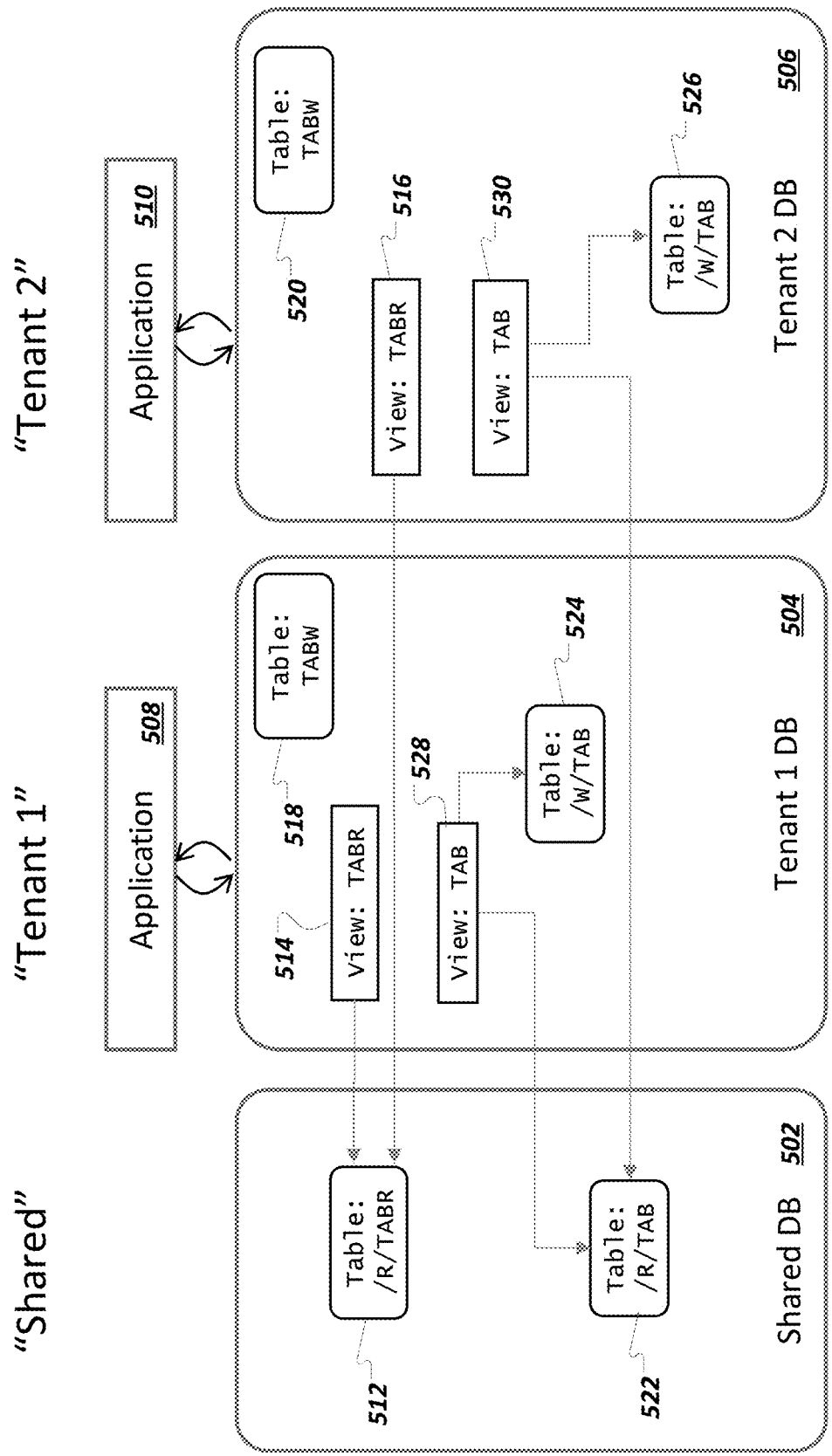
FIGS. 5 and 6 illustrate example systems that include a shared database container, a first tenant database container for a first tenant, and a second tenant database container for a second tenant.

FIG. 5 illustrates an example system 500 that includes a shared database container 502, a first tenant database container 504 for a first tenant, and a second tenant database container 506 for a second tenant. First and second applications 508 and 510 handle application requests for the first tenant and the second tenant, respectively. The first tenant and the second tenant can be served by separate application servers or a same application server, or by multiple application servers.

The shared database container 502 includes a shared read-only table 512 that includes read-only shipped records. The shared read-only table 512 is made available as a shared table to the first and second tenants, and other tenants. The first application 508 and the second application 510 can access the shared read-only table 512 using a view 514 or a view 516, respectively. The first application 508 and the second application 510 can have read, but not write access, to the shared read-only table 512, through the view 514 or the view 516, respectively.

The first tenant database container 504 and the second tenant database container 506 respectively include writable tables 518 or 520. The writable tables 518 and 520 are separate from one another and store records that have been respectively written by the application 508 or the application 510. The first tenant does not have access to the writable table 520 and correspondingly, the second tenant does not have access to the writable table 518.

The shared database container 502 includes a shared read-only table 522 that stores shared read-only records that had been included in a mixed table. Writable tables 524 and 526 included in the first tenant database container 504 and the second tenant database container 506 store mixed-table records that had been or will be added to the writable table 524 or the writable table 526 by the application 508 or the application 510, respectively. The writable tables 524 and 526 are separate from one another. The first tenant does not have access to the writable table 526 and correspondingly, the second tenant does not have access to the writable table 524.

The application 508 can be provided a single point of access for the mixed-table records that are now split between the shared read-only table 522 and the writable table 524 using a union view 528. Similarly, the application 510 can be provided a single point of access for the mixed-table records that are now split between the shared read-only table 522 and the writable table 526 using a union view 530. As described above for FIG. 4, a write request for a TAB table submitted by the application 508 or the application 510 could be intercepted by a respective DBI and redirected to the writable table 524 or the writable table 526, respectively.

Figure 6:
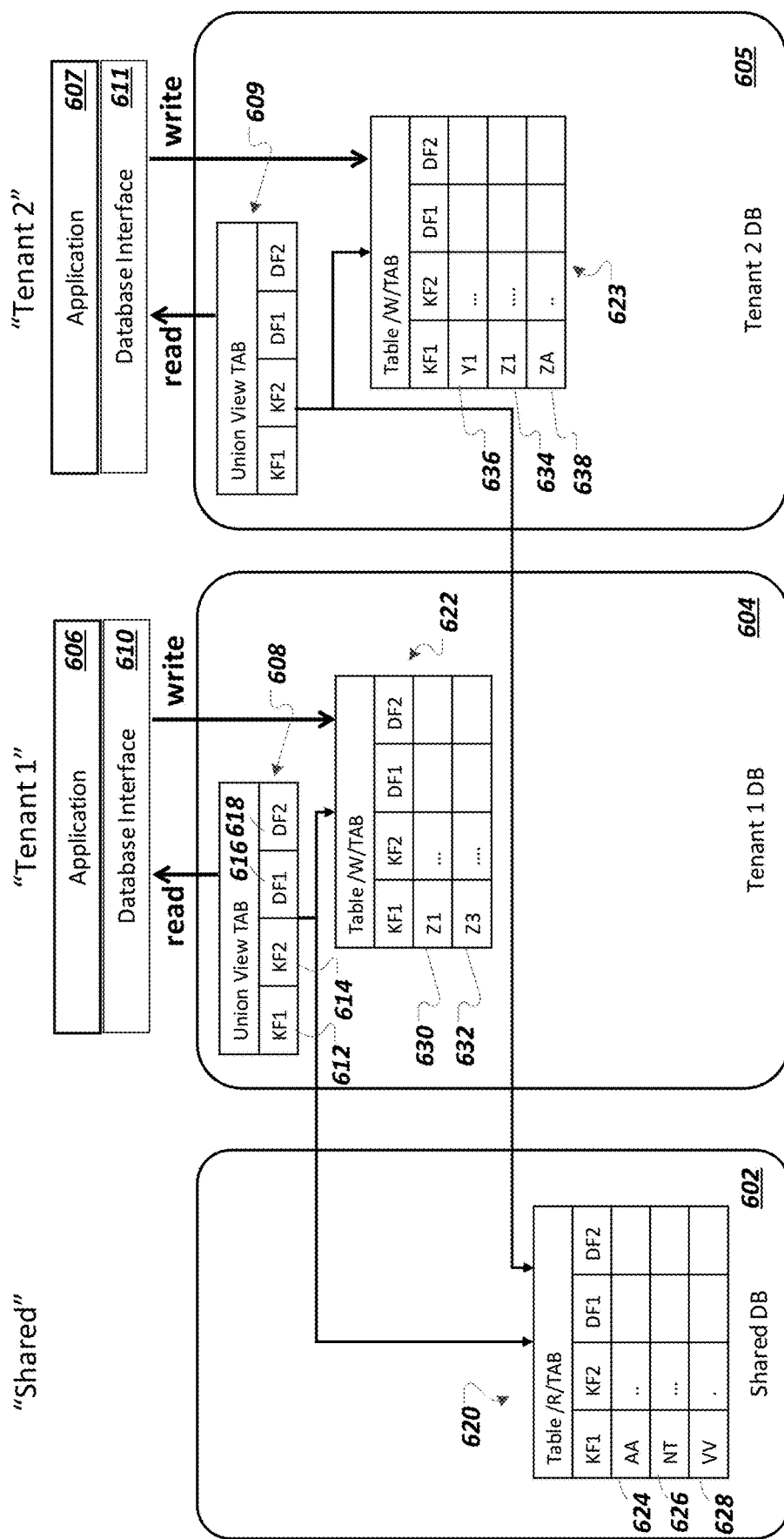

FIG. 6 illustrates an example system 600 that includes a shared database container 602, a first tenant database container 604 for a first tenant, and a second tenant database container 605 for a second tenant. Applications 606 and 607 are configured to access a union view 608 or a union view 609 using a DBI 610 or a DBI 611, respectively, to gain access to respective mixed tables. The union views 608 and 609 respectively provide a single point of access for the application 606 or the application 607 to records previously stored in a mixed table named TAB (such as the mixed table 310 of FIG. 3). The TAB table and the union views 608 and 609 include, as illustrated for the union view 608, a first key field 612, a second key field 614, a first data field 616, and a second data field 618. A primary key for the union view 608 (and consequently for the read-only table 620 and the writable table 623) can include the first key field 612 and the second key field 614. The first key field 612 and/or the second key field 614 can be technical fields that are used by the database but not presented to end users.

Read-only records of the mixed table that are common to multiple tenants are now stored in a shared read-only table 620 in the shared database container 602. The shared read-only table 620 includes read-only records shared with/common to multiple tenants. For example, the shared read-only table 620 includes records 624, 626, and 628 corresponding to the records 318a-318b, 320a-320b, and 322a-322b of FIG. 3.

Mixed table records that were added for the first tenant or the second tenant are now stored in either a writable table 622 in the first tenant database container 604 or a writable table 623 in the second tenant database container 605. The writable table 622 includes records specific to the first tenant, including records 630 and 632 that correspond to the records 324a and 330 of FIG. 3. Similarly, the writable table 623 includes records specific to the second tenant, including records 634, 636, and 638 that correspond to the records 324b, 326, and 328 of FIG. 3.

A query from the application 606 to retrieve all records from the union view 608 can return the records 624, 626, 628, 630, and 632. A query from the application 607 to retrieve all records from the union view 609 can return the records 624, 626, 628, 634, 636, and 638. The records 630 and 632 are not accessible by the second tenant. The records 634, 636, and 638 are not accessible by the first tenant.

Key Pattern Management

Figure 7:
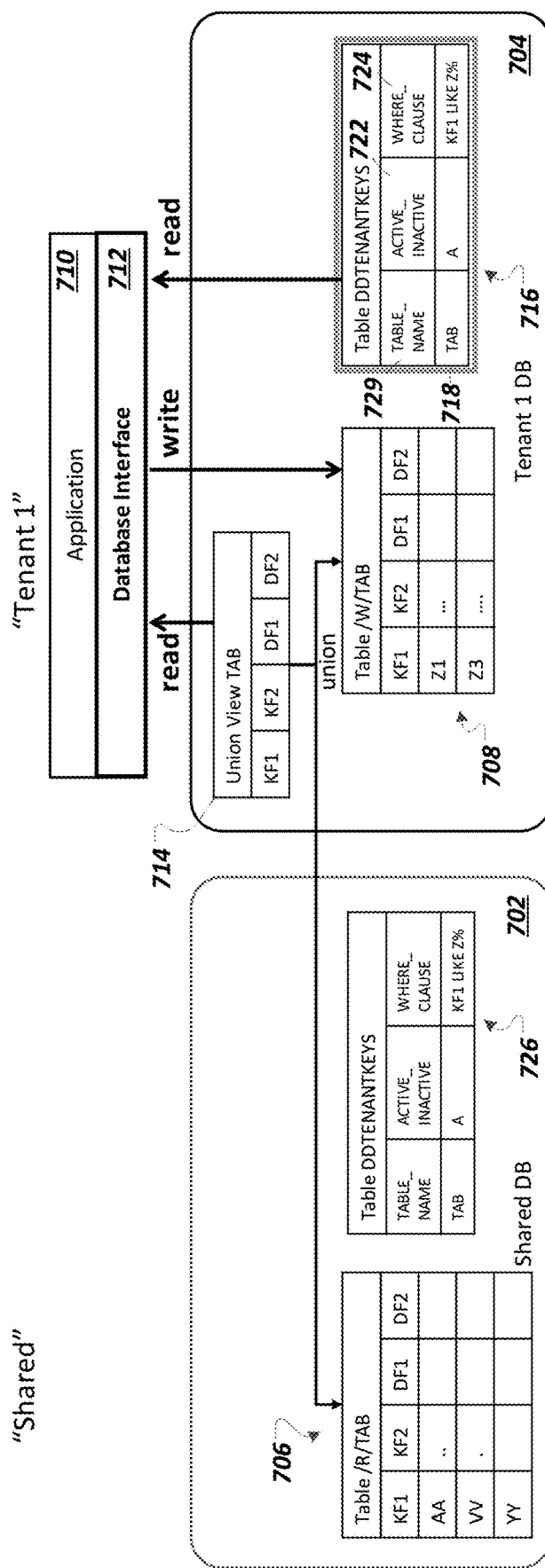
FIG. 7 illustrates a system for constraint enforcement.

FIG. 7 illustrates a system 700 for constraint enforcement. The system 700 includes a shared database container 702 and a tenant database container 704. A mixed table named "TAB" has been split into a read-only table 706 ("/R/TAB") in the shared database container 702 and a writable table 708 ("/W/TAB") in the tenant database container 704. When storing data in two tables instead of one table, a primary key constraint by the database may no longer be effective. Once a mixed table is split, and without further configuration, a record in the read-only table 706 could have a same key value as a record in the writable table 708. For example, a record in the read-only table 706 that was initially provided by a vendor can have a same key as a record in the writable table 708 that was written by a tenant application. As another example, the vendor can deploy, post-installation, a record to the read-only table 706 that already exists as a tenant-written record in the writable table 708.

An existence of duplicate records could create undesirable issues. For example, an application 710 may be configured to submit, using a DBI 712, a select query against the "TAB" table with a restriction on primary key field(s), with the query designed to either return one record (e.g., if a record matching the primary key restriction is found) or no records (e.g., if no records matching the primary key restriction are found). However, if duplicate records are allowed to exist between the read-only table 706 and the writable table 708, such a select query may return two records, since the query may be executed on a union view 714 with name of "TAB" that provides unified access to the read-only table 706 and the writable table 708. The application 710 may not be properly configured to handle such a situation, and an error condition, undesirable application behavior, and/or undesirable data modifications may occur.

As another example, the application 710 may submit a delete query, with a restriction on primary key fields, with an expectation that the query uniquely identifies a record to delete. The restriction on the delete query may match two records when applied to the union view 714, so an ambiguity may exist as to which record to delete.

To solve issues related to a potential for duplicate records, a key pattern can be identified that describes records that can be written by the application 710 and thereby exist in the writable table 708. For example, a key value convention may exist, such that shipped records in the read-only table 706 have a particular key pattern, such as a first range of key values, and application-added records have a different key pattern, such as a second, different range of key values. As another example, shipped records may have a key value that includes a particular prefix, and tenant-added records can be added using a key value that includes a different prefix. Key value conventions can be used to define different key value spaces—a first key value space for shipped records and a second, different key value space for tenant records, for example.

A tenant keys table 716 can be used to define key patterns. For example a row 718 in the tenant keys table 716 includes a value of "TAB" for a table name column 720, which indicates that a key pattern is being defined for the union view 714 (and for application requests that include a "TAB" table reference). The row 718 includes a value of "A" (for "Active") in an active/inactive column 722, indicating that a key pattern for the "TAB" table is active. Active and inactive key patterns are described in more detail below.

A value of "KF1 LIKE Z %" in the record 718 for a WHERE clause column 724 defines a key pattern for the "TAB" table. The key pattern describes a pattern for keys of records that are included in the writable table 708 (e.g., the key pattern indicates that records in the writable table 708 should have keys that start with "Z"). A complement of the key pattern (e.g., "NOT KF1 LIKE Z %" (e.g., records that have keys that do not start with "Z")) describes a pattern for records in the read-only table 706. The DBI 712 can use the key pattern to ensure that the keys of records stored in the writable table 708 are disjoint from the keys of records stored in the read-only table 706.

The DBI 712 can be configured to prohibit duplicate records by examining write queries (e.g., update, insert, delete queries) received from the application 710 for the "TAB" table, accepting (and executing) queries (e.g., using a redirect write, on the writable table 708, as described above) that are consistent with the key pattern, and rejecting queries that are inconsistent with the key pattern. An inconsistent query would add or modify a record in the writable table 708 so that the record does not match the key pattern. The DBI 712 can be configured to reject (and possibly issue a runtime error against) such inconsistent queries during a key-pattern check to ensure that write queries are only applied to the writable table 708 and not the read-only table 706. Although described as being performed by the DBI 712, the key pattern check can be performed elsewhere, such as by an additional table constraint object applied to the writable table 708 and/or the read-only table 706, a database trigger, or some other database component. The DBI 712 can be configured to examine complex queries, such as queries that refer to ranges of values, to ensure that modifications adhere to the key pattern definition.

Although a WHERE clause syntax is illustrated, other types of definitions can be used to define a key pattern. Although the tenant keys table 716 is illustrated as being included in the tenant table 704, tenant key definitions can also, or alternatively, exist in the shared database container 702, as illustrated by a tenant keys table 726. Tenant key definitions can exist in the shared database container 702 so that the application 710 or a tenant user is not able to change the tenant key definitions. A view (not shown) can be included in the tenant database container 704 to provide read access to the tenant key table 726, for example. If tenant keys are included in the shared database container 702, tenant key definitions can be shared with multiple tenants, if the multiple tenants each have a same key pattern definition. If some tenants have different key pattern definitions, tenant key definitions included in the shared database container 702 can be associated with particular tenant(s) (e.g., using a tenant identifier column or some other identifier).

The use of a key pattern can be advantageous as compared to other alternate approaches to a duplicate record issue, such as an overlay approach that allows for duplicate records. With the overlay approach, more complex union views (as compared to the union view 714) can be used, that involve the selection of one record among multiple records with a same key across the writable table 708 and the read-only table 706 using a priority algorithm. However, such an approach does not solve the problem of a select query being able to return a record that has a same key as a record that was just deleted (e.g., the delete may have deleted one but not both of duplicate records stored across different tables). An approach can be used to store local deletes so as to later filter out shared data that has been deleted locally, but that approach adds complexity and may impact performance. Additionally, an upgrade process may include complications if the shared content is updated since the tenant content may have to be analyzed for duplicate records and a decision may have to be made regarding whether a tenant local record is to be removed due a conflict with new shipped content.

As another example of an alternate approach for avoiding duplicate records, the system 700 can perform a check against the read-only table after every change operation in the writable table. However, such an approach may result in an unacceptable performance degradation. The use of a key pattern, instead of these alternative approaches, can avoid complexities and performance issues.

The key pattern can be used, during initial system deployment, to split mixed table data according to the key pattern definition. Upon installation of the shared database container 702, the system 700 can ensure that no content in the read-only table 706 matches the key pattern that defines data included in the writable table 708. Similarly, upon installation of the tenant database container 704 (and other tenant database containers or databases), the system 700 can ensure that no content is included in the writable table 708 that does not match the key pattern. Key patterns can be used during other lifecycle phases, as described below.

Figure 8:
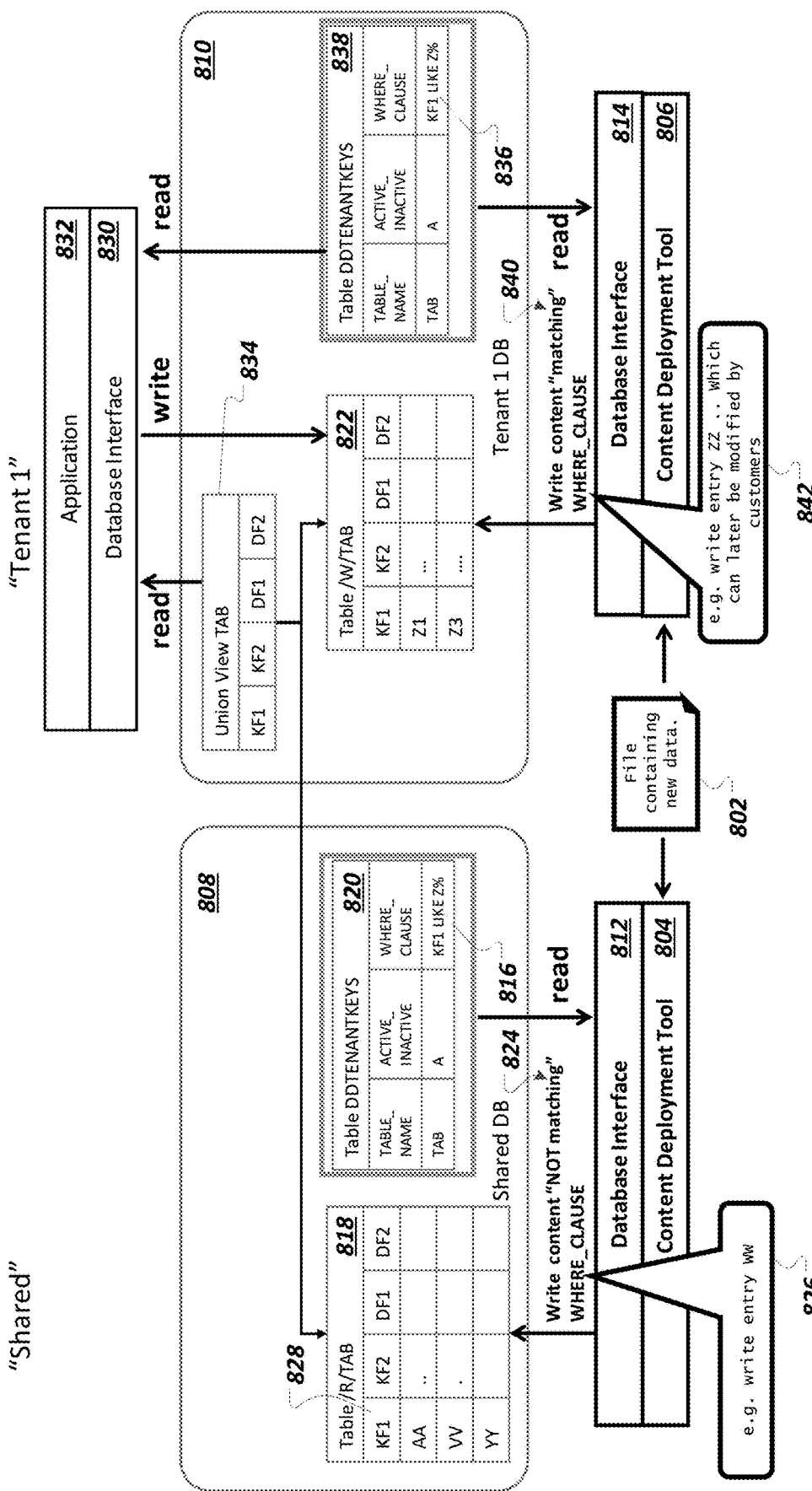
FIG. 8 illustrates an example system for deploying content in accordance with configured tenant keys.

FIG. 8 illustrates an example system 800 for deploying content in accordance with configured tenant keys. In general, during a system lifetime, key pattern definitions are enforced to make sure that tenants do not write data that conflicts with currently shared data or with data that might be delivered for sharing in the future. In addition to system installation and application execution, key pattern definitions are enforced throughout other phases of the system lifecycle, such as data deployment. When new content or content updates are shipped by the vendor, such as during an update or upgrade, content separation and key enforcements are taken into account, to ensure that vendor deliveries to a shared container during a software lifecycle event do not create conflicts with data that was created in a tenant container.

For example, a file 802 containing new records to be deployed to the system 800 can be provided to a content deployment tool 804 and a content deployment tool 806, for deployment to a shared database container 808 and a tenant database container 810, respectively. The file 802 may include records to be added to the system 800 as a result of a new version of an application or database, for example. The content deployment tools 804 and 806 can use a DBI 812 or a DBI 814, respectively, to write content to the shared database container 808 or the tenant database container 810, respectively. Although illustrated as separate content deployment tools 804 and 806 and separate DBIs 812 and 814, in some implementations, the content deployment tools 804 and 806 are the same tool and/or the DBIs 812 and 814 are the same interface.

The content deployment tool 804 can read, using the DBI 812, a WHERE clause 816 for a read-only "/R/TAB" table 818 associated with a "TAB" mixed table from a tenant keys table 820. The WHERE clause 816 describes a pattern of keys that exist in a "/W/TAB" writable table 822 in the tenant database container 810, the writable table 822 also associated with the "TAB" mixed table. The content deployment tool 804 can determine which records in the file 802 do not match the WHERE clause 816, and can, using the DBI 812, write the records from the file 802 that do not match the WHERE clause 816 to the read-only table 818, as indicated by note 824. The records that do not match the WHERE clause 816 can be records that are to be shared among tenants and not modified by respective tenants.

For example, as indicated by note 826, a record with a value of "ww" for a "KF1" key column 828 can be read by the content deployment tool 804 from the file 802 and written to the read-only table 818, based on the "ww" key value not matching the WHERE clause 816 of "KF1 like Z %". The DBI 812 and/or the read-only table 818 can be configured to allow the writing of content by the content deployment tool 804 to the read-only table 818, even though the read-only table 818 is read-only with respect to requests received by a DBI 830 from an application 832. The DBI 830 and/or a union view 834 can be configured to allow read but not write requests for the read-only table 818 (through the union view 834), for example. The DBI 830 can be the same or a different DBI as the DBI 812 and/or the DBI 814.

The content deployment tool 806 can read, using the DBI 814, a WHERE clause 836 for the writable "/W/TAB" table 822 associated with the "TAB" mixed table from a tenant keys table 838. Although shown as separate from the tenant keys table 820, the tenant keys table 838 may be the same table as the tenant keys table 820, and may exist in the shared database container 808, the tenant database container 810, or in another location. When the content deployment tool 806 is the same tool as the content deployment tool 804, a separate read of the WHERE clause 836 may not be performed since the WHERE clause 816 may have already been read and can be used by the content deployment tool 806. Like the WHERE clause 816, the WHERE clause 836 describes a pattern of keys that exist in the "/W/TAB" writable table 822. The content deployment tool 806 can determine which records in the file 802 match the WHERE clause 836, and can write the records from the file 802 that match the WHERE clause 836 to the writable table 822, as indicated by note 840. For example, as indicated by note 842, a record with a key value of "zz" can be written to the writable table 822, based on the "zz" key value matching the WHERE clause 836. Records in the file 802 that match the WHERE clause 836 can be records that may be later modified by the tenant associated with the tenant container 810.

The file 802 can include data to be written to both the read-only table 818 and the writable table 822, as described above. As another example, the content deployment tool 804 and/or the content deployment tool 806 (or another component) can create two files for content delivery—e.g., one file for the writable table 822 and one file for the read-only table 818. When separate files are used, the content deployment tool 806 can either ignore records in a file for the writable table 822 that do not match the key pattern or can issue an error for such records. Similarly, the content deployment tool 804 can either ignore records in a file for the read-only table 818 that match the key pattern or can issue an error for such records. Content deployment is described in more detail below, in other sections.

Figure 9:
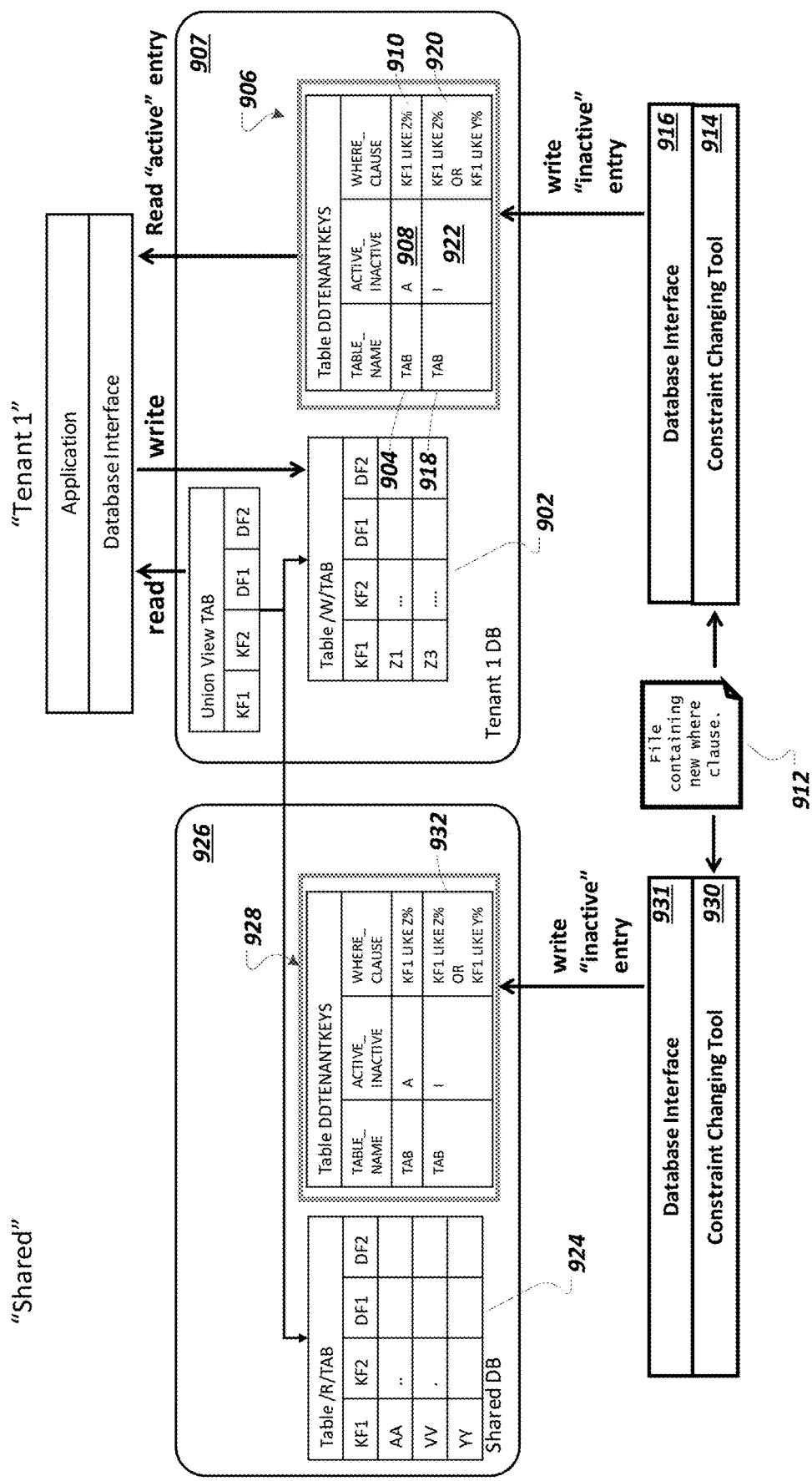
FIG. 9 illustrates an example system for changing tenant keys.

FIG. 9 illustrates an example system 900 for changing tenant keys. Tenant keys may be changed for example, when a new version of an application and/or database is released. An application developer may change a range of key values that may be written by a tenant application for example. As another example, a database system may have detected, during execution of a current or prior version of an application, attempts to write records with keys not matching a current key pattern. A developer or an administrator may review a log of such attempts and determine to allow the writing of records with such keys in the future.

A current record 904 in a tenant keys table 906 in a tenant database container 907 has a value 908 of "A" (for "active"), which indicates that a WHERE clause 910 in the current record 904 is a currently-configured description of key values for records in the writable table 902. For example, the WHERE clause 910 of "KF1 LIKE Z %" indicates that key values in the writable table 902 start with the letter "Z". An administrator may desire to change the tenant key table 906 so that records having key values beginning with "Z" or "Y" are allowed in the writable table 902.

A file 912 (or other electronic data input) including a new WHERE clause can be provided to a constraint changing tool 914. The constraint changing tool 914 can, using a DBI 916, add a record 918 to the tenant keys table that includes the new WHERE clause included in the file 912. For example, a new WHERE clause 920 of "KF1 LIKE Z % OR KF1 LIKE Y %" is included in the added record 918. The added record 918 includes an active/inactive value 922 of "I" for "inactive". As described below, the added record 918 can be marked as active after the writable table 902 and a read-only table 924 in a shared database container 926 have been updated to be in accordance with the new WHERE clause 920.

As described above, tenant keys can exist in the tenant database container 907 (as illustrated by the tenant keys table 906) and/or in the shared database container 926 (as illustrated by a tenant keys table 928). A constraint changing tool 930 (which can be the same or a different tool as the constraint changing tool 914) can use a DBI 931 to add a new record 932 with a new WHERE clause to the tenant keys table 928, as described above for the added record 918. The DBI 931 can be the same or a different interface as the DBI 916.

Figure 10:
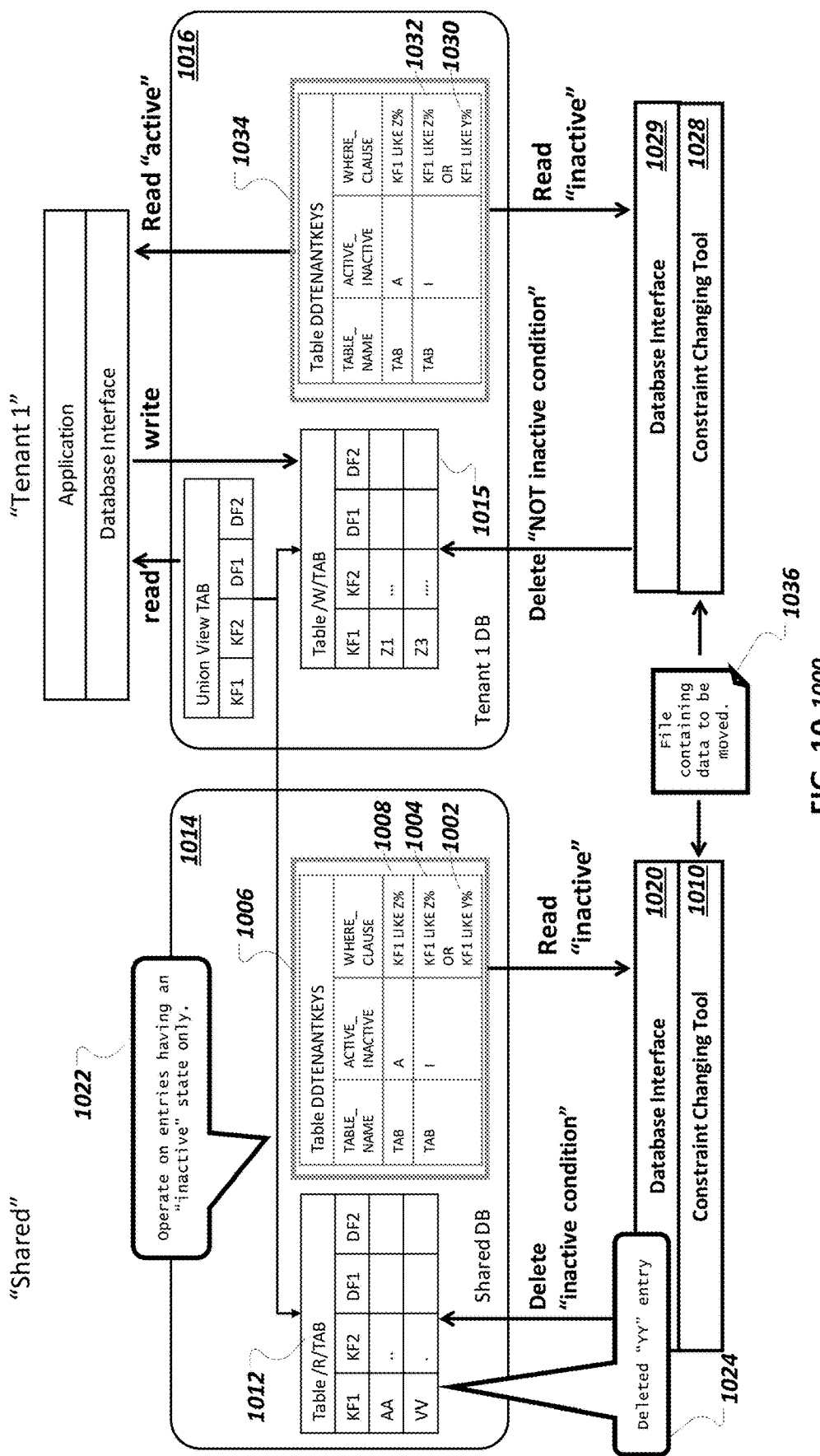
FIG. 10 illustrates an example system for updating database records to comply with updated tenant keys.

FIG. 10 illustrates an example system 1000 for updating database records to comply with updated tenant keys. The updated tenant keys are described by a new WHERE clause 1002 included in an inactive record 1004 included in a tenant keys table 1006. The inactive record 1004 is a replacement record for an active tenant keys record 1008. As described in more detail below, a constraint changing tool 1010 can update records in a read-only table 1012 in a shared database container 1014 and a writable table 1015 in a tenant database container 1016 to comply with the new WHERE clause 1002.

The constraint changing tool 1010 can use a DBI 1020 to read the new WHERE clause 1002 from the inactive tenant keys record 1004 (e.g., as illustrated by note 1022). The constraint changing tool 1010 can use the DBI 1020 to delete records from the read-only table 1012 that match the new WHERE clause 1002. For example, and as indicated by note 1024, a record with a key value of "YY" (e.g., that was included in the read-only table 924 of FIG. 9) has been deleted from and is no longer included in the read-only table 1012. The record with key value of "YY" may have been previously allowed to be in the read-only table 924 due to the record not matching a previous WHERE clause of "KF1 LIKE Z %" included in the active tenant keys record 1008, for example.

A constraint changing tool 1026 (which can be the same as or different from the constraint changing tool 1010) can use a DBI 1029 (which can be the same as or different from the DBI 1020) to delete records from the writable table 1015 that do not match the WHERE clause 1002. The constraint changing tool 1028 can read the WHERE clause 1002 from the tenant keys table 1006 or can read a WHERE clause 1030 from an inactive tenant keys record 1032 in a tenant keys table 1034 in the tenant database container 1016.

The WHERE clause 1030 describes a key pattern of keys starting with "Z" or "Y". The writable table 1015 is the same as the writable table 902 of FIG. 9 (e.g., no records have been deleted) since both records in the writable table 1015 have keys that start with "Z" (e.g., there are no records in the writable table 902 that do not match the WHERE clause 1030). After any records not matching the WHERE clause 1030 have been deleted from the writable table 1015 and any records matching the WHERE clause 1002 have been deleted from the read-only table 1012, the constraint changing tool 1010 (and/or the constraint changing tool 1028) can read a file 1036 that includes information indicating data to be moved between the read-only table 1012 and the writable table 1015, to complete updates to the system 1000 for compliance with the updated tenant keys. Processing of the file 1036 is described in more detail below.

In some implementations, rather than using the file 1036 to store data to be moved between the read-only table 1012 and the writable table 1015, the constraint changing tool 1010 can query the read-only table 1012 and/or the writable table 1015 to extract records to be moved. For example, the constraint changing tool 1010 can submit a query of "insert into/W/TAB (select * from/R/TAB where (KF1 LIKE Z % OR KF1 LIKE Y %))", to move records from the read-only table 1012 to the writable table 1015 that match the new WHERE clause 1002. As another example, the constraint changing tool 1010 can submit a query of "insert into/R/TAB (select * from/W/TAB where not (KF1 LIKE Z % OR KF1 LIKE Y %))", to move records from the writable table 1015 to the read-only table 1012 that do not match the new WHERE clause 1002. However, in some implementations, content is not selected from the writable table 1015 for inclusion in the read-only table 1012, since the tenant may have modified the data in the writable table 1015.

Figure 11:
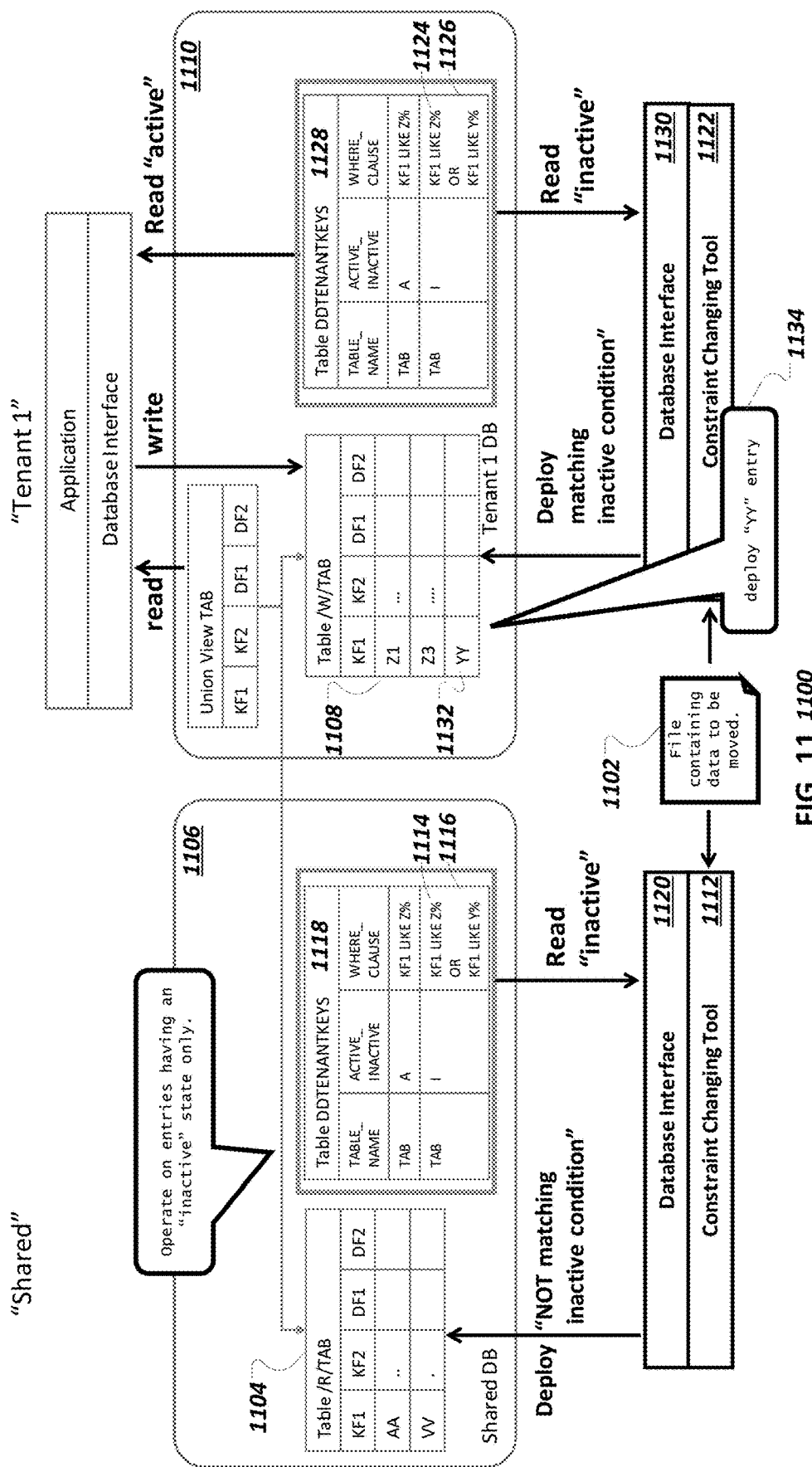
FIG. 11 illustrates an example system for updating database records to comply with updated tenant keys using a transfer file.

FIG. 11 illustrates an example system 1100 for updating database records to comply with updated tenant keys using a transfer file 1102. The transfer file 1102 corresponds to the file 1036 and include data to be moved between a read-only table 1104 in a shared database container 1106 and a writable table 1108 in a tenant database container 1110. A constraint changing tool 1112 can read records from the transfer file 1102 that do not match a WHERE clause 1114 included in an inactive record 1116 in a tenant keys table 1118. The constraint changing tool 1112 can use a DBI 1120 to deploy the records from the transfer file 1102 that do not match the WHERE clause 1114 to the read-only table 1104. In the example of FIG. 11, there are no records in the transfer file 1102 that do not match the WHERE clause 1114, so no new records are deployed to the read-only table 1104.

A constraint changing tool 1122 (which can be the same as or different from the constraint changing tool 1112) can read records from the transfer file 1102 that match the WHERE clause 1114. The constraint changing tool 1122 can read the WHERE clause 1114 from the tenant keys table 1118 or can read a WHERE clause 1124 from an inactive tenant keys record 1126 in a tenant keys table 1128 in the tenant database container 1110. The constraint changing tool 1122 can use a DBI 1130 (which can be the same as or different from the DBI 1120) to deploy the records from the transfer file 1102 that match the WHERE clause 1114 to the writable table 1108. In the example of FIG. 11, a record with a key value of "YY" (that matches the WHERE clause 1114) is included in the transfer file 1102, and is deployed to the writable table 1108, as illustrated by a record 1132 and note 1134. After records in the transfer file 1102 have been deployed to the writable table 1108 and/or the read-only table 1104, the inactive record 1116 is changed to be an active record in the tenant keys table 1118, as described below.

Figure 12:
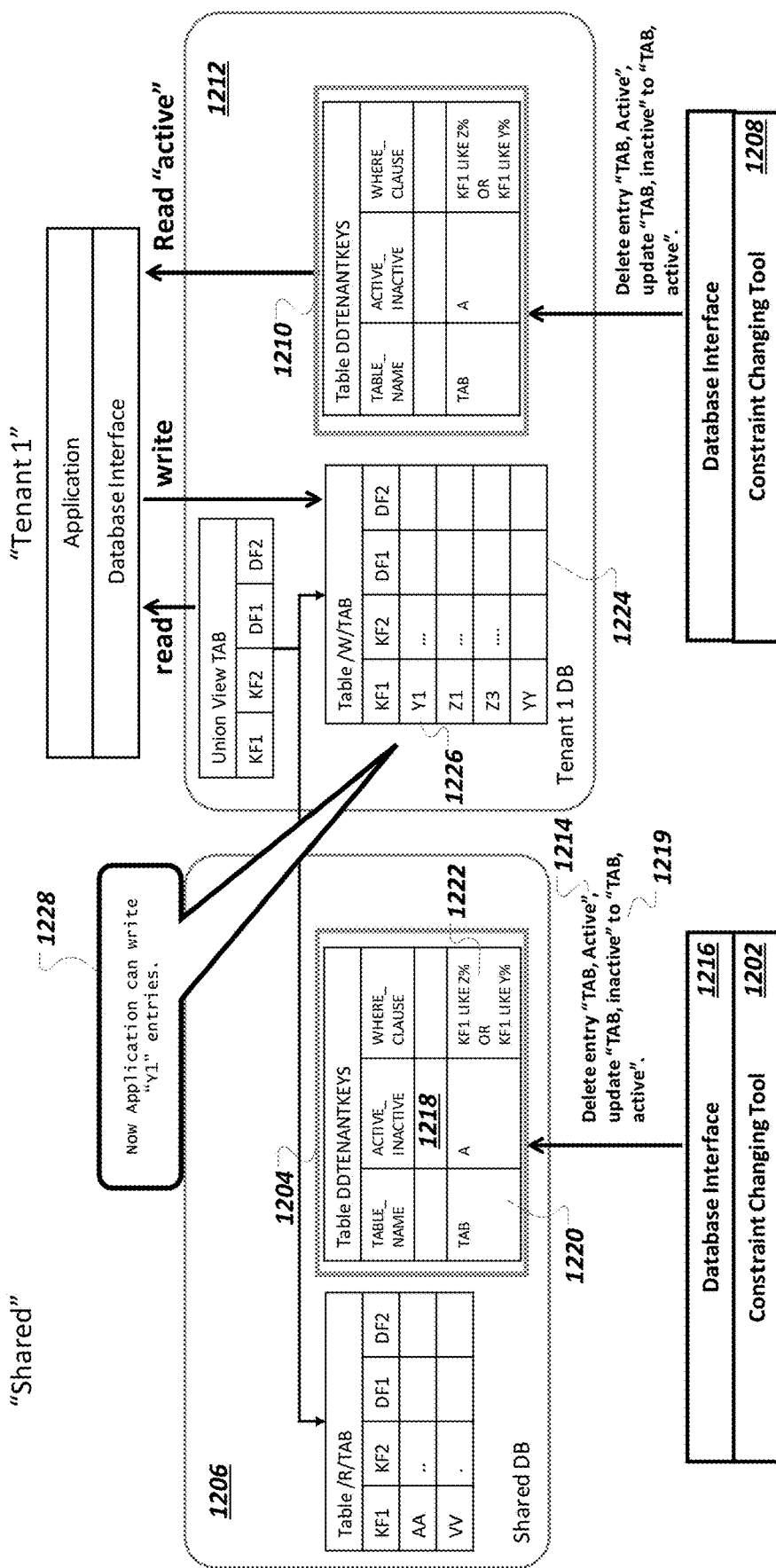
FIG. 12 illustrates an example system for updating an inactive tenant keys record.

FIG. 12 illustrates an example system 1200 for updating an inactive tenant keys record. A constraint changing tool 1202 can update a tenant keys table 1204 in a shared database container 1206. In some implementations, additionally or alternatively, a constraint changing tool 1208 makes similar changes to a tenant keys table 1210 in a tenant database container 1212. The constraint changing tool 1202 can submit a delete query 1214 to a DBI 1216 to delete one or more active entries in the tenant keys table 1204. For example, an empty (deleted) entry 1218 represents a now-deleted active tenant keys record 1008 of FIG. 10. The constraint changing tool 1202 can submit an update query 1219 to the DBI 1216 to change a previously inactive tenant keys record (e.g., the inactive tenant keys record 1004 of FIG. 10) to be an active tenant keys record, as illustrated by an updated tenant keys record 1220 that includes a value of "A" for "Active".

An inactive tenant keys record may be marked as inactive during a deployment process, for example, and may be marked as active when the deployment process has completed. Once the updated tenant keys record 1220 is active, tenant applications can write new records that match a WHERE clause 1222 included in the now active record. For example, a tenant application can write a record with a key value of "Y1" to a writable table 1224 in the tenant database container 1212, as illustrated by a new record 1226 and note 1228. Updating of tenant keys, along with other types of deployment changes, is described in more detail below.

System Sharing Types

As described above, different system sharing types can be supported, such as a standard system setup in which multi-tenancy is not implemented and a shared/tenant setup where multi-tenancy is implemented. Transitions between system sharing types can be supported, with a change in the system sharing type being transparent to applications.

FIG. 13A illustrates an example system 1300 that includes a standard system 1302 with a standard system-sharing type and a shared/tenant system 1304 with a shared/tenant system-sharing type. The standard system 1302 includes a read-only table "TABR" 1306, a writable table "TABW" 1308, and a read-only with local-write table "TAB" 1310, all included in a single database container 1312. During deployment, a deployment tool 1314 can deploy data to each of the tables 1306, 1308, and 1310.

The tables 1306, 1308, and 1310 are illustrative. A standard system-sharing type system can include other combinations of tables of different table types, including multiple instances of tables of a given type. For example, the standard system-sharing type system 1302 can include multiple read-only tables, multiple writable tables, and/or multiple read-only with local-write tables.

The shared/tenant system 1304 includes a shared database container 1316 and a tenant database container 1318. As described above, the shared database container 1316 includes a read-only table 1320 that corresponds to the read-only table 1306 and the tenant database container 1318 includes a writable table 1322 that corresponds to the writable table 1308. A read-only table 1324 in the shared database container 1316 and a writable table 1326 in the tenant database container 1318 correspond to the read-only with local-write table 1310. A view 1328 provides read access to the read-only table 1320 and a union view 1330 provides unified access to the read-only table 1324 and the writable table 1326.

During deployment, a deployment tool 1332 can deploy data to the read-only table 1320 and the read-only table 1324 included in the shared database container 1316. A deployment tool 1334 can deploy data to the writable table 1322 and the writable table 1326 included in the tenant database container 1318. Although illustrated as two separate deployment tools, in some implementations, the deployment tool 1332 and the deployment tool 1334 are the same tool.

FIG. 13B is a table 1350 that illustrates processing that can be performed for standard 1352, shared 1354, and tenant 1356 database containers. Types of processing in a multi-tenant system can include database (DB) object creation 1358, DB content deployment 1360, and write operations by application(s) 1362. For example, as described in a cell 1364, read-only (RO), writable (RW), and mixed (RO+WL) tables can be created in a standard database container 1352. A cell 1366 indicates that only shareable objects, such as a read-only table, or a read-only portion of a mixed table (e.g., the read-only table created when the mixed table is split), are created in a shared container 1354. A cell 1368 indicates that local tables (e.g., local to a given tenant) are created in a tenant database container 1356. For example, the tenant database container 1356 can include a writable table (RW) and a writable portion of a mixed table (e.g., RO+WL, with name/W/TAB, such as the writable table created when the mixed table is split). The tenant container 1356 can also include a view to the read-only table in the shared container 1354, and a union view on the read-only and writable portions of a mixed table.

A cell 1370 indicates that a deployment tool can deploy content to all tables included in a standard database container 1352. The deployment tool can deploy content to shared tables (e.g., a read-only table or a read-only portion of a mixed table) in a shared database container 1354, as indicated by a cell 1372. A cell 1374 indicates that the deployment tool can deploy content to local tables in a tenant database container 1356. Deployment to a mixed table can include redirection of tables writes to the writable portion of the mixed table.

Tenant applicants can write to all objects in a standard database container 1352 (e.g., as described in a cell 1376). A cell 1378 indicates that tenant applications are not allowed to write to tables in a shared database container 1354. A cell 1380 indicates that tenant applications can write content to local tables in a tenant database container 1356, including a writable table and a writable portion of a mixed table. Application writes on a mixed table can be redirected to the writable portion of the mixed table.

FIG. 14 illustrates a system 1400 for transitioning from a standard system 1401 to a shared/tenant system 1402. The standard system 1401 includes a database container 1403 that includes a read-only table 1404, a writable table 1405, and a mixed table 1406. The database container 1403 can be associated with a tenant and for purposes of discussion has a name of "tenant". A transition can be performed to transition the standard system 1401 of the tenant to the shared/tenant system 1402, as described by a flowchart 1407.

At 1408, a shared database container 1410 is created, for inclusion in the shared/tenant system 1402. The database container 1403 included in the standard system 1401 can be used as a tenant database container 1414 in the shared/tenant system 1402. That is, the database container 1403 is a pre-transition illustration and the tenant database container 1414 is a post-transition illustration of a tenant database container used for the tenant.

At 1416, access to the shared database container 1410 is granted to a tenant database user associated with the tenant.

At 1418, a read only table 1420 (e.g., with a path/name of "shared./R/TABR") is created in the shared database container 1410.

At 1422, data is copied from the read-only table 1404 included in the database container 1403 (e.g., a table object with a path/name of "tenant.TABR") to the read-only table 1420 (e.g., "shared./R/TABR").

At 1424, the read-only table 1404 (e.g., "tenant.TABR") is dropped. Accordingly, the read-only table 1404 is not included in the tenant database container 1414 at the end of the transition.

At 1426, a view 1428 (e.g., "tenant.TABR") is created in the tenant database container 1414, to provide read access to the read-only table 1420.

At 1430, a read-only table 1432 (e.g., "shared./R/TAB") is created in the shared database container 1410.

At 1434, data that does not match key patterns defined for tenant content is copied from the mixed table 1406 (e.g., "tenant.TAB") to the read-only table 1432 (e.g., "shared./R/TAB"). In other words, data that is to be shared among tenants and that is not tenant-specific is copied from the mixed table 1406 to the read-only table 1432 in the shared database container 1410.

At 1436, the data that does not match key patterns defined for tenant content (e.g., data that was copied in operation 1434) is deleted from the mixed table 1406 (e.g., "tenant-.TAB").

At 1438, the mixed table 1406 (e.g., "tenant.TAB") is renamed to "tenant./W/TAB", for inclusion in the tenant database container 1414 as a writable table 1440, for storing tenant-specific content. The records that remain in the writable table 1440 should be records that match key patterns defined for tenant content. The writable table 1405 is included, unmodified, in the tenant database container 1414, as a writable table 1442, for storing tenant content post transition.

At 1444, a union view 1446 (e.g., "tenant.TAB") is created, on the read-only table 1432 (e.g., "shared./R/TAB") and the writable table 1440 (e.g., "tenant./W/TAB"), to provide unified access to the read-only table 1432 and the writable table 1440.

The transition from the standard system 1401 directly to the shared/tenant system 1402 can, due to cross database container access and data movement, and other issues, take more time than is desired in some instances. In some implementations, a database object cannot simply be renamed to move the database object from one database container to another database container. The changing of which tables are read-only, mixed, or writable, and changing of key patterns, can result in data and table movement. For example, the changing of a table to be read-only or mixed can result in data being moved to a shared database container from a tenant database container.

To improve performance during development and testing of an application, before a final deployment, a simulation mode can be used that simulates data sharing for an application and for content deployment. The simulation mode involves storing all database objects in one database container, and simulating read-only/shared access, and redirect write operations for appropriate database objects.

Using one database container can enable renaming of database objects to simulate a transition to a shared system setup. If the application performs as expected in the simulation mode, a transition can be performed to transition the database system from the simulation mode to the shared system setup. As discussed below in FIGS. 15-17, transitioning the database system from the standard system setup to the simulation mode and transitioning the database system from the simulation mode to the shared system setup includes more DDL (Data Definition Language) statements and less DML (Data Manipulation Language) statements than transitioning the database system directly to the shared system setup from the standard system setup.

Figure 15:
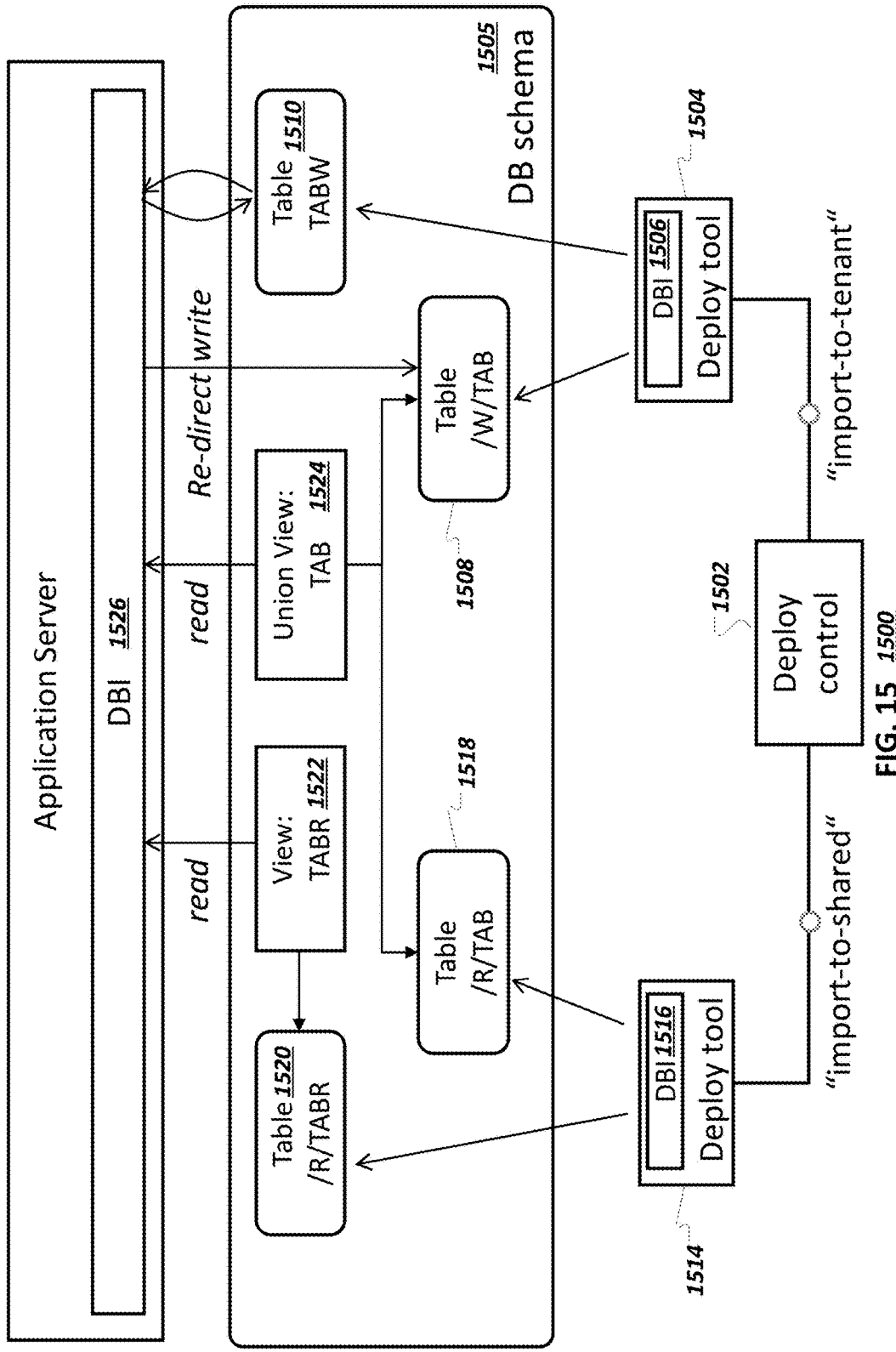
FIG. 15 illustrates a system with a sharing type of simulated.

FIG. 15 illustrates a system 1500 with a sharing type of simulated. A deployment control system 1502 can use a deployment tool 1504 to simulate an import of tenant data, by importing data to a simulation database container 1505. For example, the deployment tool 1504 can use a DBI 1506 to deploy data to a writable table 1508 and a writable table 1510 included in the simulation database container 1505. The deployment control system 1502 can use a deployment tool 1514 (which can be the same as or different than the deployment tool 1504) to simulate the importing of shared data, by importing data to the simulation database container 1505. For example, in the simulation, the deployment tool 1514 can use a DBI 1516 (which can be the same or a different interface as the DBI 1506) to deploy shared data to a read-only table 1518 and a read-only tool 1520 included in the same simulation database container 1505 that also includes the writable table 1508 and the writable table 1510. A view 1522 provides read access to the read-only table 1520. A union view 1524 provides unified access to the read-only table 1518 and the writable table 1508.

A simulation of the sharing mode can be accomplished by disabling, using a DBI 1526, application write access to read-only tables, such as the read-only table 1518, redirecting application write queries received for the union view 1524 to the writable table 1508, if records to be modified match a defined key pattern, providing application read-access to the read-only table 1520 using the read-only view 1522, and providing application read access to the read-only table 1518 (and the writable table 1508) using the union view 1524.

FIG. 16 illustrates a system 1600 for transitioning from a standard system 1602 to a simulated system 1604. The transition from the standard system 1602 to the simulated system 1604 is described in a flowchart 1606. At 1608, a read-only table 1610 included in a database container 1612 is renamed from "TABR" to "/R/TABR", as illustrated by a read-only table 1614 in a simulated database container 1616. The database container 1612 included in the standard system 1602 can be used as the simulated database container 1616 in the simulated system 1616. That is, the database container 1612 is a pre-transition illustration and the simulated database container 1616 shows container content post-transition.

At 1618, a view 1620 is created on the read-only table 1614.

At 1622, a "TAB" mixed table 1624 included in the database container 1612 is renamed to "/R/TAB", as illustrated by a mixed table 1626 included in the simulated database container 1616.

At 1628, a mixed "/W/TAB" table 1630 is created in the simulated database container 1616.

At 1632, data is moved from the read-only table 1626 to the writable table 1630 according to tenant content definition. For example, tenant-specific data that matches key patterns defined for tenant content is moved from the read-only table 1626 to the writable table 1630.

At 1634, a union view 1636 is created on the read-only table 1626 and the mixed table 1630. A writable table 1638 included in the database container remains included in the simulated database container 1616, as illustrated by a writable table 1640.

Figure 17:
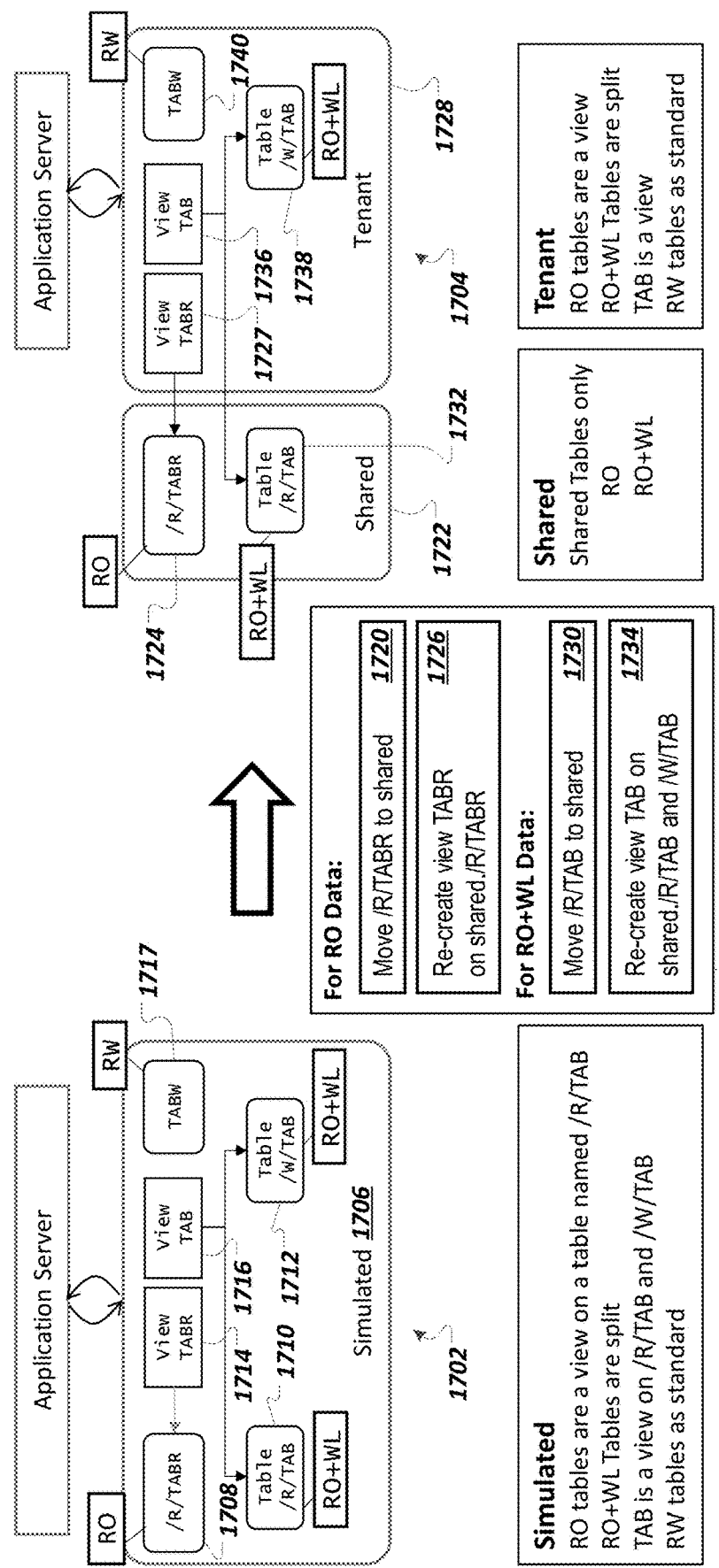
FIG. 17 illustrates a system for transitioning from a simulated system to a shared/tenant system.

FIG. 17 illustrates a system 1700 for transitioning from a simulated system 1702 to a shared/tenant system 1704. A simulated system 1702 includes a simulated container 1706 that includes a read-only table 1708, a read-only table 1710, a writable table 1712, a view 1714 on the read-only table 1708, a union view 1716 on the read-only table 1710 and the writable table 1712, and a writable table 1717. A transition from the simulated system 1702 to the shared/tenant system 1704 is described in a flowchart 1718.

At 1720, the read-only "/R/TABR" table 1708 is moved to a shared container 1722 included in the shared/tenant system 1704, as illustrated by a read-only table 1724.

At 1726, a view 1727 is recreated for the read-only table 1724 (e.g., "shared./R/TABR"), as shown in a tenant container 1728. For example, the view 1714 may become invalid or be deleted when the read-only table 1708 is moved. The tenant container 1728 is a post-transition view of the simulated container 1706. That is, the simulated container 1706 can serve as a container for the tenant once the transition has completed, with the tenant container 1728 being an illustration showing container contents after completion of the transition.

At 1730, the read-only "/R/TAB" table 1710 is moved from the simulated container 1706 to the shared container 1722, as illustrated by a read-only table 1732.

At 1734, a union view 1736 is recreated on the read-only table 1732 and a writable table 1738 that corresponds to the writable table 1712. For example, the union view 1716 may become invalid or be deleted when the read-only table 1710 is moved to the shared container 1722. A writable table 1740 corresponds to the writable table 1717 (that is, the writable table 1717 remains unchanged and is included in the tenant container 1728 post transition).

Figure 18:
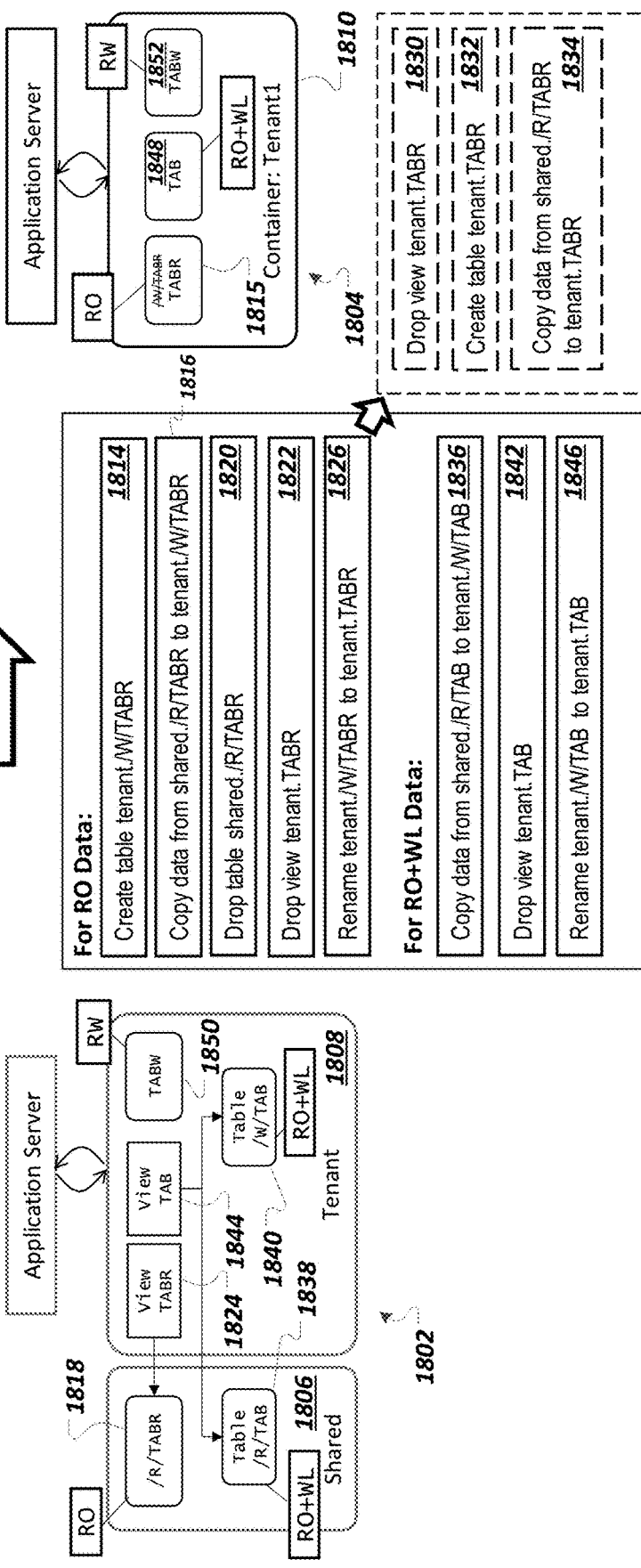
FIG. 18 illustrates a system for transitioning from a shared/tenant system to a standard system.

FIG. 18 illustrates a system 1800 for transitioning from a shared/tenant system 1802 to a standard system 1804. Such a transition may occur, for example, if cross-container access incurred an unacceptable performance degradation, for example, or if a determination is made that not enough shared content exists to warrant multi-tenancy.

The shared/tenant system 1802 includes a shared database container 1806 and a pre-transition tenant database container 1808. The standard system 1804 includes a post-transition database container 1810. The post-transition database container 1810 is a post-transition illustration of the pre-transition tenant database container 1808. The shared container 1806 is not used in the standard system 1804 post transition.

The transition from the shared/tenant system 1802 to the standard system 1804 is described in a flowchart 1812.

At 1814, a "tenant./W/TABR" table 1815 is created in the post-transition tenant database container 1810. (The "/W/TABR" table name is shown crossed out since the table 1815 is renamed in a later operation).

At 1816, data is copied from a read-only table 1818 in the shared database container 1806 (e.g., "shared./R/TABR") to the table 1815.

At 1820, the read-only table 1818 (e.g., "shared./R/TABR") is dropped from the shared database container 1806.

At 1822, a view 1824 that had been configured for the read-only table 1818 is dropped (e.g., the post-transition database container 1810 does not include a view).

At 1826, the "tenant./W/TABR" table is renamed to be "tenant.TABR", as shown by an updated "TABR" name of the table 1815.

Processing of read-only data described in operations 1814, 1820, 1822, and 1826 can alternatively be performed by the processing described in an alternative flowchart 1828. For example, at 1830, the view 1824 can be dropped. At 1832, the table 1815 with name of "TABR" can be created in the database container 1820. At 1834, data can be copied from the read-only table 1818 to the "TABR" table 1815.

Continuing with the flowchart 1812, at 1836, data is copied from a read-only table 1838 in the shared database container 1806 (e.g., "shared./R/TAB") to a writable table 1840 in the pre-transition tenant container 1808 (e.g., "tenant./W/TAB"). That is, records that had been previously split into the shared read-only table 1838 and the writable table 1840 are now included in the writable table 1840.

At 1842, a union view 1844 is dropped from the pre-transition tenant database container 1808 (e.g., the post-transition database container 1810 does not include a union view).

At 1846, the writable table 1840 (e.g., "tenant./W/TAB" is renamed to "tenant.TAB", as illustrated by a table 1848 in the post-transition database container 1810. A writable table 1850 included in the pre-transition tenant database container 1808 remains unchanged and is included in the post-transition database container 1810, e.g., as a writable table 1852.

Figure 19:
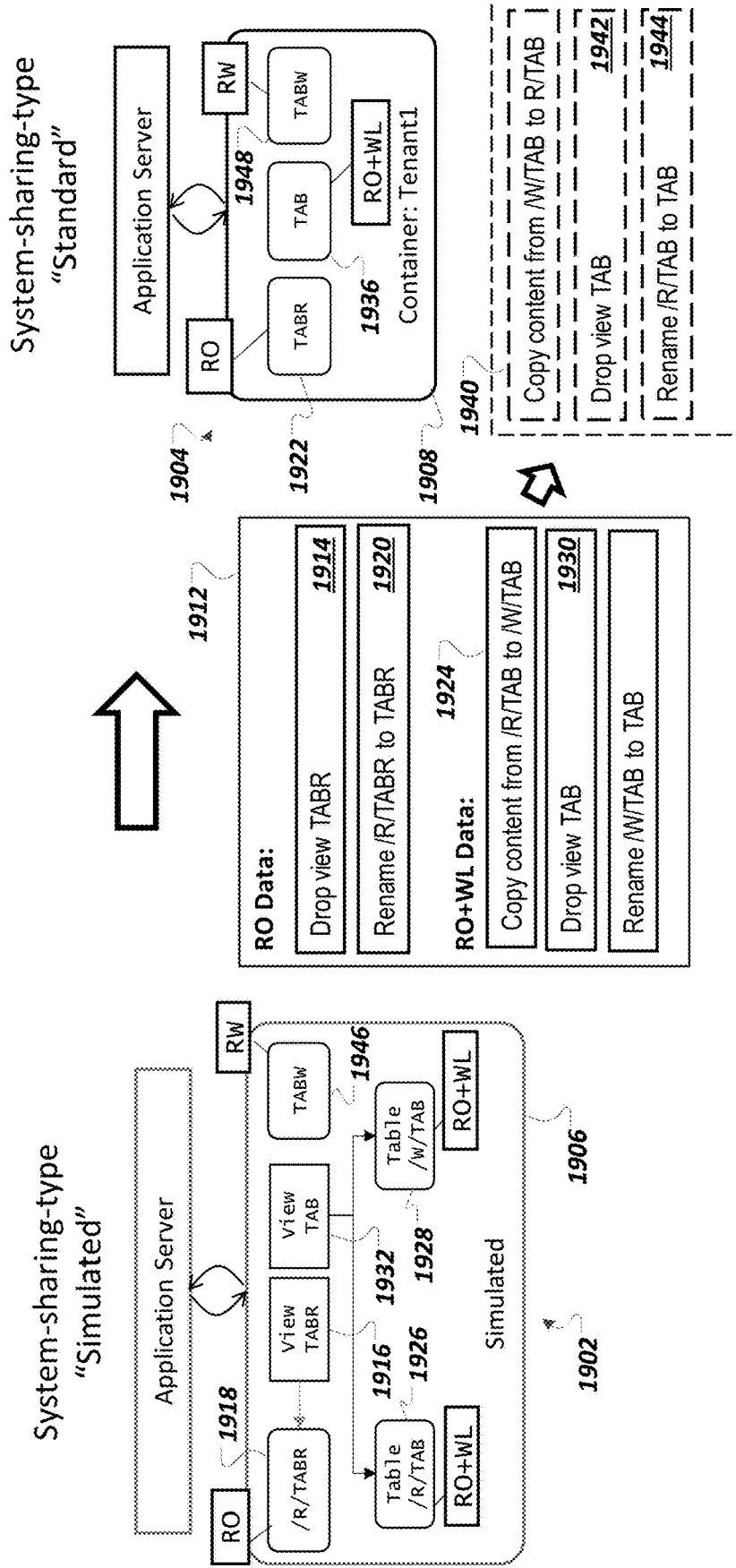
FIG. 19 illustrates a system for transitioning from a simulated system to a standard system.

FIG. 19 illustrates a system 1900 for transitioning from a simulated system 1902 to a standard system 1904. A transition from a system sharing type of simulated to a system sharing type of standard can occur, for example, if a problem is detected in the simulated system setup, and developers wish to debug the problem in a standard system setup.

The simulated system 1902 includes a pre-transition simulated database container 1906. The standard system 1904 includes a post-transition tenant database container 1908. The post-transition tenant database container 1908 is a post-transition illustration of the pre-transition simulated database container 1906 (e.g., the post-transition tenant database container 1908 and the pre-transition simulated database container 1906 can be a same container, each with different content and different points in time).

The transition from the simulated system 1902 to the standard system 1904 is described in a flowchart 1912.

At 1914, a view 1916 on a read-only table 1918 is dropped (e.g., the post-transition tenant database container 1908 does not include a view).

At 1920, the read-only table 1918 is renamed from a name of "/R/TABR" to "TABR", as illustrated by a read-only table 1922 in the post-transition tenant database container 1908.

At 1924, content is copied from a "/R/TAB" read-only table 1926 to a "/W/TAB" writable table 1928. That is, records that had been previously split into the read-only table 1926 and the writable table 1928 are now included in the writable table 1928.

At 1930, a "TAB" union view 1932 is dropped from the pre-transition simulated database container 1906 (e.g., the post-transition tenant database container 1908 does not include a union view).

At 1934, the writable table 1928 is renamed from "/W/TAB" TO "TAB", as illustrated by a writable table 1936 included in the post-transition tenant database container 1908.

Processing of writable data described in operations 1924, 1930, and 1934 can alternatively be performed by the processing described in an alternative flowchart 1938. For example, at 1940, content can be copied from the writable table 1928 to the read-only table. At 1942, the "TAB" view 1932 can be dropped. At 1944, the read-only table 1926 can be renamed from "/R/TAB" to "TAB", to become the writable table 1936.

A writable table 1946 included in the pre-transition simulated database container 1906 remains unchanged and is included in the post-transition tenant database container 1908, e.g., as a writable table 1948.

Deployment by Exchanging Shared Database Container

Changes may need to be deployed to a system during a system's lifetime, such as during maintenance and upgrade phases. Changes can include emergency patches, hot fixes, service packs and release upgrades, for example. Changes can include new content, new tables, modified content, or other changes that may need to be deployed to a shared database container and/or a tenant database container. A deployment, such as a patch, can be a shared-only patch. For example, the patch can include changes to vendor-provided objects, such as reports, classes, modules, or other objects that are only in a shared database container. Other deployments can include changes to be made to data in both a shared database container and in tenant database containers. A given software object can include data stored in a shared database container and/or a tenant database container, for example.

Challenges can arise when deploying changes to a multi-tenancy database system, since if an online shared database container is changed, those changes can be visible to tenant applications. The changes can cause inconsistencies and/or application errors. If shared content referenced or depended on by tenant data is changed, all connected tenants should generally be changed as well to ensure consistency for the tenants. To avoid inconsistencies and errors, tenants can be upgraded, which can involve taking tenants offline. Upgrading of tenants can include deployment of objects that are at least partially stored in a tenant database and post-processing for tenant objects that relate to a shared object.

If a problem occurs with a particular tenant, an attempt can be made to correct the problem during a predetermined downtime window. If the problem cannot be corrected during the available downtime window, the tenant can be reverted to connect to an earlier version of a shared container and brought back online. However, the tenant needing a connection to the earlier version of the shared container can pose a challenge for those tenants who are already connected to a new version of a shared container, if only one shared database container is used. One deployment approach can be to revert all tenants back to a prior version upon an error happening in a deployment of a respective tenant, with a later re-attempt of the deployment for all tenants. Such an approach can cause undesirable downtime for tenants, however.

To solve the issues of undesirable tenant downtime, different types of approaches can be used when deploying changes, to upgrade tenants individually and to temporarily hide changes from tenants who have not yet been upgraded. In a first approach, if a deployment includes changes to a relatively small percentage of tables in a system, such as with an emergency patch, the changes can be made to both an existing production shared database container and existing production tenant database containers. In a second approach, if changes are to be made to a relatively larger number of tables, such as during a feature release, then an approach of exchanging a shared container can be used, so that a new shared database container includes the changed data when it is inserted into the system. The new shared database container can be inserted into the system in parallel with an existing shared database container. Tenant database containers can be changed individually to connect to the new shared database container. Both approaches are described in more detail below.

As mentioned, with an exchanged shared database container approach, an existing shared database container is replaced with a new version and content is adjusted in connected tenants. The replacement approach avoids upgrading the existing shared container in place, which can reduce overall deployment runtime. A new shared database container is deployed, tenants are linked to the new shared database container, and the old shared database container can be deleted. During the deployment, the new shared database container is deployed in parallel to the old shared database container, so that both can be simultaneously accessible by tenants.

Having both shared database containers simultaneously accessible allows the deployment of the new shared container during "uptime", since tenants can still productively use the old shared database container. Then tenants can be upgraded separately (either individually or potentially multiple tenants in parallel, but each done independently). Individual tenant upgrades can allow each tenant to define an individual downtime window. A problem with one tenant upgrade does not need to prolong downtime of other tenants. Having both shared database containers simultaneously accessible also allows some tenants to temporarily remain on an old version of the software using the old shared database container while some tenants use the new version of the software with the new shared database container.

During an update of a particular tenant, views reading from the old shared database container are dropped and new views are created reading from the new shared database container. Subsequent actions are performed to deploy remaining content to the tenants. For example, if objects are stored partly in the shared database container and partly in the tenant database container, a complement of the objects being delivered with the shared database container can be deployed to the tenants. Additionally, follow-up activities can be performed in the tenant, as described in more detail below.

Figure 20:
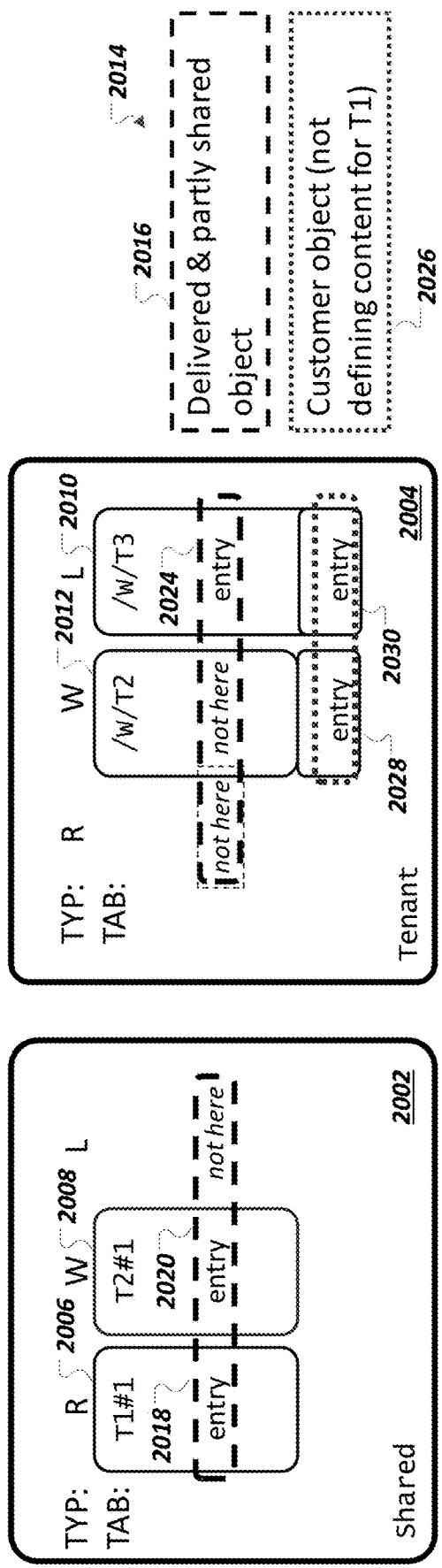
FIG. 20 illustrates a system that includes data for objects in both a shared database container and a tenant database container.

FIG. 20 illustrates a system 2000 that includes data for objects in both a shared database container 2002 and a tenant database container 2004. Objects used in business applications can be persisted in a set of database tables. Objects can be shipped by a vendor to a customer, and customers can also create custom objects (e.g. classes, configurations, user interfaces). The tables used for the persistency of an object can be all of the same table type (e.g., read-only, mixed, writable). Therefore, some objects may have data that is only in the shared database container 2002 or only in the tenant database container 2004. As another example, an object can store data in tables of different types, such as if several objects re-use a table to store data (e.g., for documentation or text elements). Accordingly, some objects may have data that is in both the shared database container 2002 and the tenant database container 2004. Thus, an object deployment can be split into two parts: a deployment to a shared database container and a deployment to tenant database container(s).

The shared database container 2002 includes a read-only table T1 2006 and a read-only table 2008 T2#1 that stores read-only records for a mixed table named T2. The tenant database container 2004 includes a writable table 2010 and a writable table 2012 that stores writable tenant records for the T2 mixed table.

A style key 2014 shows a dashed-line style 2016 used to mark entries in the shared database container 2002 and the tenant database container 2004 that correspond to a first object that includes both vendor and customer data. For example, a first entry 2018 and a second entry 2020 represent shared vendor data being stored for the first object in the read-only table 2006 and the read-only table 2008, respectively, in the shared database container 2002. A third entry 2024 represents tenant data being stored for the first object in the writable table 2010, in the tenant database container 2004. In this example, the first object does not store data in the writable table 2012.

The style key 2014 shows a dotted line style 2026 used to mark entries 2028 and 2030 in the tenant database container 2004. The entries 2028 and 2030 represent tenant data being stored for a second object in the writable table 2012 and the writable table 2010 respectively. The second object is a customer object that includes writable customer data and no shared read-only data.

Figure 21A:
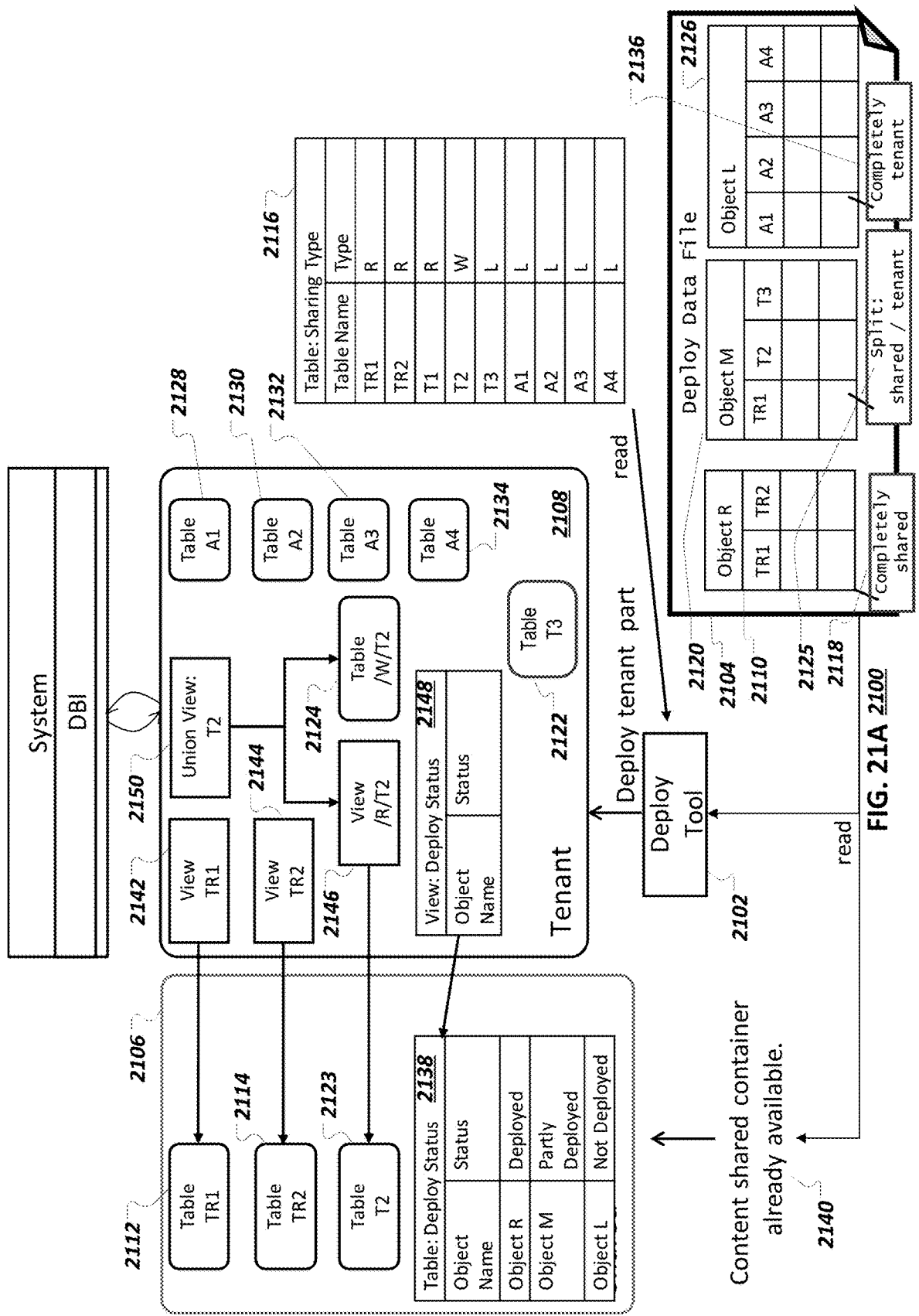
FIGS. 21A-B illustrates example systems for deploying changes to objects in a database system.

FIG. 21A illustrates an example system 2100 for deploying changes to objects in a database system. A deployment tool 2102 can determine, from a deploy data file 2104, which objects have changes to be deployed, which tables are to be updated with changes to a given object, and whether each object has changes to be made to a shared database container 2106, a tenant database container 2108, or both the shared database container 2106 and the tenant database container 2108. For example, the deployment tool 2102 can determine, from information in the deploy file 2104, that an object "R" 2110 includes data in a TR1 table 2112 and a TR2 table 2114. The deployment tool 2102 can determine, from metadata in a sharing type table 2116 (which may exist in the shared database container 2106 or another location), that the TR1 table 2112 and the TR2 table 2114 are read-only tables. Accordingly, the deployment tool 2102 can determine that the object "R" is a completely-shared table (e.g., exists only in the shared database container 2106), as illustrated by note 2118.

As another example, the deployment tool 2102 can determine, from information in the deploy file 2104, that an object "M" 2120 includes data in the TR1 table 2112, a T2 table, and a T3 table 2122. The deployment tool 2102 can determine, from metadata in the sharing type table 2116, that the TR1 table 2112 is a read-only table and that the T3 table 2122 is a local table. The deployment tool 2102 can determine that the T2 table is a split table (and thus implemented as a read-only table 2123 in the shared database container 2106 and a writable table 2124 in the tenant database container 2108). The deployment tool 2102 can determine that content for the object "M" is split, between the shared database container 2106 and the tenant database container 2108, as illustrated by note 2125.

As yet another example, the deployment tool 2102 can determine, from information in the deploy file 2104, that an object "L" 2126 includes data in an A1 table 2128, an A2 table 2130, an A3 table 2132, and an A4 table 2134. The deployment tool 2102 can determine, from metadata in the sharing type table 2116, that the A1 table 2128, the A2 table 2130, the A3 table 2132, and the A4 table 2134 are each local tables. Accordingly, the deployment tool 2102 can determine that the object "R" is a completely-tenant table (e.g., exists only in the tenant database container 2108), as illustrated by note 2136.

During deployment, the deployment tool 2102 can track deployment status and can know what objects have been deployed, whether partially or completely. For example, the deployment tool 2102 can update a deploy status table 2138 that indicates, that at a current point in time, the object "R" 2110 has been completely deployed, the object "M" 2120 has been partially deployed, and the object "L" has not yet been deployed.

When using the exchanged shared database approach, objects that exist only in the shared database container 2106 are updated when a new shared database container is installed. Accordingly, and as illustrated by note 2140, the deployment tool 2102 does not deploy content to the existing shared database container 2106, rather, shared database container content is available in the new shared database container (not shown in FIG. 21A). The deploy status table 2138 can be updated and populated when preparing the new shared database container, to indicate, for example, that the completely-shared object "R" is already deployed (e.g., already in the new shared database container), that the object "M" is partially-deployed (e.g., shared portions of the object "M" are already in the new shared database container at the start of the deployment, in the TR1 table 2112 and the T2 table 2123), and that the object "L" has not yet been deployed. The remaining part of the object "M", and the object "L" will be deployed as part of a tenant deployment.

A deploy to tenant can include deploying portions of an object that are stored in a local table or in a local part of a mixed table. For example, deployment for the object "M" to a tenant can include deployment of data to the writable table 2124 and/or to the local table 2122. Deployment for the object "L" to a tenant can include deployment to the local tables A1 2128, A2 2130, A3 2132 and A4. Tenant deployment can also include dropping of views to the shared database container 2106 (e.g., views 2142, 2144, 2146, and 2148) and the updating of union views, such as a union view 2150.

Figure 21B:
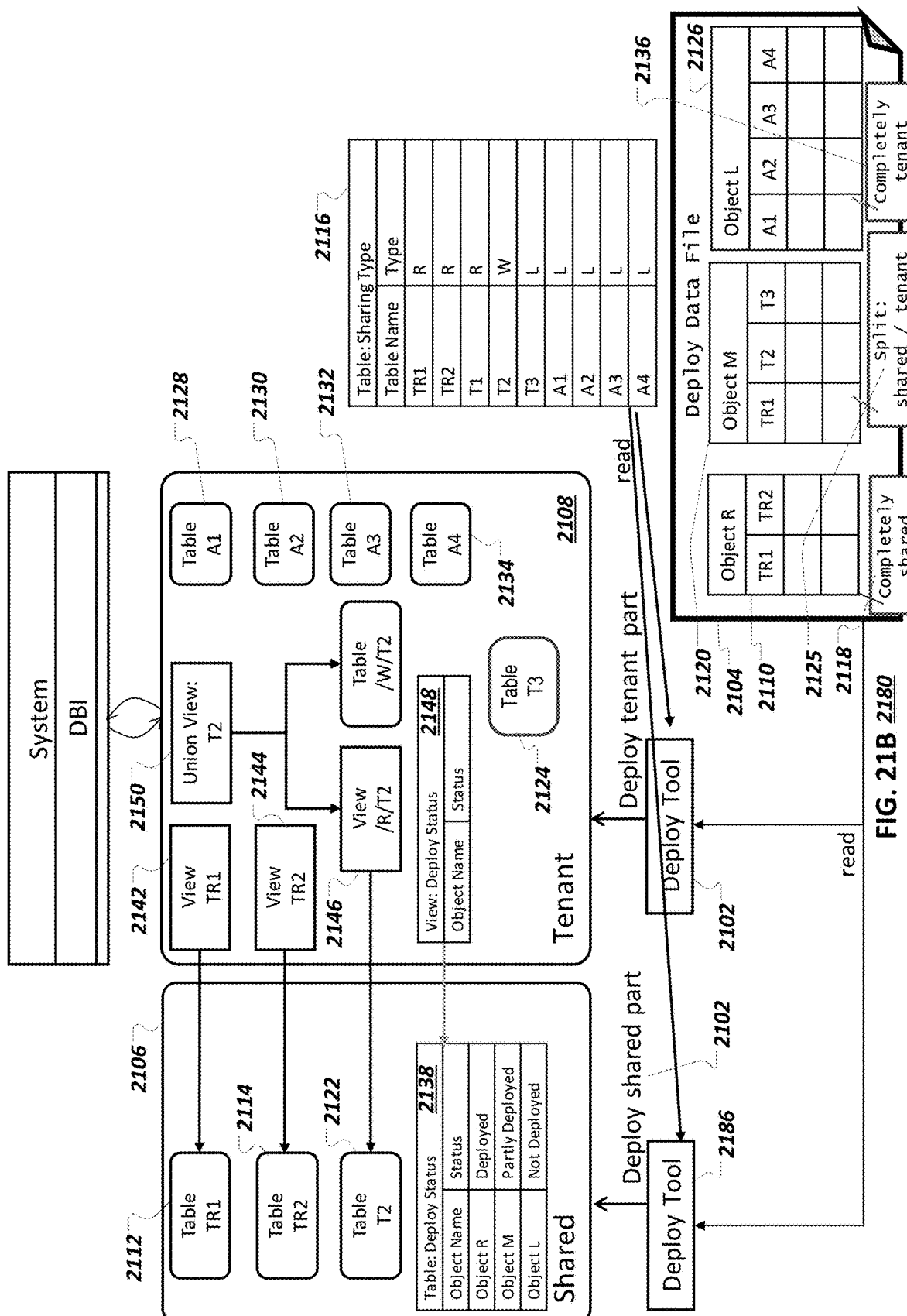

FIG. 21B illustrates an example system 2180 for deploying changes to objects in a database system. The system 2180 is an illustration of the system 2100 when a deployment uses an approach of modifying, rather than exchanging, an existing shared database container (e.g., during deployment of an emergency patch). As indicated by note 2184, a deployment tool 2186 (which can be the same as the deployment tool 2102) can deploy changes to objects that are completely or partially stored in the shared database container 2106. For example, deployment to the shared database container 2106 can include modification, in place, of the read-only table 2114 and the read-only table 2112 when deploying the object "R" and modification, in place, of the read-only table 2114 and the read-only table 2122 when deploying the object "M". The deployment status table 2138 can be updated as the deployment process proceeds. Deployment of patches is described in more detail below.

Figure 22:
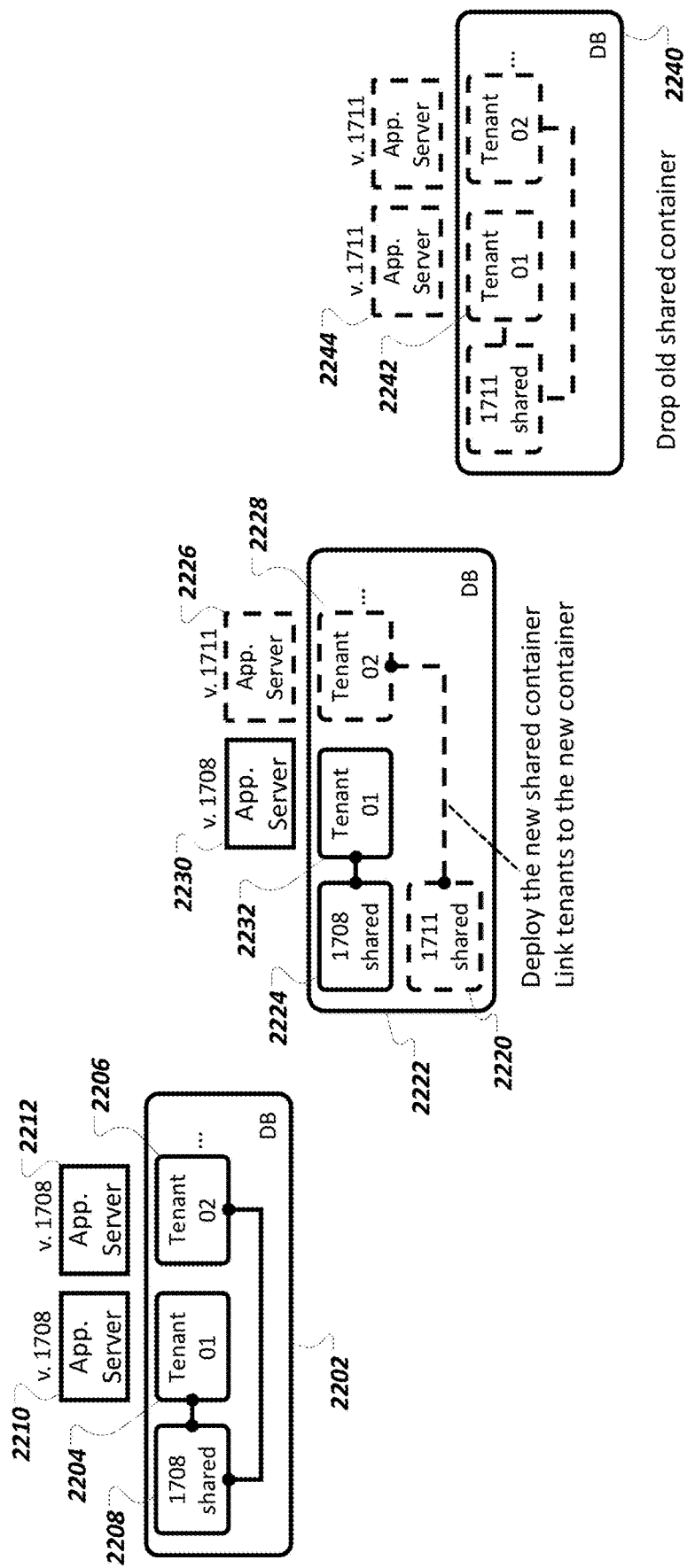
FIG. 22 illustrates an example system for upgrading a multi-tenancy database system using an exchanged shared database container approach.

FIG. 22 illustrates an example system 2200 for upgrading a multi-tenancy database system 2202 using an exchanged shared database container approach. The multi-tenancy database system 2202 includes a first tenant database container 2204 and a second tenant database container 2206 that are each connected to a shared database container 2208, with each of the first tenant database container 2204, the second tenant database container 2206 and the shared database container 2208 at a particular version (e.g., version "1708"). A first application server 2210, also at the version "1708", sends queries to the first tenant database container 2204, for data in the first tenant database container 2204 and/or in the shared database container 2208. Similarly, a second application server 2212, also at the version "1708", sends queries to the second tenant database container 2206, for data in the second tenant database container 2206 and/or in the shared database container 2208.

When a new version of an application and/or database is to be deployed, a new shared database container that includes shared database container changes as compared to a current version can be deployed, as illustrated by a new shared database container 2220, at a new version (e.g., version "1711"), in a database system 2222. The new shared database container 2220 is included in the database system 2222 in parallel along with a current-version (e.g., version "1708") shared database container 2224. A naming convention can be used to name the new shared database container 2220 and the current-version shared database container 2224, to ensure uniqueness of shared database container names. For example, shared database containers can be named using a combination of a product name and a version number.

Tenants can be linked, one at a time, to the new shared database container 2222. For example, a second application server 2226 and a second tenant database container 2228 have been upgraded to the new version (e.g., version "1711"), with the second tenant database container 2228 now linked to the new shared database container 2220. A first application server 2230 and a first tenant database container 2232 are still at the old version (e.g., version "1708"), and the first tenant database container 2232 is still connected to the current-version shared database container 2224. The first tenant database container 2232 can be identified as a next tenant database container to upgrade.

For example, a database system 2240 includes a first tenant database container 2242 and a first application server 2244 now at the new version (e.g., version "1711"), with the first tenant database container 2242 now connected to a new shared database container 2244 also at the new version. The old database container (e.g., what was the current-version database container 2224) has been dropped, and is not included in the database system 2240, since all tenants are now connected to the new shared database container 2242.

Figure 23:
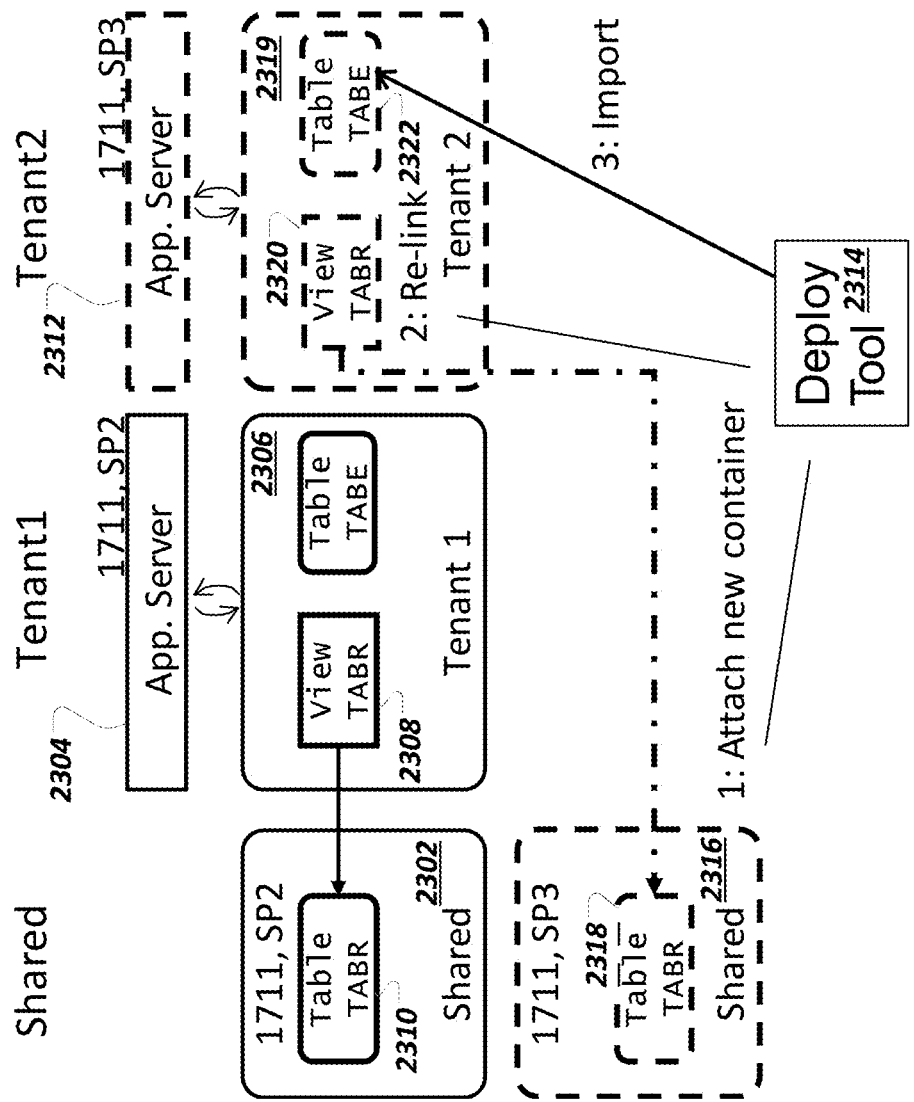
FIG. 23 illustrates an example system for deploying a new service pack to a multi-tenancy database system.

FIG. 23 illustrates an example system 2300 for deploying a new service pack to a multi-tenancy database system. The system 2300 includes an existing shared database container 2302 at a version of "1231" and service pack two (SP2). An application server 2304 and a tenant database container 2306 for a first tenant are also at the version "1231" and SP2. The existing shared database container 2302, the tenant database container 2306, and respective included components, are illustrated in a solid line, to denote being at version "1231" and SP2. A view 2308 provides access to a TABR read-only table 2310 in the existing shared database container 2302. A second tenant served by an application server 2312 has been upgraded to a new service pack level (SP3), as described below.

A deployment tool 2314 can attach, to the system 2300, a new shared database container 2316 that has been configured to be at a next service pack (SP3). The new shared database container 2316 includes a new TABR read-only table 2318 that includes change for the new service pack. The deployment tool 2314 can, when upgrading the second tenant, drop, from a tenant database container 2319, a view to the TABR read-only table 2310 in the existing shared database container 2302 and add a new view 2320 to the new TABR read-only table 2318 in the new shared database container 2316. The deployment tool 2314 can import changes to a writable table 2322, so that the writable table 2322 is at the new service pack level. The tenant database container 2319, the new shared database container 2316, and respective included components, are illustrated in a dashed line to denote being at SP3. The deployment tool 2314 can, at a later time, perform deployments operations similar to those done for the second tenant to upgrade the first tenant, so that both are at SP3. The existing shared database container 2302 can be dropped after all tenants have been upgraded.

Figure 24:
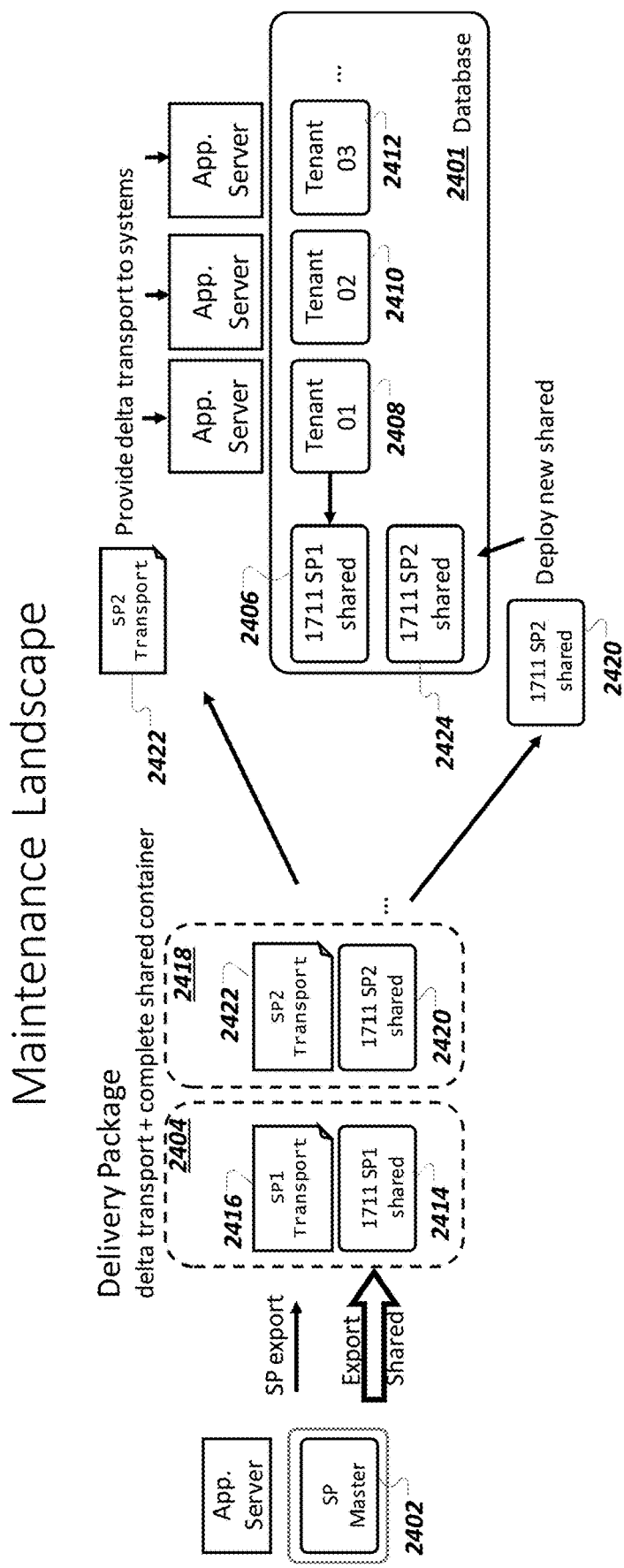
FIG. 24 illustrates an example system for maintenance of a database system.

FIG. 24 illustrates an example system 2400 for maintenance of a database system 2401. In preparation for a deployment, a service pack (SP) master 2402 can be used to create a delivery package. For example, the SP master 2402 may have been used to create a delivery package 2404 when deploying a SP1 service pack to the database system 2401. A SP1 shared database container 2406 and tenant database containers 2408, 2410, and 2412 are each at the SP1 level, for example. The SP1 shared database container and the tenant database containers 2408, 2410, and 2412 can be referred to as a cluster. The delivery package 2404 may have been created for a past deployment to the cluster. The delivery package 2404 includes a copy 2414 of the SP1 shared database container 2406 and a transport file 2416 that includes changes that had been imported to the tenant database containers 2408, 2410, and 2412 during the deployment of the SP1 service pack.

The SP master 2402 can create a new delivery package 2418 that includes a new SP2 shared database container 2420 and a transport file 2422 that include changes for a new service pack (SP2). The new SP2 shared database container 2420 can be attached to the database system 2401, as illustrated by an attached SP2 shared database container 2424.

Objects, such as views, in the tenant database containers 2408, 2410, and 2412 can be detached from the SP1 shared database container 2406 and connected to the attached SP2 shared database container 2424. The transport file 2422 can be applied to the tenant database containers 2408, 2410, and 2412, to upgrade them to a SP2 level. After all tenants have been upgraded, the SP1 shared database container 2406 can be dropped.

Figure 25:
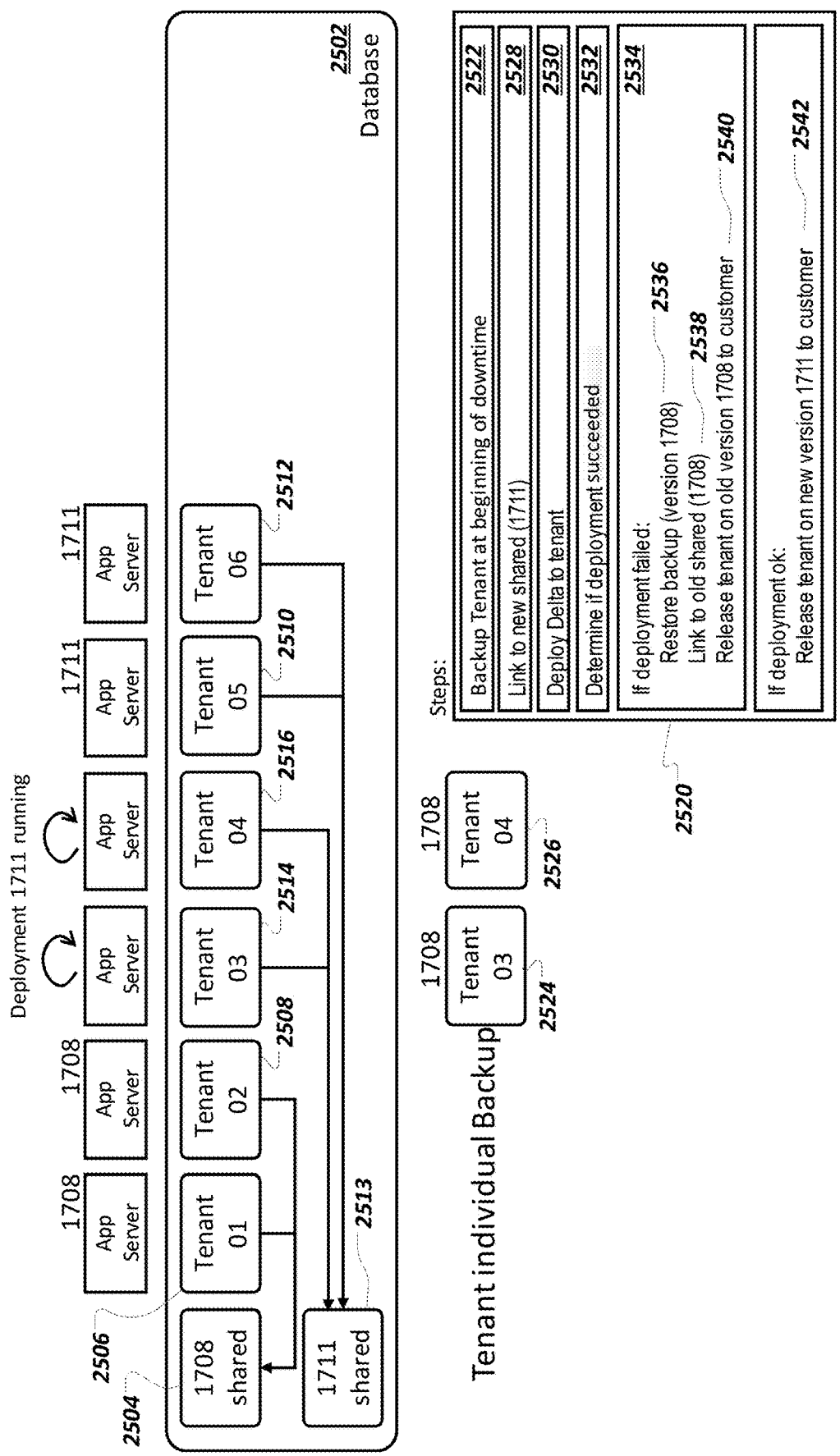
FIG. 25 illustrates an example system for upgrading a multi-tenancy system to a new version.

FIG. 25 illustrates an example system 2500 for upgrading a multi-tenancy system 2502 to a new version. The multi-tenancy system 2502 is in a state of partial completion of upgrading from an old "1708" version to a new "1711" version. As shown in the system 2500, at a same given time, some tenants can use, in production, a prior (e.g., "start") release shared database container, while other tenants use a new (e.g., "target") release shared database container, while still other tenants are offline and being upgraded to the new release.

For example, the multi-tenancy system 2502 includes a version "1708" shared database container 2504. Tenant database containers 2506 and 2508 (e.g., "Tenant 01" and "Tenant 02", respectively) are also at version "1708" and are connected to the version "1708" shared database container. Tenant database containers 2510 and 2512 (e.g., "Tenant 05" and "Tenant 06", respectively) have been converted to the version "1711" and are now connected to a version "1711" shared database container 2513 that has been added to the multi-tenancy system 2502 during the upgrade. Tenant database containers 2514 and 2516 (e.g., "Tenant 03" and "Tenant 04", respectively) are currently being upgraded.

An overview of an upgrade process for a given tenant is outlined in a flowchart 2520. At 2522, the given tenant is backed up at a beginning of a downtime period. For example, a backup 2524 of the tenant database container 2514 and a backup 2526 of the tenant database container 2516 have been created.

At 2528, a link to the new (e.g., version "1711") shared database container 2513 is established. For example, new views can be established, as described in more detail below in FIGS. 26-31.

At 2530, a delta is deployed to the tenant. The delta can be included in a transport file, and can include changes to be applied to tables in the given tenant database container.

At 2532, a determination is made as to whether the deployment succeeded. If the deployment did not succeed, processing operations 2534 are performed. Processing operations 2534 include: restoring, at 2536, the backup (e.g., at version "1708", such as the backup 2524 for the tenant database container 2514); establishing a link, at 2538, to the old (e.g., "version 1708") shared database container 2504; and releasing, at 2540, the given tenant on the old version "1708" to the customer. Establishing the link, at 2538, can include restoring views to tables in the "version 1708" shared database container 2504. Deployment can be re-attempted at a later time. If the deployment succeeded, the tenant is released, at 2542, on the new version "1711" to the customer.

FIGS. 26 to 31 progressively illustrate, in further detail, various stages of an upgrade process for upgrading a database system to a new version, using an exchanged shared database container approach. The exchanged shared database container approach can also be used for deployment of a service pack or patch.

Figure 26:
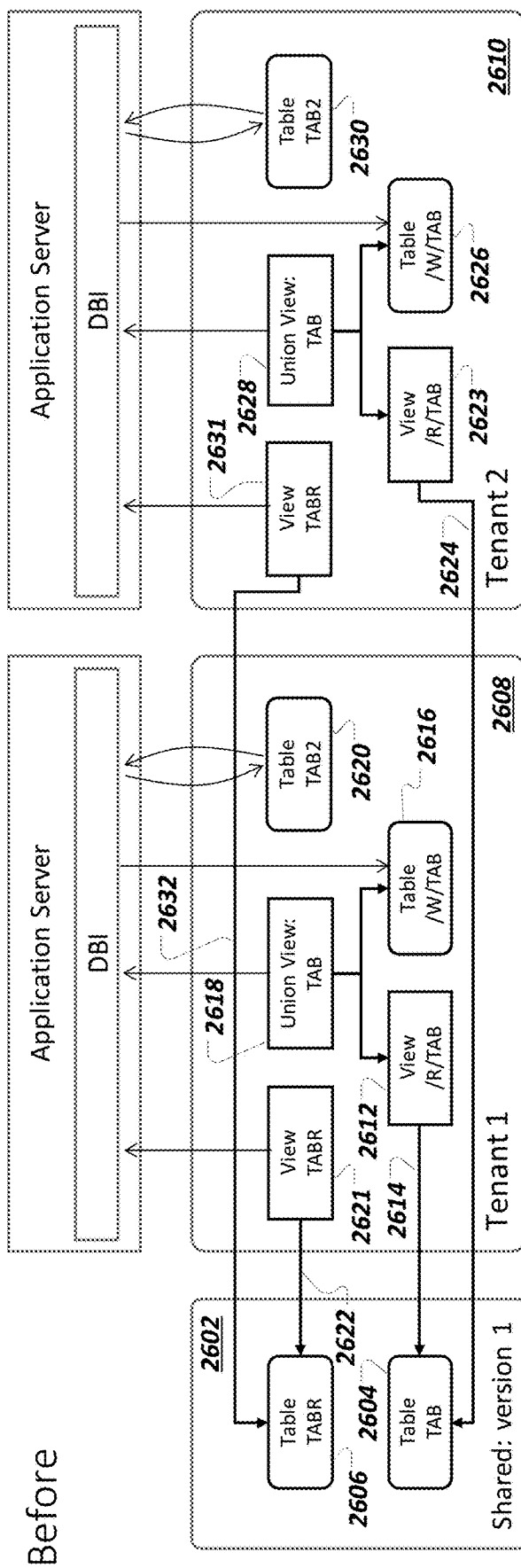
FIG. 26 illustrates an example system before deployment of a new database version using an exchanged shared database container approach.

FIG. 26 illustrates an example system 2600 before deployment of a new database version using an exchanged shared container approach. The system 2600 includes a shared database container 2602 that includes a current version of a read-only table 2604 that is a shared portion of a mixed table named "TAB". The shared database container 2602 also includes a read-only table 2606. The system 2600 includes a first tenant database container 2608 for a first tenant and a second tenant database container 2610 for a second tenant.

The first tenant database container 2608 includes a view 2612 to the read-only table 2604 (illustrated as an arrow 2614), a writable table 2616 that is a local portion of the mixed table, a union view 2618 providing unified access to the read-only table 2604 and the writable table 2616, a writable table 2620, and a view 2621 to the read-only table 2606 (illustrated as an arrow 2622). Similarly, the second tenant database container 2610 includes a view 2623 to the read-only table 2604 (illustrated as an arrow 2624), a writable table 2626 that is a local portion of the mixed table, a union view 2628 providing unified access to the read-only table 2604 and the writable table 2626, a writable table 2630, and a view 2631 to the read-only table 2606 (illustrated as an arrow 2632).

Figure 27:
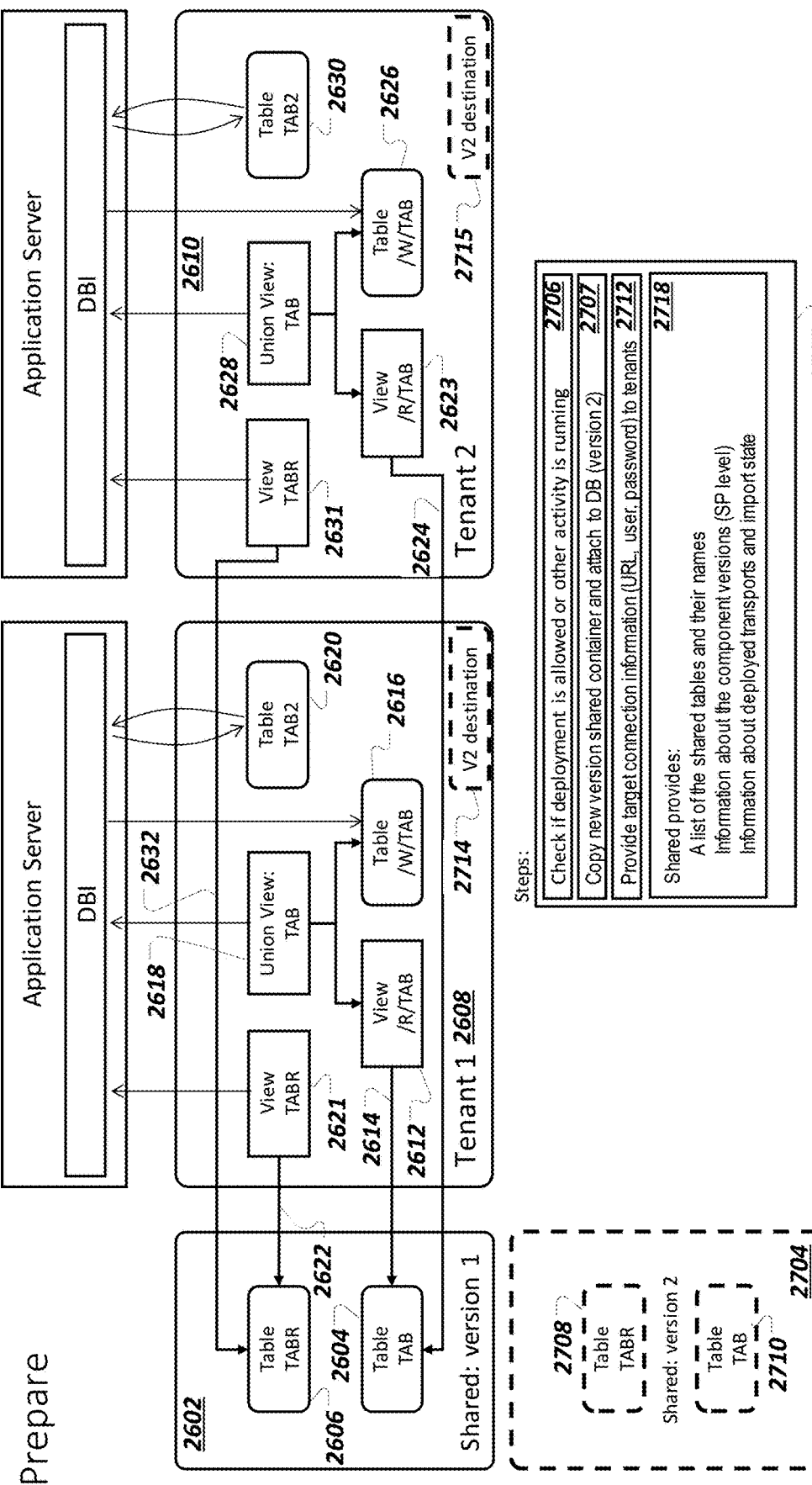

FIG. 27 is an illustration of a system 2700 that is upgraded in part by exchanging a shared database container. The system 2700 is a view of the system 2600 during a first set of deployment operations, for preparing a shared database container. In summary, a new shared database container 2704 can be deployed in parallel to an existing, in-production shared container (e.g., the shared database container 2602), without disrupting the operation of the existing shared database container 2602.

The first set of deployment operations, for preparing the shared database container 2704, are outlined in a flowchart 2705.

At 2706, a determination is made as to whether the deployment is allowed or other activity is running. If the deployment is not allowed and/or other activity is running that is not allowed during a deployment, the deployment ends.

If the deployment is allowed, the new (e.g., version 2) shared database container 2704 is copied and attached to the database, at 2707. The new shared database container 2704 is a container included in a delivery package and created at the vendor, it contains a new software version (e.g., a copy of the shared database container 2420, brought together with the tenant part delivered with 2807). The new shared database container 2704 includes a read-only table 2708 that is a copy of a shared table included in the service pack master 2402.

At 2712, target connection information (e.g., URL, user name, password) is provided to tenants. For example, the target connection information, such as an address of the new shared database container 2704, can be made available to the first tenant database container 2608 and the second tenant database container 2610. Information about the new shared database container 2704 can be published to the tenants, so the tenants can read new shared database container content. Read-only access to objects in the shared container can be granted to tenants.

As another example, the target connection information can be provided to a deployment tool that will respectively upgrade the first tenant and the second tenant. As indicated by indicators 2714 and 2715, respectively, the first tenant database container 2608 and the second tenant database container 2610 can be designated as version two ("V2") destinations (e.g., upgrade targets).

At 2718, information is provided from the new shared database container 2704, such as to the deployment tool, including a list of shared tables, information about component versions (e.g., service pack levels), and information about deployed transports and import state. The deployment process continues as described below for FIG. 28.

FIG. 28 is an illustration of a system 2800 that is upgraded in part by exchanging a shared database container. The system 2800 is a view of the system 2600 during a second set of deployment operations, for deploying to a first tenant. The second set of operations are outlined in a flowchart 2802.

At 2804, connectivity and new shared space information is obtained. For example, connectivity information to connect the first tenant database container 2608 to the new shared database container 2708 can be provided to the first tenant database container 2608 and/or to a deployment tool. For example, an address of the new shared database container 2708 can be provided to the deployment tool.

At 2806, a new shared space version and matching service pack level is determined. For example, the deployment tool can ensure that a version of the new shared database container 2708 matches a version of a delta deployment package 2807. The delta deployment package 2807 is, for example, a file that was prepared before initiation of the deployment. Creating the delta deployment package 2807 can include identifying objects that are partially included in the new shared database container 2704 and computing the remaining deployment parts (i.e. local content portions of those objects and changes to those local content portions that are to be part of the deployment). Creating the delta deployment package 2807 can also include identifying objects that are completely stored in tenant containers and identifying changes to those objects that are to be part of the deployment.

At 2808, "drop/create" or "alter" statements for views reading from shared tables are computed. For example, drop statements for views to the read-only table 2606 and the read-only table 2604 can be prepared. For example, drop statements dropping the view 2631 (illustrated as the arrow 2632), the view 2621 (illustrated as the arrow 2622), the view 2612 (illustrated as the arrow 2614), and the view 2623 (illustrated as the arrow 2624) can be prepared. Respective create view statements for creating new views in the first tenant database container 2608 and in the second tenant database container 2610 to the read-only table 2708 and the read-only table 2710 can be prepared.

In general, the new shared database container 2704 can include more or less tables than the shared database container 2602. Therefore, a set of views to be created depends on the contents of the new shared database container 2704. The new shared database container 2704 can include an administrative table (not shown) that includes a list of tables included in the new shared database container 2704. The administrative table can be read, so that statements can be prepared that will, when executed, drop views to all tables in the shared database container 2602 and create new views for all tables in the new shared database container 2704.

At 2810, a target destination and table names are read, and statements are computed, for data to be transported to tenant database containers.

At 2812, structure adjustment(s) to local tables are computed. For example, the deployment can include changes to the writable table 2616 and/or the writable table 2620 in the first tenant database container 2608. As another example, the deployment can include changes to the writable table 2626 and/or the writable table 2630 in the second tenant database container 2610.

Statement(s) (e.g., alter statement(s)) to adjust the structure of these writable/local tables can be computed, for later execution, as described below. If the structure of the writable table 2616 is to be adjusted, a statement to re-create the union view 2618 can be prepared, to create a view that includes the updated structure of the writable table 2616. The deployment process continues as described below for FIG. 29.

Figure 29:
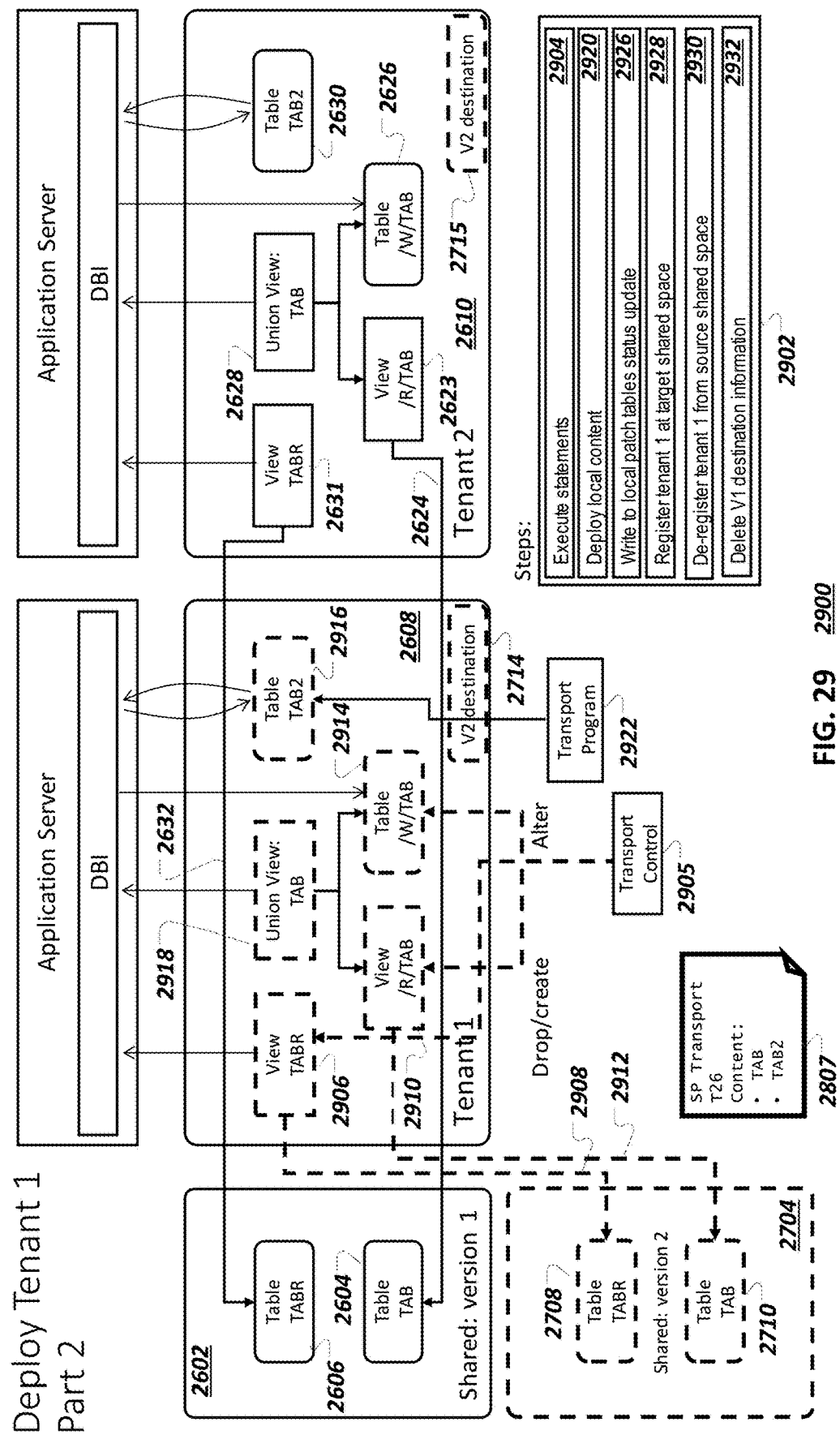

FIG. 29 is an illustration of a system 2900 that is upgraded in part by exchanging a shared database container. The system 2900 is a view of the system 2600 during a third set of deployment operations, for completing a deployment to a first tenant. The third set of operations are outlined in a flowchart 2902.

At 2904, previously-prepared statements are executed. For example, previously-prepared drop-view statements, to drop views to the shared database container 2602 (e.g., the views 2612 and 2621 illustrated as the arrows 2614 and 2622, respectively, on previous figures) can be executed, by a transport control component 2905. New views can be created, used previously-prepared create-view statements, to create new views, to the read-only table 2708 and the read-only table 2710 in the new shared database container 2704, in the first tenant database container 2608. For example, a view 2906 to the read-only table 2708 can be created (with the connection illustrated as an arrow 2908). As another example, a view 2910 to the read-only table 2710 can be created (with the connection illustrated as an arrow 2912).

The transport control component 2905 can also execute previously-prepared alter statements, to adjust structures of local tables, as illustrated by an updated writable table 2914 and an updated writable table 2916. If the structure of the writable table 2914 is new and/or the structure of the view 2910 is new (e.g., as compared to the read-only view 2612), the transport control component 2905 can execute a statement to create a new union view 2918 to replace the union view 2618.

At 2920, local content is deployed. For example, a transport program 2922 can copy data from the delta deployment package 2807 to the updated writable table 2916. As another example, the transport program 2922 can copy data from the delta deployment package 2807 to the updated writable table 2914. In general, the local content can include content that is the local portion of objects that are partially stored in the new shared database container 2704 and partially stored in the first tenant database container 2608. Local content can also include content for objects that are completely stored in the first tenant database container 2608 and not stored in the new shared database container 2704.

At 2926, a status update is written to local patch tables. For example, status information indicating that the first tenant has been upgraded to version two can be stored, such as in an administrative table in the new shared database container 2704 (not shown) or in another location.

At 2928, the first tenant is registered at a target shared space. For example, the first tenant database container 2608 can be registered, in an administrative table in the new shared database container 2704, as being connected to the new shared database container 2704.

At 2930, the first tenant is de-registered from the source shared space. For example, an entry can be deleted (or marked as inactive) in an administrative table in the shared database container 2602, with the deletion or the marking as inactive indicating that the first tenant database container 2608 is no longer connected to the shared database container 2602.

At 2932, version one destination information is deleted. The deployment process continues as described below for FIG. 30.

Figure 30:
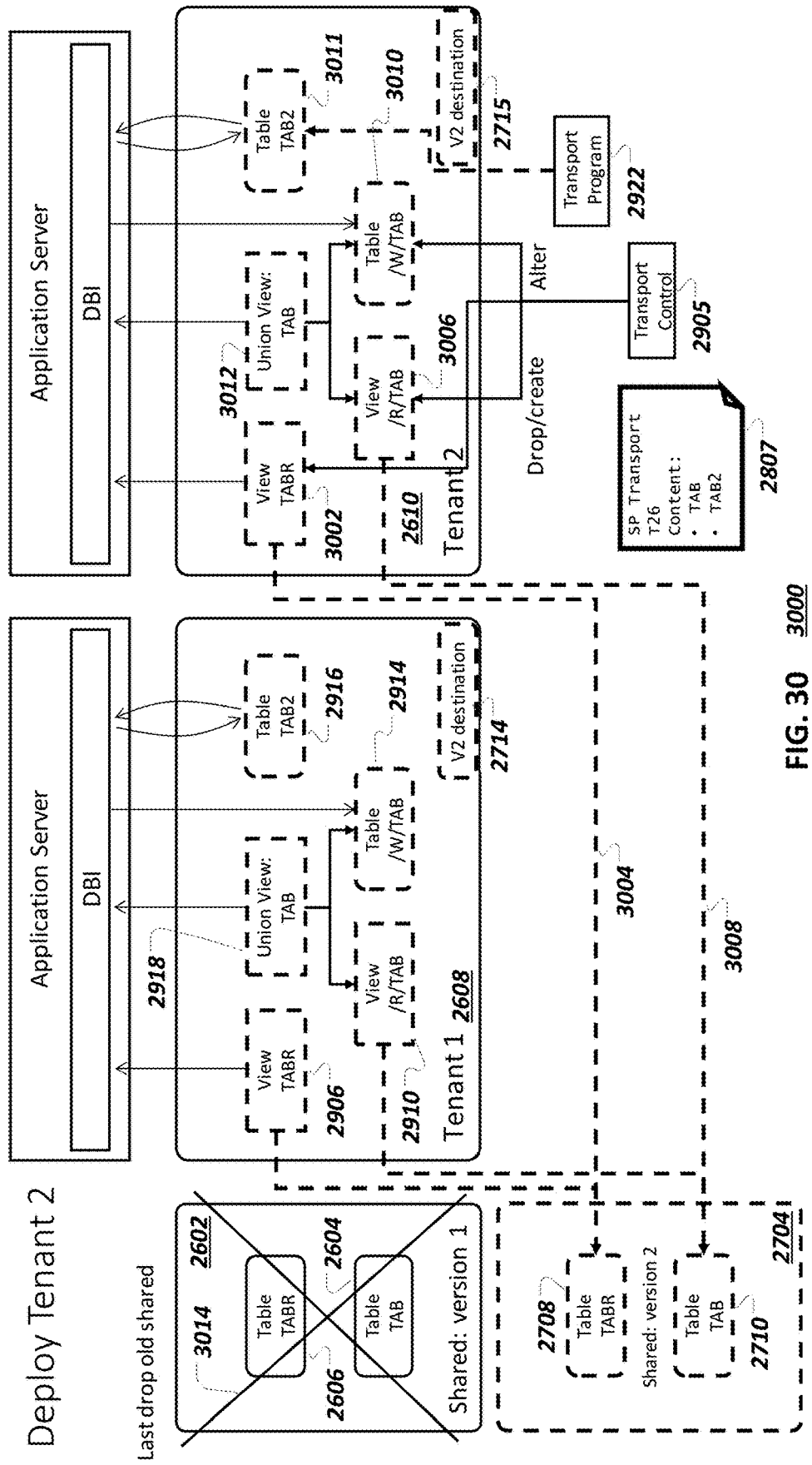

FIG. 30 is an illustration of a system 3000 that is upgraded in part by exchanging a shared database container. The system 3000 is a view of the system 2600 during a fourth set of deployment operations, for deploying to a second tenant. Deployment of the second tenant can include a same set of operations as performed for the first tenant, as described above for FIG. 28 and FIG. 29.

Deployment for the second tenant can include the dropping, in the second tenant database container 2610, of views to the shared database container 2602 (e.g., the views 2623 and 2631, illustrated as the arrows 2624 and 2632, respectively, on previous figures). Deployment for the second tenant can include the creating of new views, to the read-only table 2708 and the read-only table 2710, in the new shared database container 2704, as illustrated by a new view 3002 and arrow 3004, and a new view 3006 and arrow 3008.

Deployment for the second tenant can include the adjustment of and deployment of content to local tables, as illustrated by an updated writable table 3010 and an updated writable table 3011. An updated union view 3012 can be created to reflect updated structure(s) of the updated writable table 3010 and/or the new view 3002. Once all tenants have been upgraded, the shared database container 2602 can be dropped, as illustrated by an "X" 3014.

Figure 31:
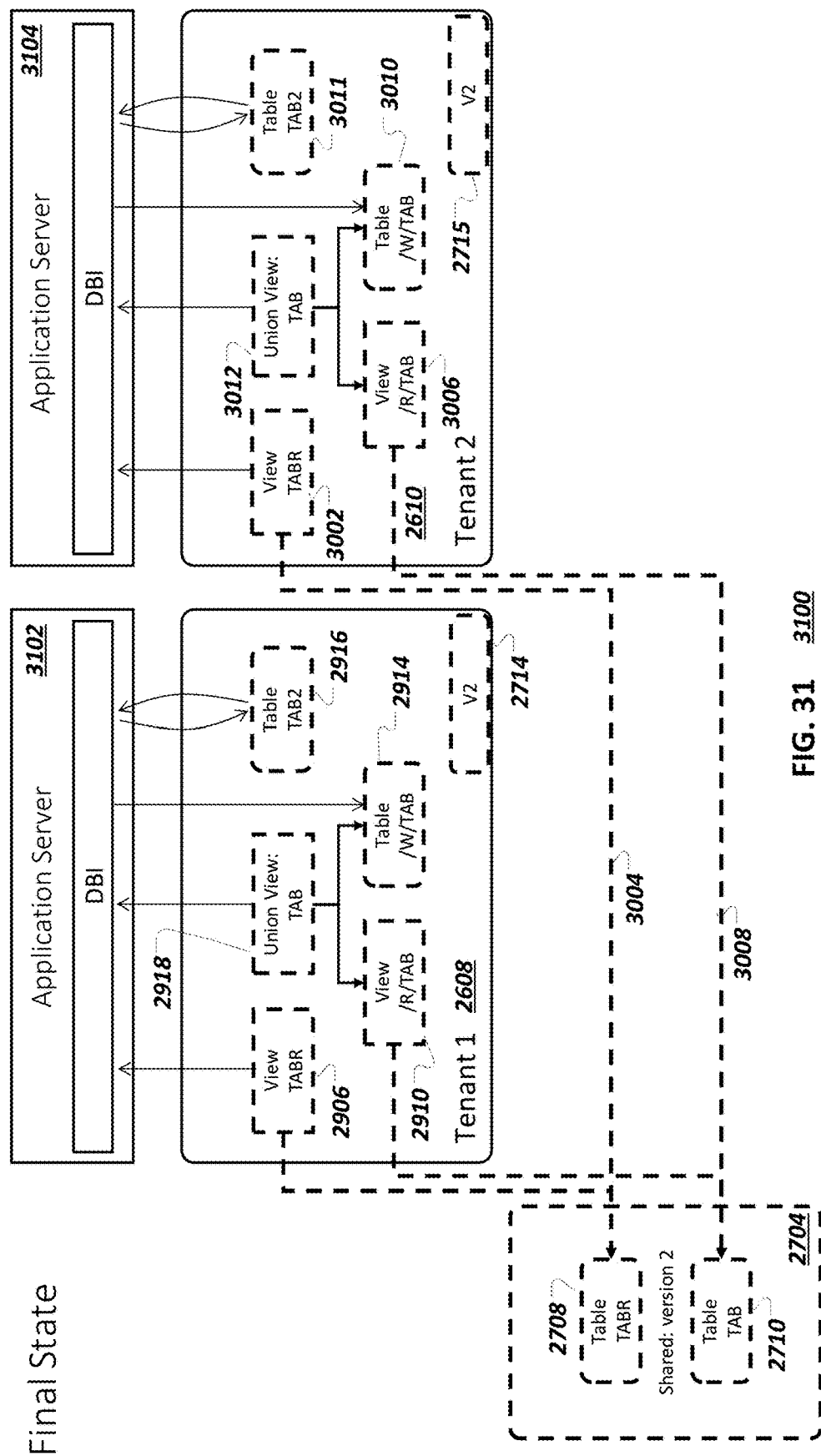

FIG. 31 is an illustration of a system 3100 that is upgraded in part by exchanging a shared database container. The system 3100 is a view of the system 2600 in a final state, after deployment to all tenants, including the first tenant database container 2608 and the second tenant database container 2610, has been completed. The shared database container 2602 has been dropped and is no longer included in the system 3100. The shared database container 2602 can be dropped, for example, after test(s) have been performed to ensure that all tenants are using the new shared database container 2704. Completing a deployment can also include performing other tests, such as to ensure that all parts of all objects to be changed in the new version have been deployed.

Other finalization tasks can include triggering after-deployment activities in each tenant database container for changed shared content, including performing post actions for objects. Post actions can include invalidating table buffers (e.g., that store previously read shared content) in an application server 3102 and/or an application server 3104 (the application servers 3102 and 3104 being different or a same server) for tables that have been switched to read from the new shared database container 2704, invalidating previously-compiled objects, triggering re-compile of objects to now read from the new shared database container 2704, re-generating tenant-specific objects that depend on shared content and tenant content, and calling other application-specific follow-up actions related to the deployment of changed content in a tenant. After-deployment actions can ensure that objects are consistent with deployed content.

Patching Content Across Shared and Tenant Database Containers

Figure 32:
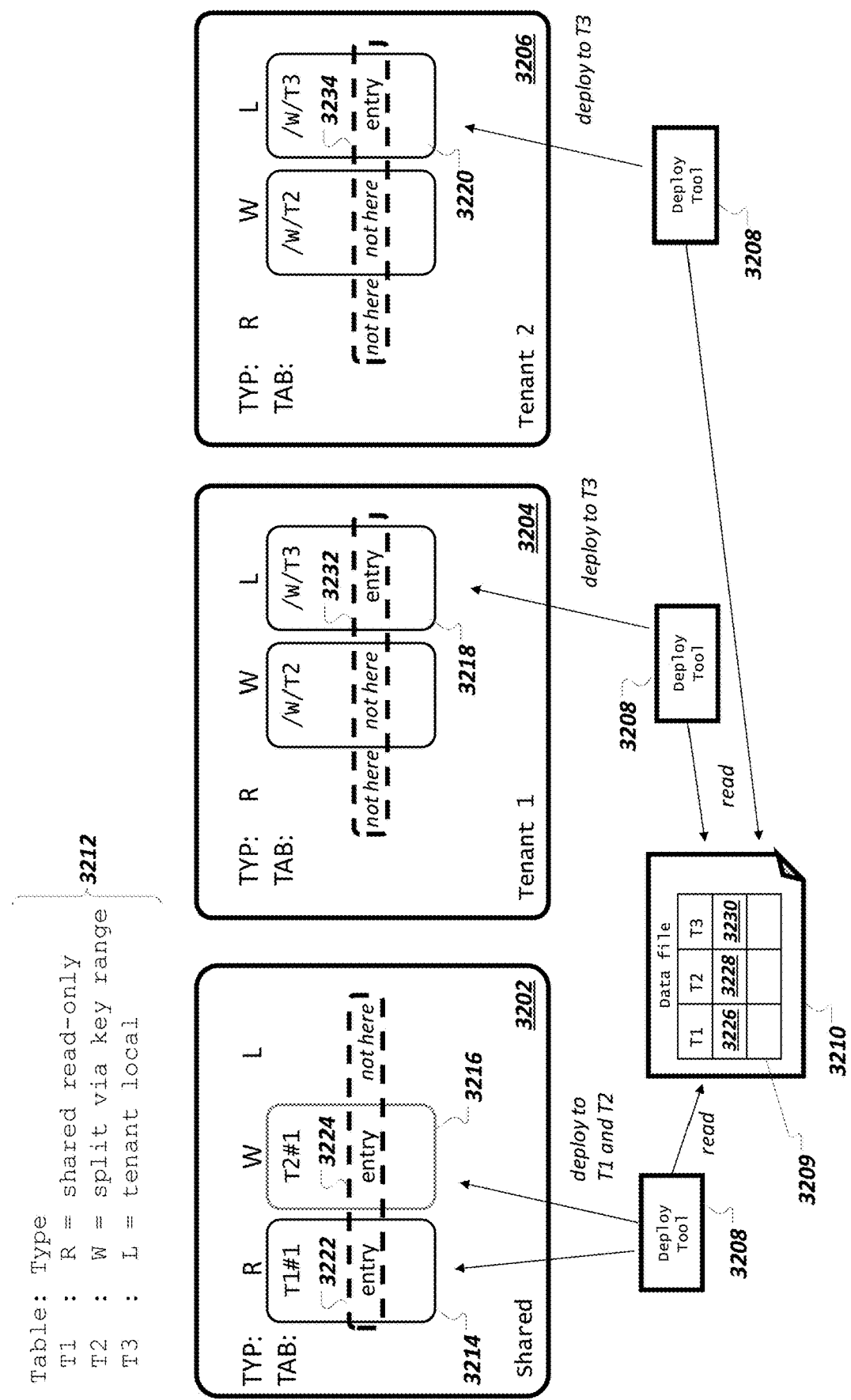
FIG. 32 illustrates a system for deploying changes to objects.

FIG. 32 illustrates a system 3200 for deploying changes to objects. FIG. 32 illustrates a system for deploying changes to objects. As mentioned above, rather than exchange a shared database container 3202, for some deployments, such as those for a patch that have changes to less than a predetermined threshold number of tables, changes can be applied in place to both the shared database container 3202 and tenant database containers (e.g., a first tenant database container 3204 and a second tenant database container 3206). Deployment can be performed in two phases: 1) deployment to the shared database container 3202; and 2) deployment to the tenant database containers 3204 and 3206, which can be performed independently. Independent tenant deployments can enable sequential and de-coupled deployments.

A deployment 3208 can ensure that a patch is completely deployed both to the shared database container 3202 and to each tenant database container 3204 and 3206, including ensuring that any planned follow-up actions have been performed for all tenants. The deployment tool 3208 can identify a deployment file entry 3209 in a deployment package 3210 for a given object, and determine that the given object includes data stored in T1, T2, and T3 tables. The deployment tool 3208 can access metadata 3212 that indicates that the T1 table is a shared read-only table (and thus residing in the shared database container 3202, e.g., as a read-only table 3214), the T2 table is a split table (and thus partially residing in the shared database container 3202, e.g., as a read-only table 3216), and the T3 is a tenant-local table (and thus respectively residing in tenant database containers, e.g., as a local table 3218 and a local table 3220).

The deployment tool 3208 can identify, based on the metadata 3212 and the deployment file entry 3209, the given object as at least partially included in the shared read-only table 3202. The deployment tool 3208 can deploy, for the given object, changes for the portions of the given object that reside in the shared database container 3202, as illustrated by an entry 3222 in the T1 read-only table 3214 and an entry 3224 in the T2 read-only table 3216. The entry 3222 can be populated with data from an entry 3226 in the deployment file entry 3209. Similarly, the entry 3224 can be populated with data from an entry 3228 in the deployment file entry 3209. The deployment tool 3208 can store a record, in a status table, that indicates that the given object is partially deployed.

The deployment tool 3208 can next perform the deployment to tenant phase, which can include a deployment to the first tenant database container 3204 and a deployment to the second tenant database container 3206. The deployments to the tenant database containers can operate independently, and may happen sequentially, or in parallel. The deployment tool 3208 can identify the given object associated with the entry 3209 as an object that has been partially deployed, based on the entry 3209 and the metadata 3212 indicating that the given object includes data in the T3 tenant-local table. The deployment tool 3208 can determine that a portion of the given object that is stored in an entry 3230 in the deployment file entry 3209 has not yet been deployed. The deployment tool 3208 can deploy the entry 3230, to the first tenant database container 3204 and the second tenant database container 3206, as illustrated by an entry 3232 and an entry 3234.

Other deployment tasks that can be performed by the deployment tool 3208 include identifying objects that have not been deployed to the shared database container (e.g., objects that reside only in local tenant tables), and deploying changes to those objects. Finalization tasks performed by the deployment tool 3208 can include invoking actions to operate on deployed content, which can include, for example, triggering buffer invalidation and buffer refresh, or compiling deployed code. Finalization tasks can also include ensuring that all parts of all objects to be included in the deployment have been deployed.

Figure 33:
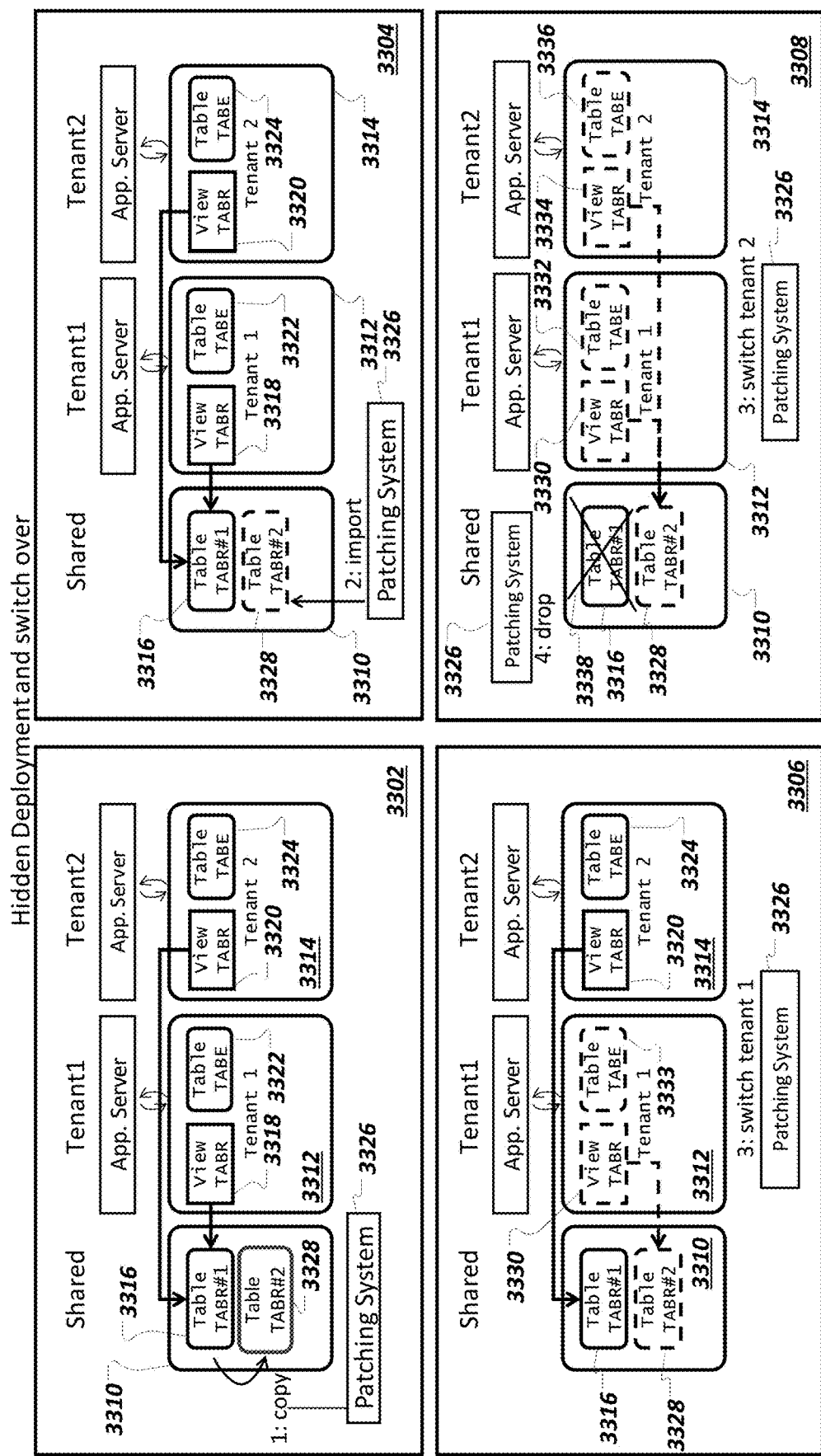
FIG. 33 illustrates a system for deploying a patch using a hidden preparation of a shared database container.

FIG. 33 illustrates a system 3300 for deploying a patch using a hidden preparation of a shared database container. As described above, tenant-independent deployments may be desired, so that tenants can each define their own downtime window and so that if one tenant deployment has an issue, not all tenants deployments need to be reverted. Deploying a new shared database container in parallel to an existing shared database container is one approach. For smaller changes, preparing, in the existing shared database container, hidden version of individual tables can be another approach. This hidden-deployment approach can reduce downtime by providing a tenant-individual fallback option. Hidden changes are initially invisible to tenants who can still productively use current-version tables in the shared database container, until they are individually deployed and switched over to use new table versions.

The system 3300 includes sub-systems 3302, 3304, 3306, and 3308 which provide an overview of the progression of the deployment. Other figures below give further detail to each deployment stage. The sub-system 3302 includes a shared database container 3310, a first tenant database container 3312 for a first tenant, and a second tenant database container 3314 for a second tenant.

The shared database container 3310 includes a read-only table 3316 that is at a first version, with a name of "TABR #1". Although only one table is illustrated in the shared database container 3310, the shared database container 3310 can include other tables. The first tenant database container 3312 and the second tenant database container 3314 respectively include a read-only view 3318 or a read-only view 3320 that each provide read access to the read-only table 3316 for a respective tenant. The first tenant database container 3312 and the second tenant database container 3314 respectively also include a writable table 3322 or a writable table 3324.

In a first deployment stage, a patching system 3326 creates a clone/copy of the read-only table 3316, illustrated as a new read-only table 3328. The new read-only table 3328 has the same structure as the read-only table 3316.

In a second deployment stage, and as illustrated in the sub-system 3304, the patching system 3326 and/or a deployment tool can modify the new read-only table 3328 by importing changes to the new read-only table 3328 for a patch to be deployed to the sub-system 3302. The new read-only table 3328 is displayed in dashed lines to signify that the new read-only table 3328 is at a new version that includes the patch.

In a third deployment stage, and as illustrated in the sub-system 3306, the first tenant is switched to be compatible and connected to the updated shared database container 3310. For example, the view 3318 is dropped and a new view 3330 is created to the new read-only table 3328. A structure of the writable table 3322 can be updated, as illustrated by an updated writable table 3332.

Similarly, and as illustrated in the sub-system 3308, the second tenant is switched to be compatible and connected to the updated shared database container 3310. For example, the view 3320 is dropped and a new view 3334 is created to the new read-only table 3328. A structure of the writable table 3324 can be updated, as illustrated by an updated writable table 3336.

In a fourth deployment stage, the read-only table 3316 is dropped, as illustrated by an "X" 3338, since there are now no tenants connected to the read-only table 3316. FIGS. 34-39 below discuss a more involved example of deployment using hidden preparation of a shared database container, including the use of a mixed table, and more detailed discussions of each operation.

Figure 34:
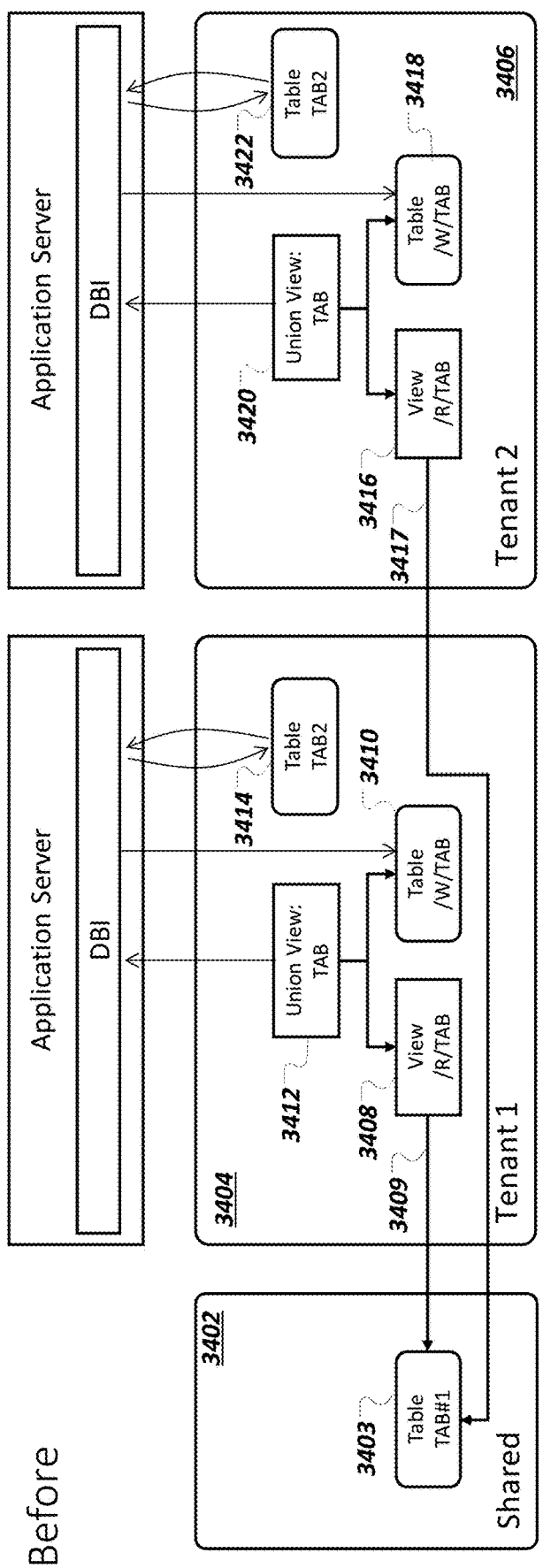
FIG. 34 illustrates an example system before deployment of a patch.

FIG. 34 illustrates an example system 3400 before deployment of a patch. The system 3400 includes a shared database container 3402 that includes a current version (e.g., version #1) of a read-only table 3403 that is a shared portion of a mixed table named "TAB". The system 3400 includes a first tenant database container 3404 and a second tenant database container 3406. The first tenant database container 3404 includes a view 3408 to the read-only table 3403 (illustrated as an arrow 3409), a writable table 3410 that is a local portion of the mixed table, a union view 3412 providing unified access to the read-only table 3403 and the writable table 3410, and a writable table 3414. Similarly, the second tenant database container 3406 includes a view 3416 to the read-only table 3403 (illustrated as an arrow 3417), a writable table 3418 that is a local portion of the mixed table, a union view 3420 providing unified access to the read-only table 3403 and the writable table 3418, and a writable table 3422.

Figure 35:
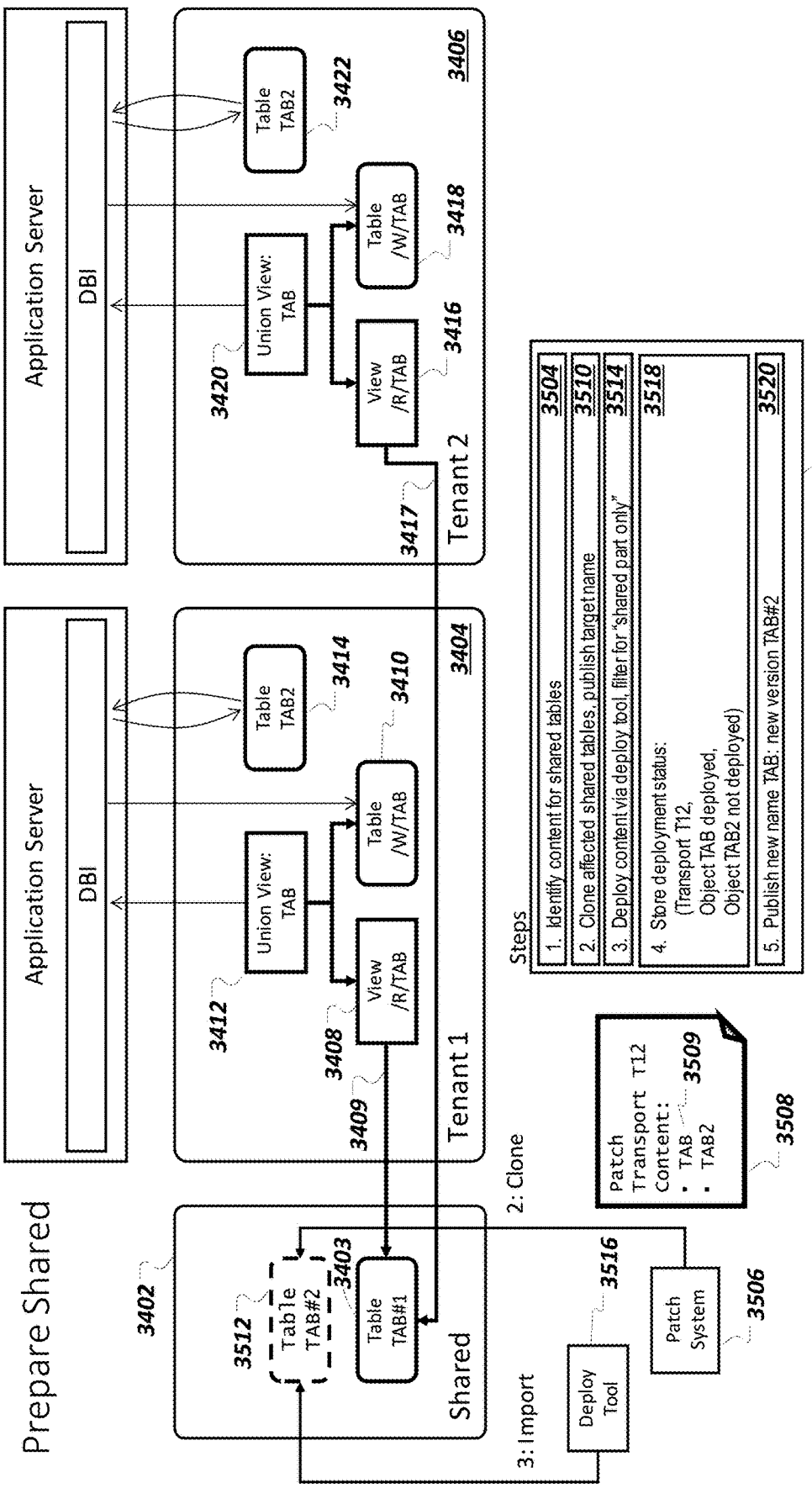
FIG. 35 illustrates a system for preparation of a shared database container during a deployment of a patch to a database system.

FIG. 35 illustrates a system 3500 for preparation of a shared database container during a deployment of a patch to a database system. The system 3500 is a view of the system 3400 after a first set of deployment operations have been completed. The first set of deployment operations are outlined in a flowchart 3502. At 3504, a patch system 3506 reads a deployment package 3508 to identify shared tables to which content is to be deployed. For example, the patch system 3506 can identify, based on data in the deployment package 3508, a mixed table named "TAB" 3509 for which a patch is to be deployed to the read-only portion of the mixed table in the shared database container 3402. As described above, a current version of the read-only portion of the "TAB" table is included in the shared database container 3402 as a read-only table 3403.

At 3510, the patch system 3506 clones the read-only table 3403 to create a read-only table 3512 that has the same structure as the read-only table 3403, and publishes a name of the read-only table 3512 to the deploy tool 3516 running at the shared deployment. The read-only table 3512 is named with a target name of "TAB #2", and is shown with dashed lines to signify that the read-only table 3512 is a new version of the read-only table 3403. An administration table can be updated to publish the name of the read-only table 3512. The published name can be used in a later stage when tenants are deployed and connected to the read-only table 3512.

At 3514, a deployment tool 3516 deploys (e.g., imports) data from the deployment package 3508 to the read-only table 3512, to deploy the patch to the read-only table 3512. The read-only table 3512 is read-only with respect to tenant applications, but the deployment tool 3516 has write access to the read-only table 3512. The deployment tool 3516 can determine content that is to be deployed to the shared database container 3402 only (e.g., and not to tenant database containers).

At 3518, deployment status is stored (e.g., in an administrative table in the shared database container 3402 (not shown)). Deployment status can include an indication that the patch to the TAB table is partially deployed (e.g., changes to the read-only sharable portion of the TAB mixed table have been made in the shared database container 3402 but the writable portion of the TAB mixed table has not yet been updated). The administrative table can include information that indicates, for example, that changes to the writable table 3414 (e.g. named "TAB2"), and other tables, have not yet been deployed.

At 3520, the name of the read-only table 3512, with target name of "TAB #2", is published to the patch system 3506 running at the tenant deployment, or otherwise made available, as the name of the new version of the read-only table 3403. The published name is used in later deployment operations, as described in more detail below. The read-only table 3512 remains hidden, and unused by tenant applications, until later operations have been completed.

FIG. 36 illustrates a system 3600 for deploying a patch to a tenant database container. The system 3600 is a view of the system 3400 during a second set of deployment operations, for deploying the patch to the first tenant database container 3404. The second set of deployment operations are outlined in a flowchart 3602. Before execution of the second set of operations, a downtime period can be initiated for the first tenant database container 3404.

At 3604, a determination is made that content from the deployment package 3508 has been prepared (e.g., deployed to as hidden) in the shared database container 3402.

At 3606, shared tables that have been prepared, and partially deployed, are identified, and a drop view statement is created. For example, the patch system 3506 can identify that the read-only table 3512 has been prepared as a new version of the read-only table 3403. A drop view statement can be prepared to drop a view to the read-only table 3403.

At 3608, a create view statement is computed, by reading, and including in the create view statement, a published target name of the read-only table 3512.

At 3610, the previously-computed drop view statement and create view statement are executed. The drop view statement drops a view in the first tenant database container 3404 to the read-only table 3403. Accordingly, there is now no arrow (e.g., arrow 3409 on prior figures) originating from the first tenant database container 3404 and ending at the read-only table 3403. The create view statement creates a new view 3612 to the read-only table 3512 (e.g., illustrated by an arrow 3613).

At 3614, the deployment tool 3516 deploys content to the first tenant database container 3404. For example, the deployment tool 3516 can deploy content from the deployment package 3508 to one or more writable tables included in the first tenant database container 3404, as illustrated by an updated writable table 3616. As another example, content from the deployment package 3508 can be deployed to a writable table that includes tenant-local content associated with the mixed table corresponding to the read-only table 3512, as illustrated by an updated writable table 3618. The deployment tool 3516 can determine content in the deployment package 3508 that has not been deployed to the shared database container 3402 and that is to be deployed to tenants.

At 3620, local table structure(s) and union view(s) are updated. For example, the union view 3412 of FIG. 34 can be updated to connect to the new view 3612 and the updated writable table 3618, as illustrated by an updated union view 3622. As another example, structure of the updated writable table 3616 and/or the updated writable table 3618 can be updated, according to data in the deployment package 3508.

After deployment for the first tenant is completed, downtime for the first tenant can be ended, with the first tenant database container 3404 successfully configured with deployed changes and updated connections to the read-only table 3512. The new view 3612, the arrow 3613, the updated writable table 3616, the updated writable table 3618, and the updated union view 3622 are illustrated in dashed lines to signify completion of the patch deployment for the first tenant database container 3404.

FIG. 37 illustrates a system 3700 for deploying a patch to a tenant database container. The system 3700 is a view of the system 3400 during a third set of deployment operations, for deploying the patch to the second tenant database container 3406. Before execution of the third set of operations, a downtime period can be initiated for the second tenant database container 3406. Deployment of the patch to the second database container 3406 can include the same or similar operations as done for the first database container, as outlined in the flowchart 3602, but for the second database container 3406.

For example, a view in the second database container 3406 to the read-only table 3403 can be dropped (e.g., the arrow 3417 shown on prior figures is no longer included in FIG. 37). A new view 3702 can be created, to the read-only table 3512, as illustrated by an arrow 3704. Content can be deployed to writable tables, and writable table structures can be altered, as illustrated by an updated writable table 3706 and an updated writable table 3708. A union view can be updated to provide unified access to the new view 3702 and the updated writable table 3708, as illustrated by an updated union view 3710.

After deployment for the second tenant is completed, downtime for the second tenant can be ended, with the second tenant database container 3406 successfully configured with deployed changes and updated connections to the read-only table 3512. The new view 3702, the arrow 3704, the updated writable table 3706, the updated writable table 3708, and the updated union view 3710 are illustrated in dashed lines to signify completion of the patch deployment for the second tenant database container 3406.

Figure 38:
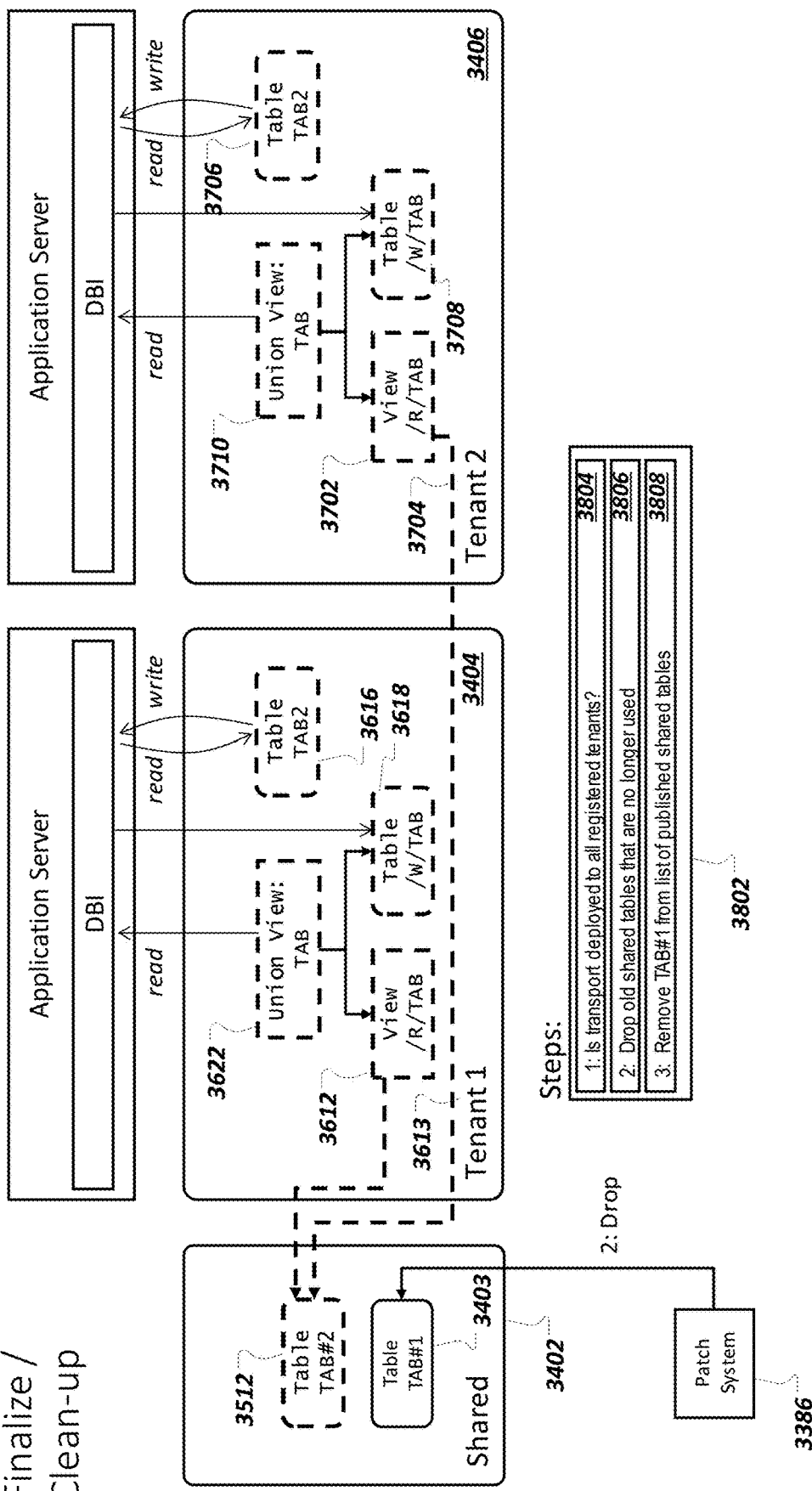
FIG. 38 illustrates a system for performing finalization of a deployment.

FIG. 38 illustrates a system 3800 for performing finalization of a deployment. The system 3800 is a view of the system 3400 during a fourth set of deployment operations, for performing a finalization/clean up phase. The fourth set of operations are outlined in a flowchart 3802. At 3804, a determination is made as to whether the patch has been deployed to all registered tenants. At 3806, in response to determining that the patch has been deployed to all registered tenants, old shared table(s) that are no longer used are dropped. For example, the patch system 3506 can drop the read-only table 3403, since there are no longer any tenants connected to the read-only table 3403. At 3808, the name of the read-only table 3403 (e.g., "TAB #1") is removed from a list of published shared tables.

Figure 39:
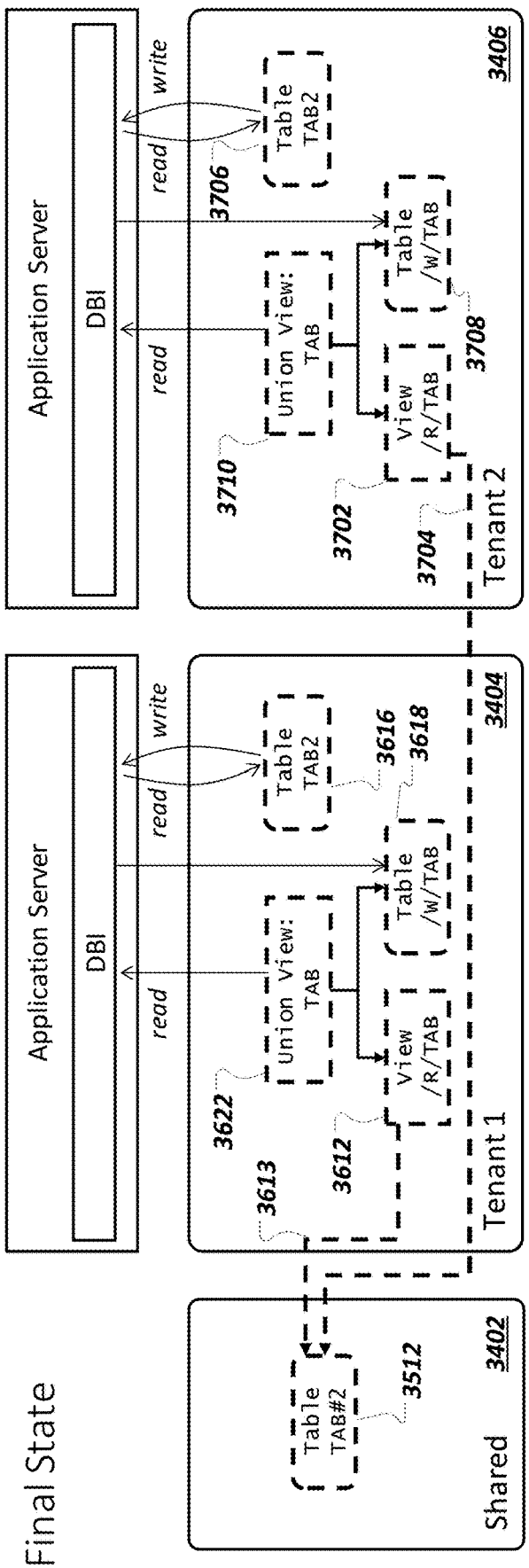
FIG. 39 illustrates a system after deployment using a hidden preparation of a shared database container technique.

FIG. 39 illustrates a system 3900 after deployment using a hidden preparation of a shared database container technique. The system 3900 is a view of the system 3400 after deployment to all tenants, including the first tenant database container 3404 and the second tenant database container 3406, has been completed. The shared database container 3402 includes the new version read-only table 3512 and no longer includes the prior version read-only table 3403. The first tenant database container 3404 and the second database container 3406 include updated components, including connections to the new version read-only table 3512.

Figure 40:
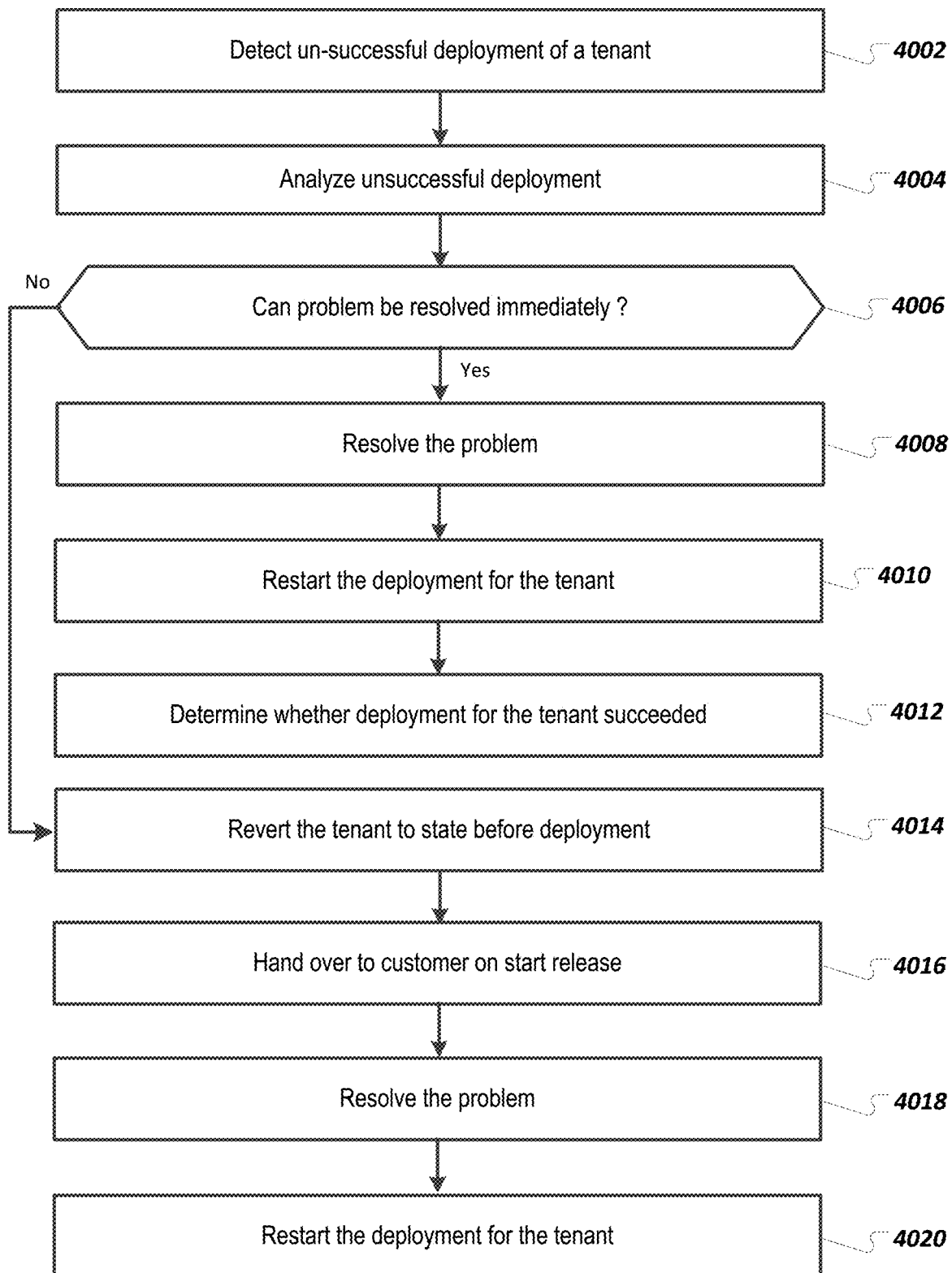
FIG. 40 is a flowchart of an example method for handling unsuccessful tenant deployments.

FIG. 40 is a flowchart of an example method 4000 for handling unsuccessful tenant deployments. It will be understood that method 4000 and related methods may be performed, for example, by any suitable system, environment, software, and hardware, or a combination of systems, environments, software, and hardware, as appropriate. For example, one or more of a client, a server, or other computing device can be used to execute method 4000 and related methods and obtain any data from the memory of a client, the server, or the other computing device. In some implementations, the method 4000 and related methods are executed by one or more components of the system 100 described above with respect to FIG. 1. For example, the method 4000 and related methods can be executed by the deployment tool 130 of FIG. 1.

At 4002, an unsuccessful deployment of a tenant is detected. For example, an error message may be received.

At 4004, the unsuccessful deployment is analyzed. For example, status information can be analyzed that indicates which portions of the deployment have successfully completed or have encountered errors.

At 4006, a determination is made as to whether a problem with the deployment can be solved immediately, or within a predetermined time window (e.g., one hour). The predetermined time window can be a maximum acceptable length of a downtime window for the tenant, for example.

At 4008, in response to determining that the problem can be resolved within the predetermined time window, the problem is resolved. For example, a new deployment package can be provided, and/or a system or process can be restarted.

At 4010, the deployment is restarted for the tenant. If a new deployment package has been provided, the new deployment package can be used in the deployment re-attempt.

At 4012, a determination is made as to whether the deployment re-attempt succeeded. If the deployment re-attempt did not succeed, the method 4000 can be re-executed (e.g., at 4002).

At 4014, in response to determining that the problem with the initial deployment cannot be resolved within the predetermined time window, the tenant is reverted to a state before the deployment.

At 4016, the tenant is provided to the customer at a release version of the tenant before the start of the deployment, so that the tenant can be online while the problem is being resolved.

At 4018, the problem is resolved while the tenant is online.

At 4020, the deployment is restarted for the tenant. Deployment success can be determined, and the method 4000 can be re-executed if the restart of the deployment did not succeed, as described above.

Figure 41:
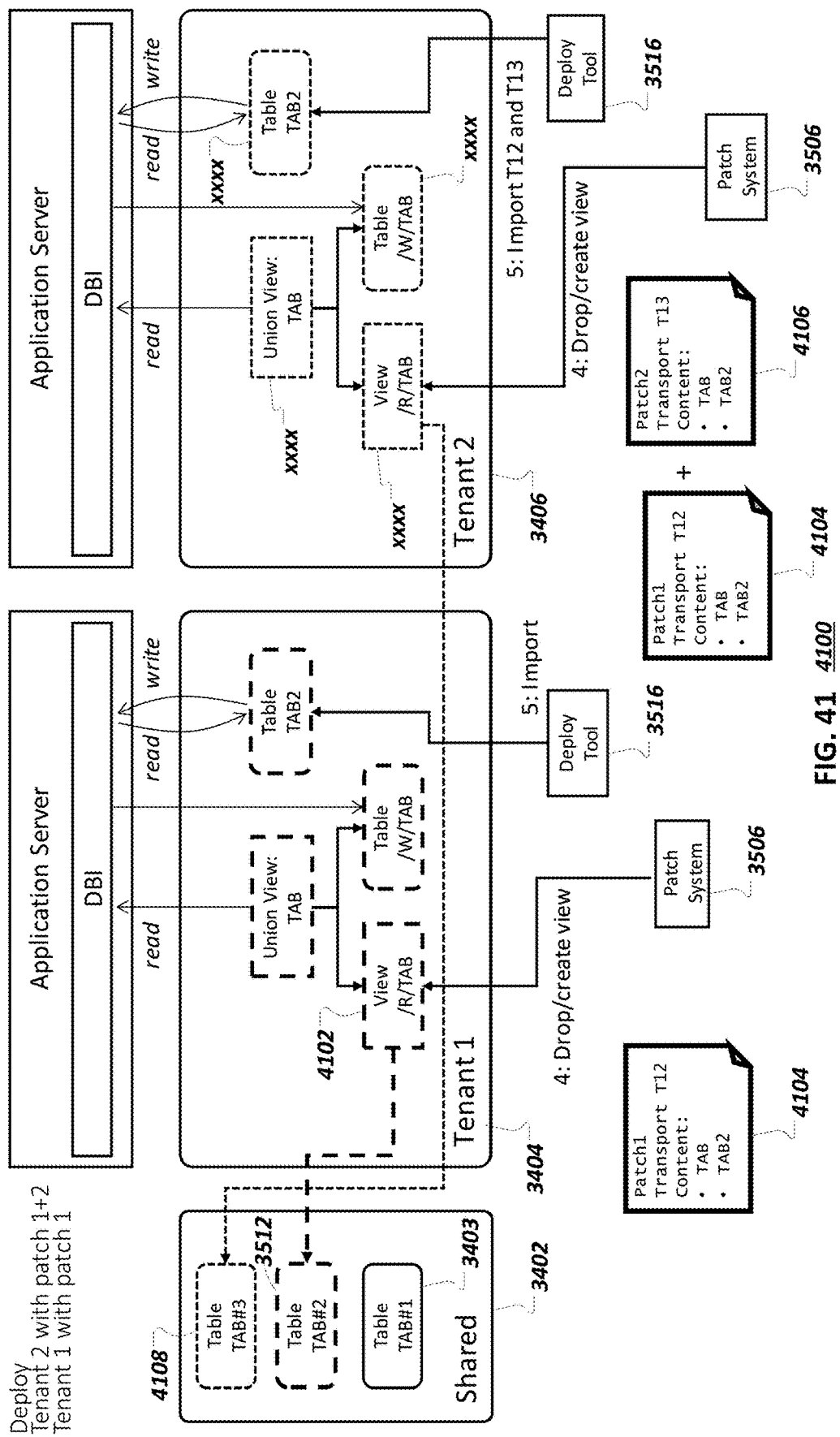
FIG. 41 illustrates a system for deploying multiple patches to a database system.

FIG. 41 illustrates a system 4100 for deploying multiple patches to a database system. Tenant-independent downtimes and deployments may result in different tenants connected to different versions at a given point in time, such as if deployments are re-attempted for one or more tenants or if given deployments are still ongoing. Tenants can have overlapping deployment timeframes, either due to planned individual upgrade windows or as a result of a problem and a revoke of a particular tenant deployment. An administrator may desire to deploy a patch to those tenants that are on a new version, even when some other tenants have not yet been upgraded to the new version. As another example, it may be desired to deploy a second patch and a first patch to a tenant who has not yet had the first patch deployed.

The system 4100 can support the deployment of multiple patches to tenants. For example, a deployment of a package "p1" to a cluster of a shared database container and N tenant database containers can be partially completed (e.g., M of the N tenants, M<N, do not have the p1 patch deployed). The system 4100 can support the deployment of a patch "p2", even though the M tenants do not yet have the p1 patch. It may be desired to react, with a new patch, to a problem that is occurring in one or more tenants who already have the p1 patch, without needing to wait until all tenants have the p1 patch.

The system 4100 is an overview showing changes to the system 3400 after different sets of patches have been deployed to different tenant database containers. The shared database container 3402 includes the read-only table 3403 and the read-only table 3512 (e.g., a second version of the read-only table 3402). The first tenant associated with the first tenant database container 3404 has been upgraded to version two. The patch system 3506 has created a view 4102 to the version-two read-only table 3512, and the deployment tool 3516 has deployed content from a patch one deployment package 4104 to the first tenant database container 3404.

A problem may be detected in the second tenant database container 3406 before the patch one deployment package 4104 has been deployed to the second tenant database container 3406. A patch two deployment package 4106 has been created which includes changes to content, including to the TAB and TAB2 tables, to create a third software version to fix the detected problem. The patch system 3506 can clone the version-two read-only table 3512 to create a version-three read-only table 4108. The deployment tool 3516 can deploy content from the patch two deployment package 4106 to the version-three read-only table 4108 to deploy shared content included in the new patch.

The patch system 3506 can create a view 4110 to the version-three read-only table 4108. The deployment tool 3516 can deploy tenant content from the patch one deployment file 4104 and the patch two deployment file 4106 to complete the upgrade of the second tenant database container 3406 to the third software version. Later determinations can be made regarding whether the third software version has corrected the problem and whether to upgrade the first tenant database container 3404, at a later time, to the third software version. Further details of deploying multiple patches are described below with respect to FIGS. 42-48.

Figure 42:
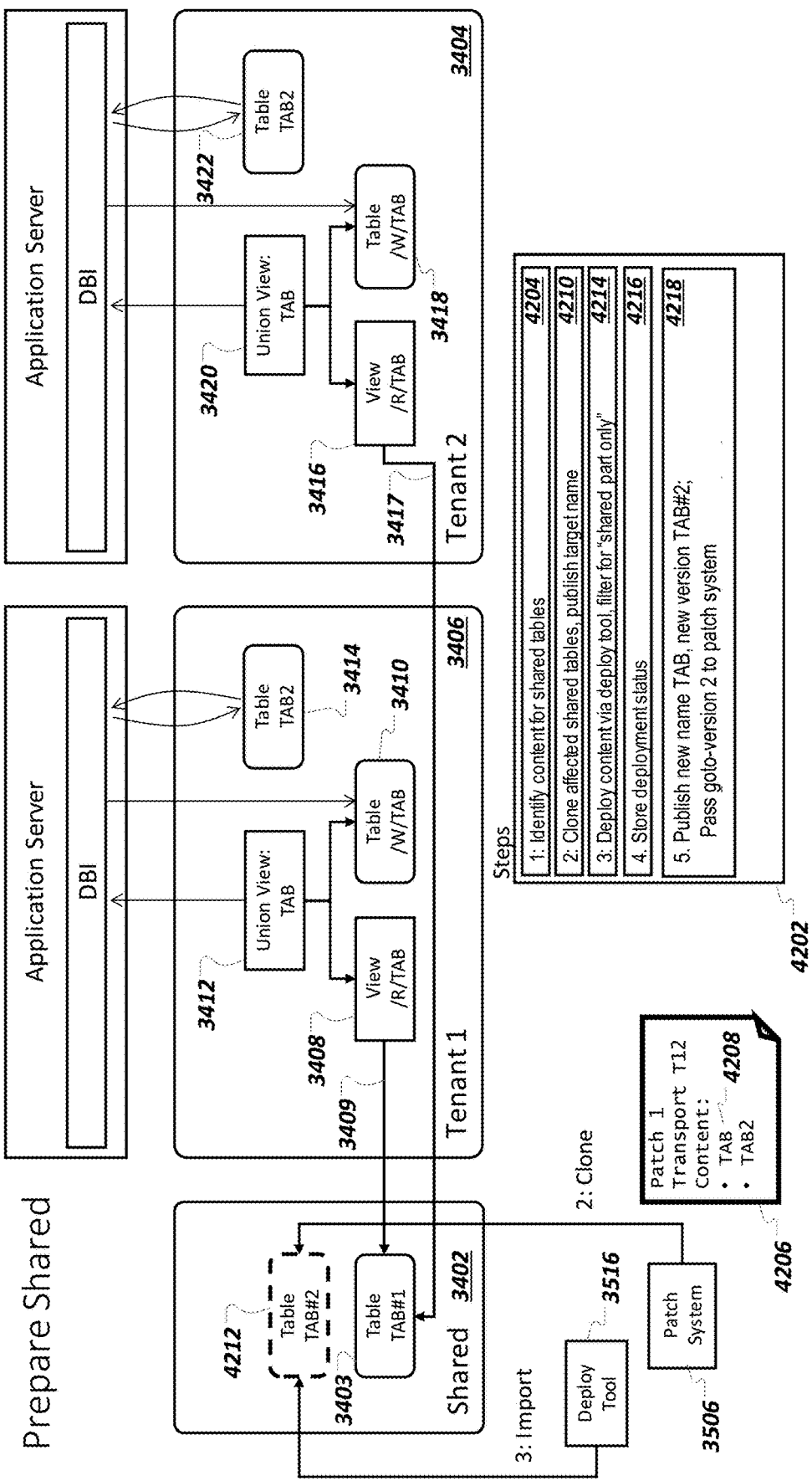
FIG. 42 illustrates a system for preparing a shared database container before deploying multiple patches to a database system.

FIG. 42 illustrates a system 4200 for preparing a shared database container before deploying multiple patches to a database system. The system 4200 is a view of the system 3400 after a first set of deployment operations have been completed, for preparing for deploying a first patch to the first tenant. The first set of deployment operations are outlined in a flowchart 4202 and are similar to the deployment operations described above for the flowchart 3502.

At 4204, the patch system 3506 reads a deployment package 4206 to identify shared tables to which content is to be deployed. For example, the patch system 3506 can identify, based on data in the deployment package 4206, a mixed table named "TAB" 4208 for which a first patch is to be deployed to the read-only portion of the TAB mixed table in the shared database container 3402.

Although one table, ("TAB") is used in this example, in general, the patch system 3506 can determine a set of tables in the shared container that will receive data from the deployment package 4206. For purposes of discussion of a general example below, this set of tables can be referred to as a set st_1. The patch system 3506 can determine a version number for each table in the set st_1, and can determine a maximum version number of those tables. The patch system 3506 can determine a target version number, v_target1=maximum version number in st_1+1.

At 4210, the patch system 3506 clones the read-only table 3403 to create a version-two read-only table 4212 that has the same structure as the read-only table 3403, and publishes a name of the version-two read-only table 3512. The version-two read-only table 3512 is named with a target name of "TAB #2".

Continuing with the general example above, the patch system 3506 can, for each table in the set st_1, identify, in the shared database container 3402, a source table named <table-name>#<v_start>, where v_start is a highest version number of tables that have a same base name of <table-name> (for example, the shared database container 3402 may have tables named DOKTL #3, DOKTL #5, and DOKTL #11, so for a table_name of DOKTL, v_start is 11). The patch system 3506 can create a copy of each identified source table to make a respective target table, using a pattern of <table-name>#<v_target1>.

At 4214, the deployment tool 3516 deploys (e.g., imports) data from the deployment package 4206 to the version-two read-only table 4212, to deploy the first patch to the version-two read-only table 4212. The deployment tool 3516 can determine content that is to be deployed to the shared database container 3402 only (e.g., and not to tenant database containers). Continuing with the general example, the deployment tool 3516 can deploy content of the deployment package 4206 to each of the target tables <table-name>#<v_target1>, in the shared database container 3402.

At 4216, deployment status is stored (e.g., in an administrative table in the shared database container 3402 (not shown)). Deployment status can include an indication that the first patch to the TAB table is partially deployed (e.g., changes to the read-only sharable portion of the TAB mixed table have been made in the shared database container 3402) but the first patch has not yet been applied to the writable portion of the TAB mixed table).

At 4218, the name of the version-two read-only table 4212, with target name of "TAB #2", is published, or otherwise made available, as the name of the new version of the read-only table 3403. A version number (e.g., version two) can also be published as a target (e.g., "go to") version number, for later tenant deployments. For the general example, the number v_target1 can be passed to a central control tool as a goto-version for the deployment package 4206, for orchestration of future tenant deployments.

Figure 43:
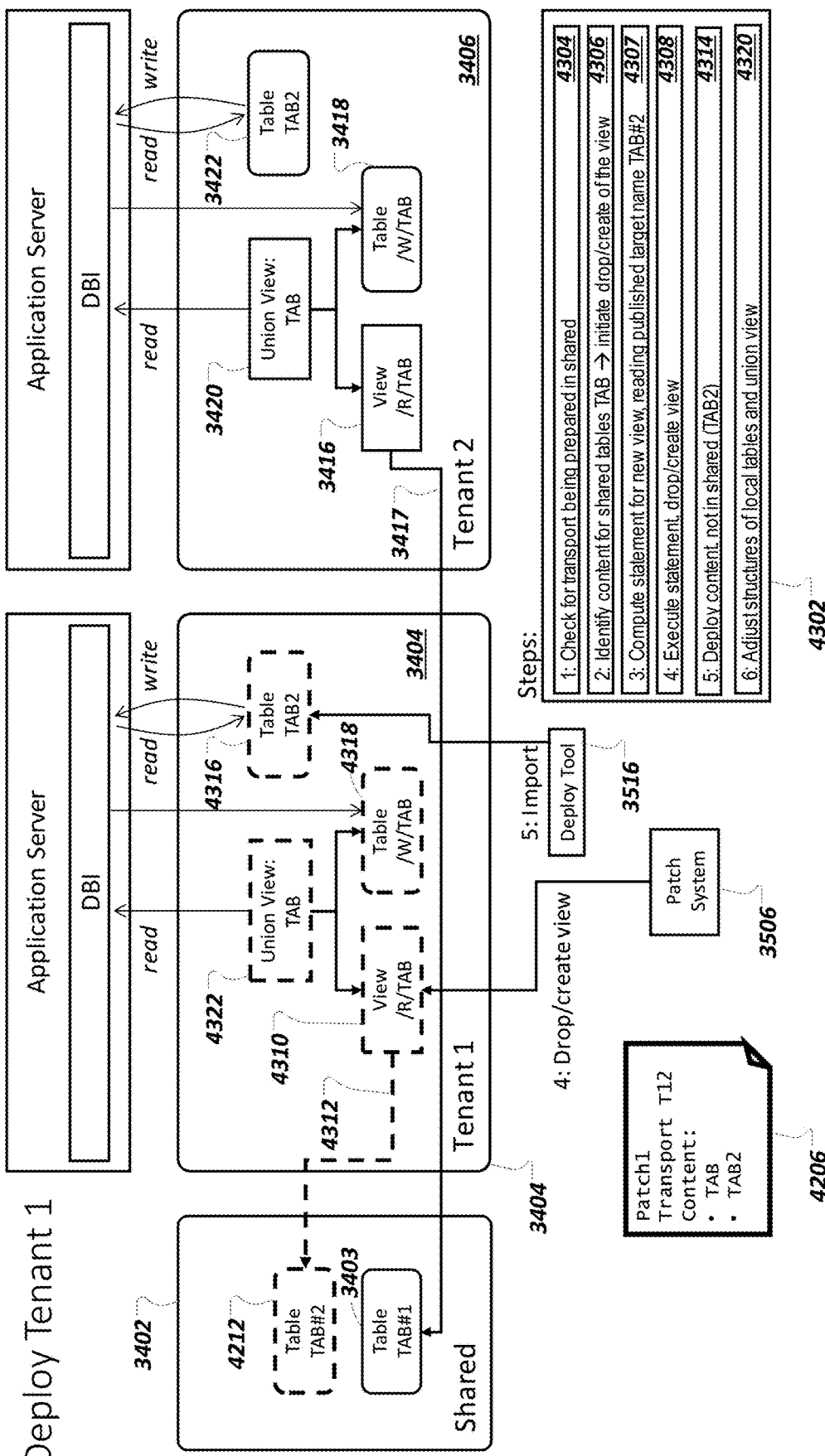

FIG. 43 illustrates a system 4300 for deploying multiple patches to a database system. The system 4300 is a view of the system 3400 after a second set of deployment operations, for deploying a first patch, have been completed during deployment of multiple patches to a database system. The second set of deployment operations are outlined in a flowchart 4302 and are similar to the operations described above for the flowchart 3602.

At 4304, a determination is made that content for the first patch from the deployment package 4206 has been prepared (e.g., deployed to as hidden) in the shared database container 3402. The patch system 3506 can retrieve a target version number v_target1 for use in deploying tenant content.

At 4306, shared tables that have been prepared, and partially deployed, are identified, and a drop view statement is created. For example, the patch system 3506 can identify that the version-two read-only table 4212 has been prepared as a new version of the read-only table 3403. A drop view statement can be prepared to drop a view to the read-only table 3403.

Continuing with the general example, the patch system 3506 can determine, in the deployment package 4206, a complement of what had been deployed from the deployment package 4206 to the shared database container. For example, the patch system 3506 can identify a set of all tables, st_1_all, that are to receive content from the deployment package 4206. The patch system 3506 can remove, from the set st_1_all, tables that have been deployed in the shared (e.g., the set st_1). The patch system 3506 can determine a remaining set, st_1_rest.

For determining drop view statements, the patch system 3506 can identify current views in the tenant database container 3404 that select from a shared table with a version smaller than v_target1. The patch system 3506 can prepare a drop statement for each of those identified current views.

At 4307, a create view statement is computed, by reading, and including in the create view statement, a published target name of the version-two read-only table 4212.

For the general example, the patch system 3506 can compute, for each of the current views that are to be dropped, a version of a table to be used in a new view, by determining a maximum number of the version of the table that is identical or smaller than v_target1. The patch system 3506 can prepare a create view statement using the determined version of the table to be used in the new view.

At 4308, the previously-computed drop view statement and create view statement are executed. The drop view statement drops a view in the first tenant database container 3404 to the read-only table 3403. Accordingly, there is now no arrow (e.g., arrow 3409 on prior figures) originating from the first tenant database container 3404 and ending at the read-only table 3403. The create view statement creates a new view 4310 to the version-two read-only table 4212 (e.g., illustrated by an arrow 4312).

At 4214, the deployment tool 3516 deploys content to the first tenant database container 3404. For example, the deployment tool 3516 can deploy content for the first patch from the deployment package 4206 to one or more writable tables included in the first tenant database container 3404, as illustrated by an updated writable table 4316. As another example, content from the deployment package 4206 for the first patch can be deployed to a writable table that includes tenant-local content associated with the mixed table corresponding to the version-two read-only table 4212, as illustrated by an updated writable table 4318. The deployment tool 3516 can determine content in the deployment package 4206 that has not been deployed to the shared database container 3402 and that is to be deployed to tenants. In the general example, the deployment tool can deploy content from the deployment package for the tables included in the remaining table set st_1_rest.

At 4220, local table structure(s) and union view(s) are updated. For example, the union view 3412 of FIG. 34 can be updated to connect to the new view 4310 and the updated writable table 4318, as illustrated by an updated union view 4322. As another example, structure of the updated writable table 4316 and/or the updated writable table 4318 can be updated, according to data in the deployment package 4206.

Figure 44:
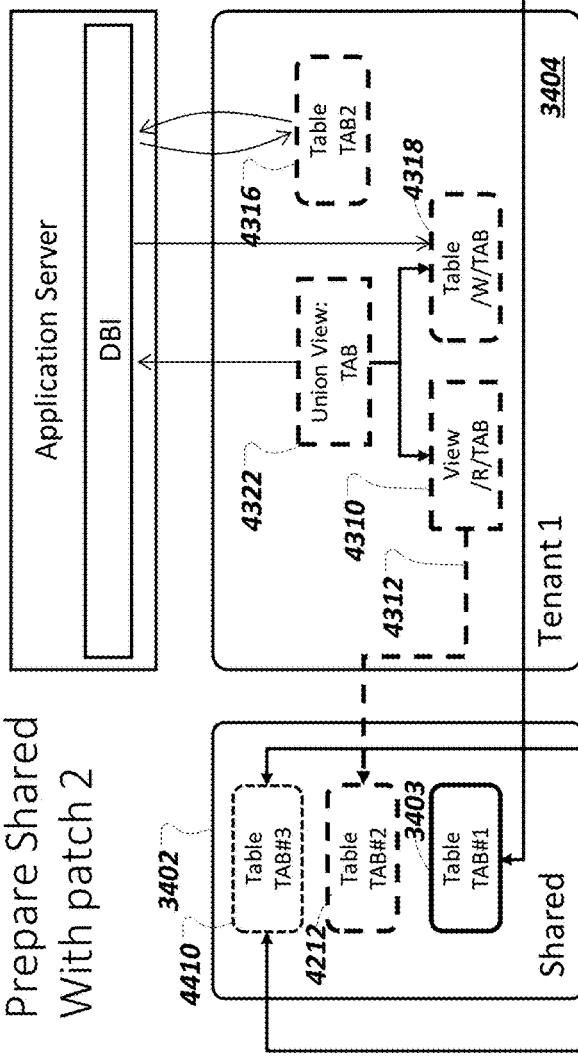

FIG. 44 illustrates a system 4400 for deploying multiple patches to a database system. The system 4400 is a view of the system 3400 after a third set of deployment operations, for preparing a shared database container for a second patch, have been completed during deployment of multiple patches to a database system. The third set of deployment operations are outlined in a flowchart 4402 and are similar to the operations described above for the flowchart 4202.

At 4404, the patch system 3506 reads a second patch deployment package 4406 to identify shared tables to which content is to be deployed. For the general example, the patch system 3506 can determine a set of tables in the shared container that will receive data from the deployment package 4406. This set of tables can be referred to as a set st_2. The patch system 3506 can determine a version number for each table in the set st_2, and can determine a maximum version number of those tables. The patch system 3506 can determine a target version number, v_target2=maximum version number in st_2+1.

At 4408, the patch system 3506 clones the version-two read-only table 4212 to create a version-three read-only table 4410 that has the same structure as the version-two read-only table 4212, and publishes a name of the version-three read-only table 4410. The version-three read-only table 4410 is named with a target name of "TAB #3".

Continuing with the general example above, the patch system 3506 can, for each table in the set st_2, identify, in the shared database container 3402, a source table named <table-name>#<v_start>, where v_start is a highest version number of tables that have a same base name of <table-name>. The patch system 3506 can create a copy of each identified source table to make a respective target table, using a pattern of <table-name>#<v_target2>.

At 4412, the deployment tool 3516 deploys (e.g., imports) data from the second patch deployment package 4402 to the version-three read-only table 4410, to deploy the second patch to the version-three read-only table 4410. Continuing with the general example, the deployment tool 3516 can deploy content of the deployment package 4406 to each of the target tables <table-name>#<v_target2>, in the shared database container 3402.

At 4414, deployment status is stored, (e.g., in an administrative table in the shared database container 3402 (not shown)). Deployment status can include an indication that the second patch to the TAB table is partially deployed.

At 4416, the name of the version-three read-only table 4410, with target name of "TAB #3", is published, or otherwise made available, as the name of the new version of the read-only table 3403. A version number (e.g., version three) can also be published as a target (e.g., "go to") version number, for later tenant deployments. For the general example, the number v_target2 can be passed to a central control tool as a goto-version for the deployment package 4406, for orchestration of future tenant deployments of the second patch.

Figure 45:
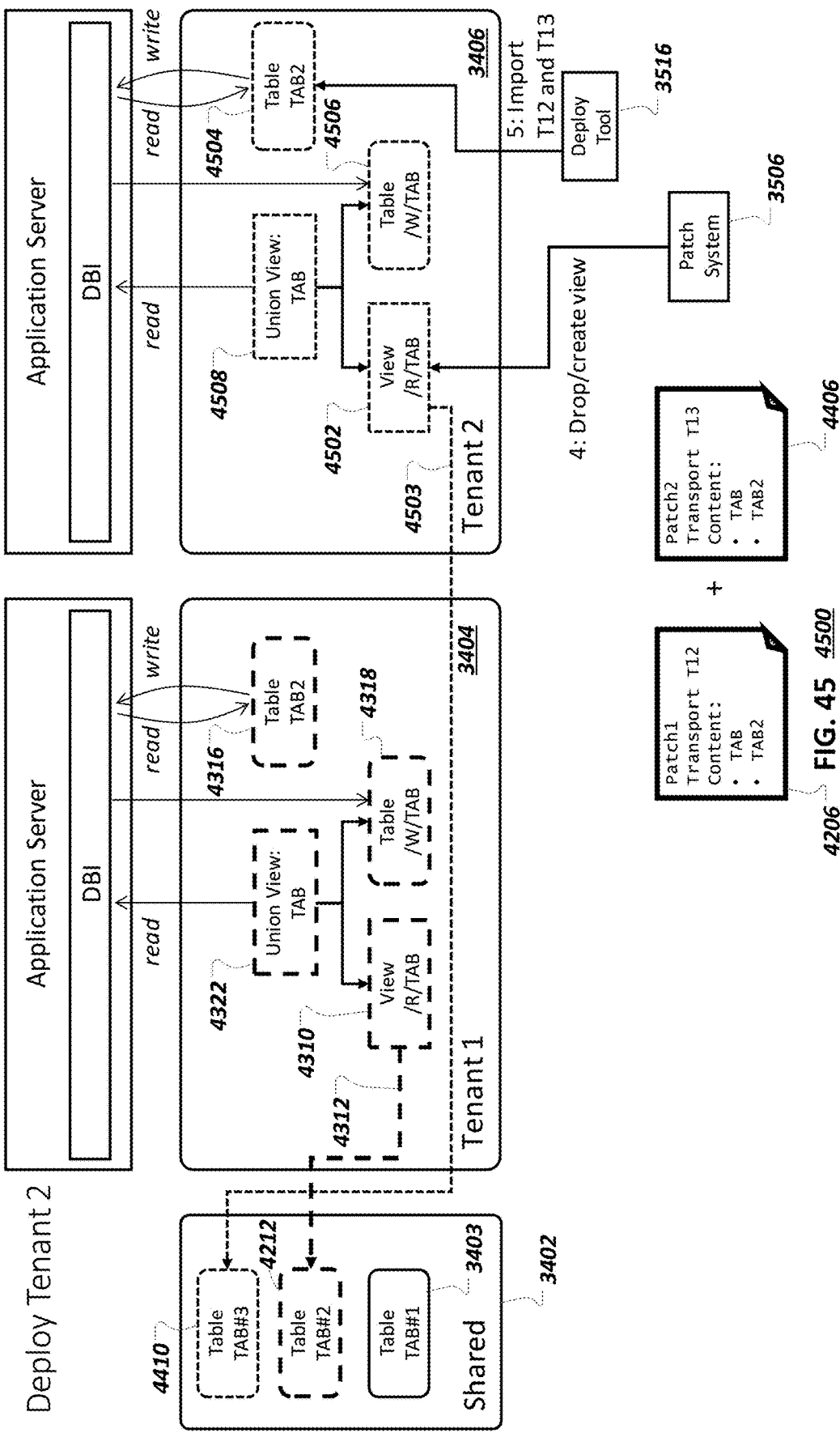

FIG. 45 illustrates a system 4500 for deploying multiple patches to a database system. The system 4500 is a view of the system 3400 after a fourth set of deployment operations, for deploying a first and second patch to the second tenant, have been completed during deployment of multiple patches to a database system. The fourth set of operations are similar to the operations described above in the flowchart 4302, but for deployment of both the first patch and the second patch to the second tenant database container 3406.

For example, a view from the second tenant database container 3406 to the read-only table 3403 (e.g., illustrated as the arrow 3417 on prior figures) has been dropped. A new view 4502 to the version-three read-only table 4410 (illustrated as an arrow 4503) has been created. Content has been deployed to an updated writable table 4504 and possibly to an updated writable table 4506, structure(s) of the updated writable table 4504 and/or the updated writable table 4506 have been updated, and the second tenant database container 3406 now includes an updated union view 4508.

For the general example, the patch system 3506 can retrieve a target version number v_target2 for use in deploying the deployment package 4206 and 4406 to the second tenant database container 3406. The patch system 3506 can determine a first complement of what had been deployed to the shared database container 3402 from the deployment package 4206, and a second complement of what had been deployed to the shared database container 3402 from the deployment package 4406, and deploy the first complement and the second complement to the second tenant database container 3406.

Figure 46:
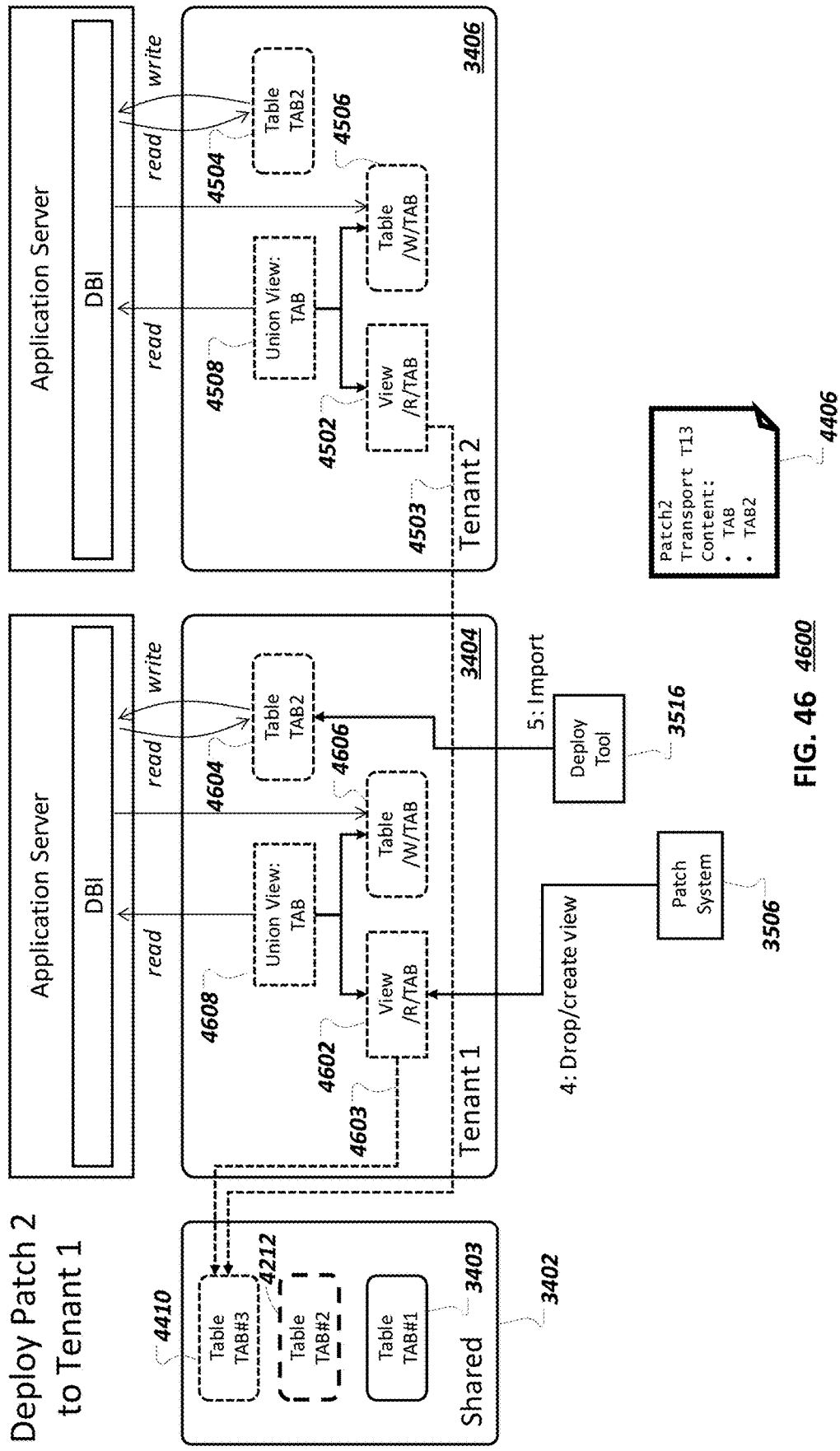

FIG. 46 illustrates a system 4600 for deploying multiple patches to a database system. The system 4600 is a view of the system 3400 after a fifth set of deployment operations, for deploying the second patch to the first tenant, have been completed during deployment of multiple patches to a database system. A determination can be made to deploy the second patch to the first tenant, for example, based on a determination that the second patch successfully resolves an earlier problem identified for the second tenant. The fifth set of operations are similar to the operations described above in the flowchart 4302, but for deployment of the second patch to the first tenant database container 3404, using the second patch deployment package 4406.

For example, a view from the first tenant database container 3404 to the version-two read-only table 4212 (e.g., illustrated as the arrow 4312 on prior figures) has been dropped. A new view 4602 to the version-three read-only table 4410 (illustrated as an arrow 4503) has been created. Content has been deployed to an updated writable table 4604 and possibly to an updated writable table 4606, structure(s) of the updated writable table 4604 and/or the updated writable table 4606 have been updated, and the first tenant database container 3404 now includes an updated union view 4608.

FIG. 47 illustrates a system 4700 for deploying multiple patches to a database system. The system 4700 is a view of the system 3400 after a sixth set of deployment operations, for finalizing a deployment, have been completed during deployment of multiple patches to a database system. The sixth set of deployment operations are outlined in a flowchart 4702.

At 4704, a determination is made as to whether all transports have been deployed to all registered tenants.

If all transports have been deployed to all registered tenants, at 4704, old shared tables that are no longer being used are dropped. For example, the patch system 3506 can drop the read-only table 3403 and the version-two read-only table 4212 since those tables are no longer connected to any tenants.

At 4706, old shared table names that were dropped (e.g., the read-only table 3403 and the version-two read-only table 4212) are removed from a list of published shared tables.

Figure 48:
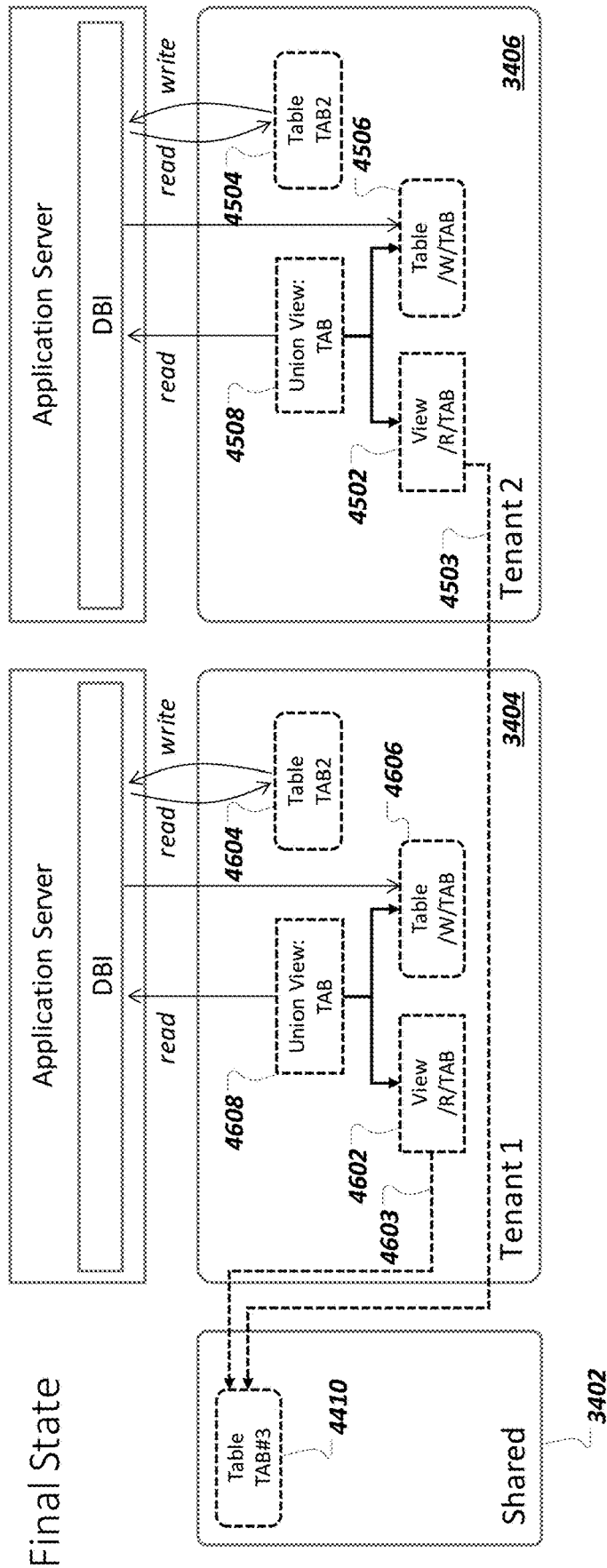
FIG. 48 illustrates a system after deployment of multiple patches to a database system has completed.

FIG. 48 illustrates a system 4800 after deployment of multiple patches to a database system has completed. The system 4800 is a view of the system 3400 after deployment of multiple patches to all tenants, including the first tenant database container 3404 and the second tenant database container 3406, has been completed. The shared database container 3402 no longer includes the read-only table 3403 and the version-two read-only table 4212, since all tenants are now connected to the version-three read-only table 4410.

Deploying Multiple Types of Changes

When a new version is deployed to a multi-tenancy database system, different types of changes can occur. For example, there can be one or more of the following types of changes: 1) change(s) in table structure; 2) change(s) in which tables are shared and which tables are not shared; or 3) change(s), for mixed tables, regarding which content values are shared and which content values are not shared. With the exchanged shared database container approach, the new shared database container includes any of these changes that are part of changes for the new version. For example, the new shared database container includes tables that are already in the target structure, includes an updated key pattern configuration, if needed, and shared tables that are associated with mixed tables include content that adheres to the updated key pattern configuration.

A deployment tool can determine what changes are to be made in each tenant, to make each tenant compatible with the new shared database container. The deployment tool can use a combination of a structure change mechanism, a sharing type change mechanism, and a data split definition (key pattern) change mechanism, to re-configure tenants, including using these mechanisms in a prescribed order, depending on the types of changes needed for a particular upgrade, as described in more detail below.

Regarding changes in table structure definitions, for a new software version, table definitions can change due to requirements of the application. A deployment procedure can adjust table structures. As described above, in a multi tenancy setup, a logical "single table" (e.g., from an application point of view) in a standard system can be replaced by a table and a view (e.g., for shared read-only tables) or two tables and a view (e.g., for mixed tables). A change in structure to the logical table may need to be carried through to a multiple-item construct (e.g., a table and a view, two tables and a view) in the multi-tenancy system. When a shared database container is exchanged with a new version, the tables in the shared database container already have the new table structure. Tenants can be updated by adjusting structures of tables and views as part of tenant deployment. Adjustment can be necessary, since if table structures and/or view structures do not match, select statements may return wrong results or result in an error.

Regarding changes in sharing type, it can be desired for a new version of the software to change table sharing. Having less tables shared than possible can increase total cost of ownership, so there may be a desire to identify additional tables to share over time. As described in more detail below, a change in sharing type can require moving data from a shared database container to tenant database container(s) and/or from tenant database container(s) to a shared database container. A change in sharing type can also result in the deletion of data from a tenant database container.

If an application expects a table to be of a certain table sharing type, having a different sharing type can lead to query errors upon data insert. For example, if the application wants to write a certain record, but the table is of sharing type read-only, the write statement will not be successful. In an upgrade, potentially various, different kinds of transitions between sharing types read-only, split, and local can be performed. As one example, an application can be configured to support persistency extensibility for key users in a multi tenancy setup. A customer may, at a given point in time, desire to add custom fields to a table. The table to be changed may currently be a read-only or split table type. Extensions to tables (adding fields) may only be allowed for local table types. Accordingly the table may need to change from a read-only or split table type to a local table type, in a next release.

Regarding a change in data split definition, two types of changes can occur. First, additional content may need to be shared. For example, an application (or an administrator or developer) can identify that certain content has never been modified by customers. A decision can be made to share these records so as to lower total cost of ownership and to speed up change deployments. Second, a determination may be made that certain data can no longer be shared. An application (or an administrator or developer) can determine that certain currently-shared entries need to be modifiable.

If a data split definition is changed, stored data may need to be adjusted (e.g., moved) to match the updated definition. The data split definition is a type of contract with an application, to let an application know which values of records can be written to and stored in tenant database containers. If a data split definition changes, data can be moved so that the data split definition consistently describes data stored in tenant database containers (and correspondingly, data stored in the shared database container, e.g., using the complement of the data split definition). Adjusting stored data to match updated data split definitions can avoid uniqueness constraint violations, data loss, and other issues.

Figure 49:
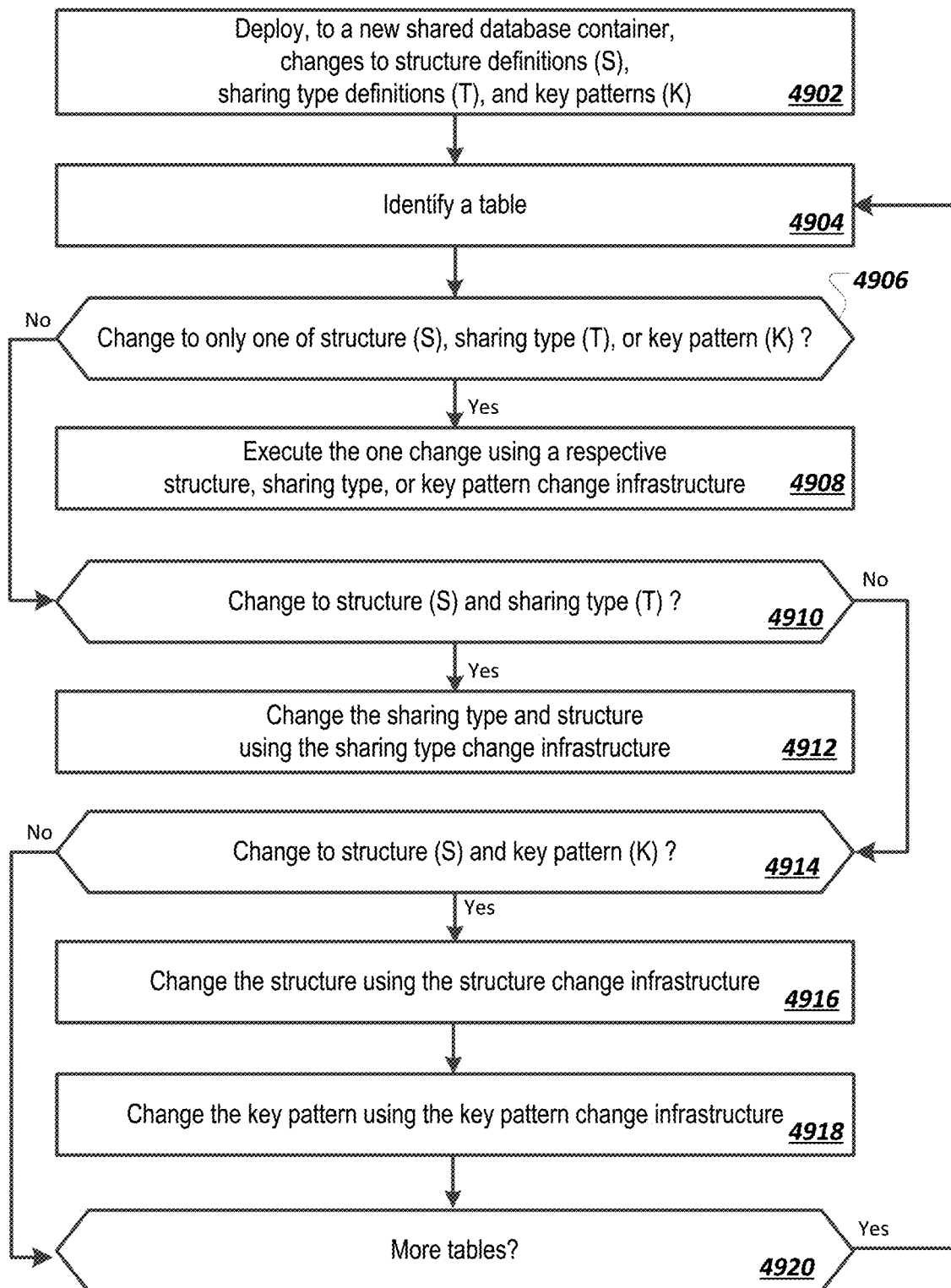
FIG. 49 is a flowchart of an example method for applying different types of changes to a multi-tenancy database system.

FIG. 49 is a flowchart of an example method 4900 for applying different types of changes to a multi-tenancy database system. It will be understood that method 4900 and related methods may be performed, for example, by any suitable system, environment, software, and hardware, or a combination of systems, environments, software, and hardware, as appropriate. For example, one or more of a client, a server, or other computing device can be used to execute method 4900 and related methods and obtain any data from the memory of a client, the server, or the other computing device. In some implementations, the method 4900 and related methods are executed by one or more components of the system 100 described above with respect to FIG. 1. For example, the method 4900 and related methods can be executed by the change management system of FIG. 1.

At 4902, changes to structure definitions (S), sharing type definitions (T), and key patterns (K) are deployed, to a new shared database container, for a set of tables in a database system. The new shared database container includes tables already in a target structure and includes tables that are now to be shared as defined in the target version of the product (e.g., if a table is changed in sharing type, the new shared database container includes the shared part of the table, or the entire table if the table is now completely shared). Similarly, if a table is changed in split definition, a new version of the shared table in the new shared database container includes content consistent with the new split definition.

At 4904, a table in the set of tables is identified, for purposes of computing a set of actions to be executed for the table, for completing a tenant portion of the deployment.

At 4906, a determination is made as to whether a change to only one of a structure definition, a sharing type definition, or a key pattern is to be made for the identified table.

At 4908, if a change to only one of the structure definition, the sharing type definition, or the key pattern is to be made for the identified table, the one change is executed using a respective structure, sharing type, or key pattern change infrastructure. The sharing type change infrastructure is described below with respect to FIGS. 50-53. The key pattern change infrastructure is described below with respect to FIG. 54.

The structure change infrastructure, which can be part of or otherwise associated with a data dictionary, can include a mechanism for defining table and view structures. The structure change infrastructure can compute table create statements and table change operations, based on table structures and target definitions. The structure change infrastructure can compute view statements out of a table definition, e.g., a view that selects all fields of a table. The structure change infrastructure can compute view statements for a view in one database container, that selects data from another database container and another schema, with the view reading the other data base container name and schema definition as an input parameter.

For a change in structure of a writable table, the structure change infrastructure can adjust the structure of the writable table in place, in the tenant database container. For a change in structure of a read-only table, the structure change infrastructure can drop, in the tenant database container, a view to the old table in the old shared container and create a view, in the tenant database container, to the new table in the new shared database container, with the new view having a new structure (as compared to the old, dropped view) that matches the structure of the new read-only table.

For a change in structure of a split table, the structure change infrastructure can: 1) drop, in the tenant database container, a view to the old read-only table portion of the split table in the old shared database container; 2) drop, in the tenant database container, the union view for the split table; 3) adjust the writable table portion of the split table in the tenant database container; and 4) create a new union view, in the tenant database container, with the union view having a new structure that is the union of the structure of a new read-only table portion of the split table in the shared database container and the adjusted writable table portion of the split table in the tenant database container.

At 4910, a determination is made as to whether a change to the structure definition and the sharing type definition is to be made to the identified table.

At 4912, if a change to the structure definition and the sharing type definition is to be made to the identified table, the change to the sharing type definition is executed using the sharing type change infrastructure including integration of the change to the structure definition by the sharing type change infrastructure.

At 4914, a determination is made as to whether a change to the structure definition and the key pattern is to be made to the identified table.

At 4916, if a change to the structure definition and the key pattern is to be made to the identified table, the structure definition is changed first using the structure change infrastructure.

At 4918, if a change to the structure definition and the key pattern is to be made to the identified table, they key pattern is changed using the key pattern change infrastructure after the structure definition has been changed by the structure change infrastructure.

At 4920, a determination is made as to whether there are more tables to process. If there are more tables to process, a next table is identified (e.g., at 4904, and processed). A combination of a change to both the sharing type and the key pattern will generally not happen at the same time for a given table, since a key pattern change would indicate that the sharing type of the table is split both before and after the table is modified.

Figure 50:
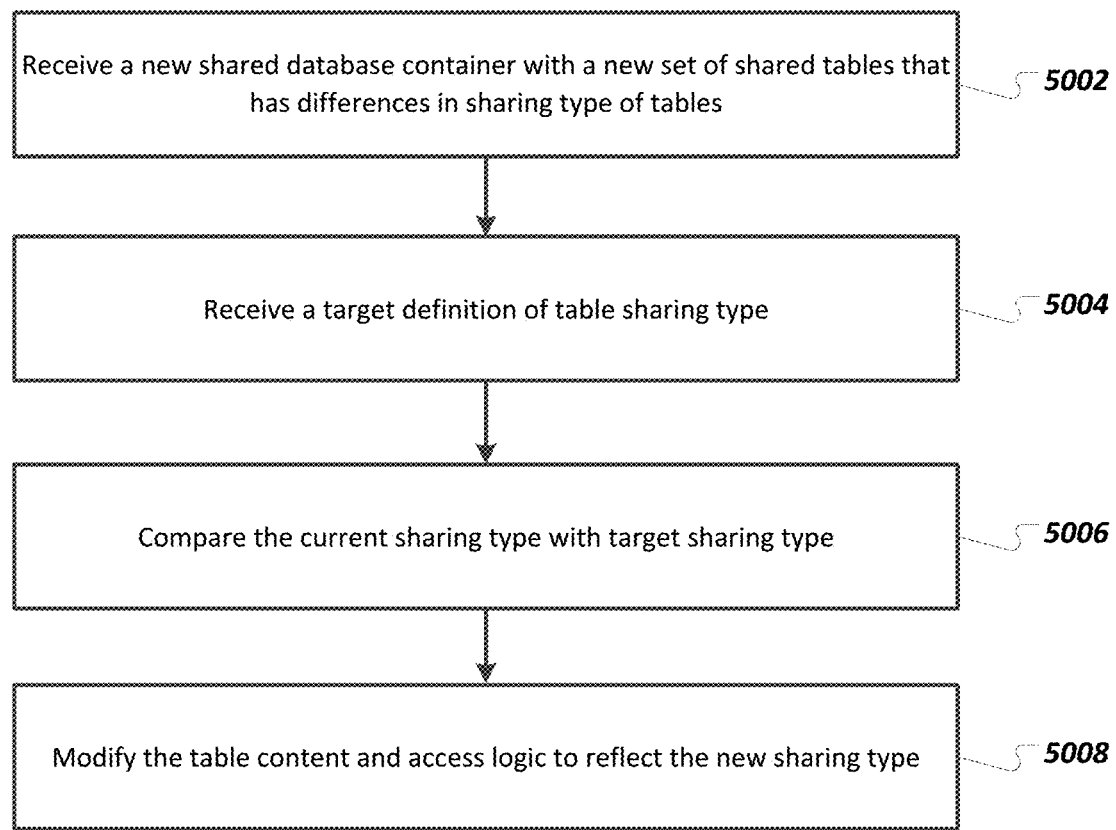
FIG. 50 is a flowchart of an example method for changing a sharing type of one or more tables.

FIG. 50 is a flowchart of an example method 5000 for changing a sharing type of one or more tables. It will be understood that method 5000 and related methods may be performed, for example, by any suitable system, environment, software, and hardware, or a combination of systems, environments, software, and hardware, as appropriate. For example, one or more of a client, a server, or other computing device can be used to execute method 5000 and related methods and obtain any data from the memory of a client, the server, or the other computing device. In some implementations, the method 5000 and related methods are executed by one or more components of the system 100 described above with respect to FIG. 1. For example, the method 5000 and related methods can be executed by the sharing type change infrastructure 140 of FIG. 1.

At 5002, a new shared database container is received with a new set of shared tables that has differences in sharing types for at least some of the new set of shared tables as compared to an old set of tables in an old shared container.

At 5004, a target definition of sharing types is received for the new set of tables. The target definition can include changes to sharing type for one or more tables. A desire to change a sharing type can occur, for example, if a determination is made that remote access of shared data by a tenant has unacceptable performance (e.g., a shared table may be used in a complex view). A desired change may be to make a currently-shared table a local table to improve performance. As another example and as described above, a decision can be made to share more tables than are currently being shared, or to allow for more extensions to tables, which can result in more tables being defined as local tables. A change in sharing type can require more tables, less tables, or new tables to be stored in the shared database container.

At 5006, a current sharing type is compared to a target sharing type for each table in a tenant container. Given the three sharing types of shared read-only, split, and local, six different types of sharing type changes can be identified, including: 1) from shared read-only to local (R→L); 2) from shared read-only to split (R→W); 3) from local to shared read-only (L→R); 4) from local to split (L→W); 5) from split to shared read-only (W→R); and 6) from split to local (W→L).

At 5008, table content and access logic is changed in the tenant container, for each table, to reflect the new sharing type of the respective table. Modifying table content and access logic can include: deleting content in the tenant and linking to content in the shared database container; copying content from the shared database container to the tenant database container and removing link(s) to the shared database container; splitting data by copying tenant data to a new table and creating a union view on tenant and shared data; and merging data by copying shared data to the tenant database container and removing a union view. Further, more-specific details of changing from one sharing type to another sharing type are described below with respect to FIGS. 51 to 53.

FIG. 51 is a table 5100 that illustrates a transition from a first table type to a second, different table type. For example, a table of type local 5102 ("L") can be converted to a table of type shared read-only 5104 ("R") or split 5106 ("W", with split being another term for a mixed table). A table of type shared read-only 5108 can be converted to a table of type local 5110 or the type split 5106. A table of type split 5112 can be converted to a table of the type shared read-only 5104 or the type local 5110.

Figure 52:
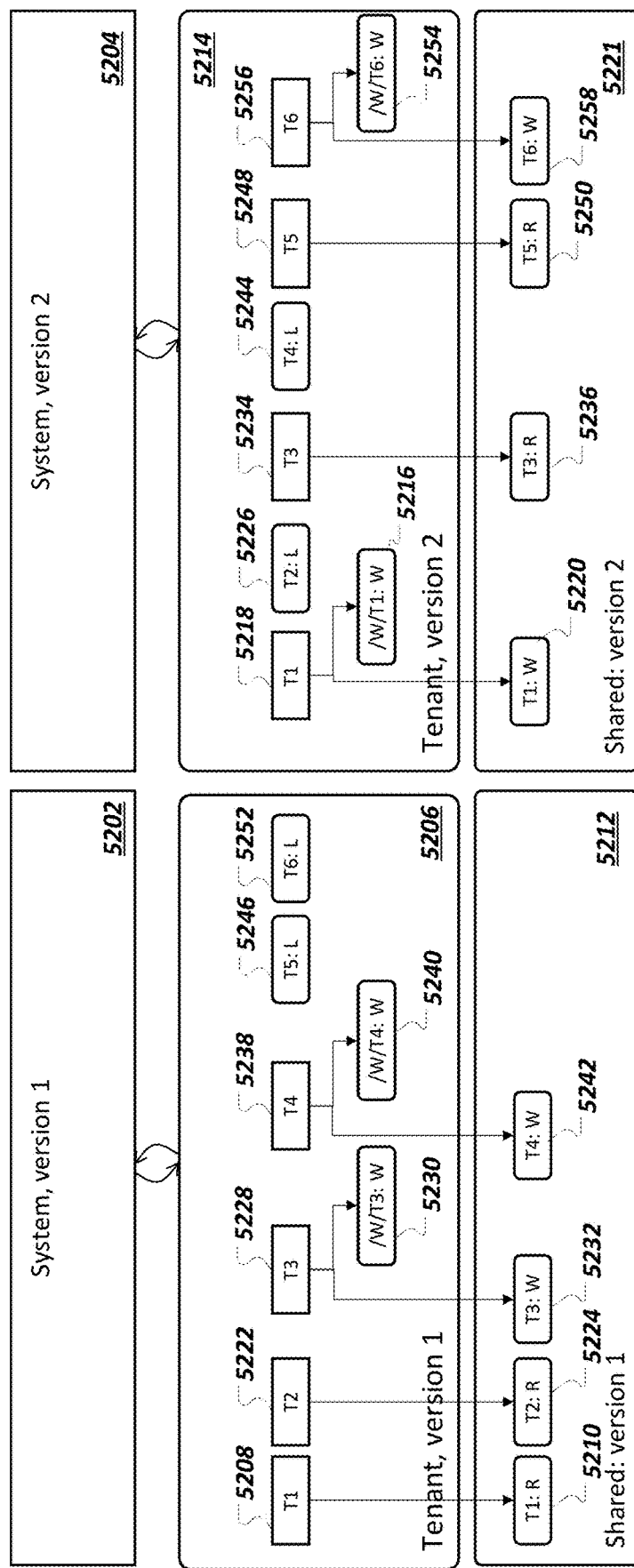
FIG. 52 illustrates a system which includes a first system that is at a first version and a second system that is at a second, later version.

As indicated in a cell 5114, a conversion from the table type shared read-only 5108 to the table type split 5106 (e.g., R→W) can include processing operations of dropping a view to a shared table 5114*a*, creating a "/W/TAB" tenant-local table 5114*b*, and creating a union view 5114*c*. For example, FIG. 52 illustrates a system 5200 which includes a first system 5202 that is at a first version and a second system 5204 that is at a second, later version. A tenant container 5206 included in the first system 5202 includes a read-only view 5208 on a shared table 5210 that is included in a shared container 5212, with the read-only view 5208 and the shared table 5210 being an implementation of the shared read-only table type 5108. A ":R" indicator in the "T1:R" label for the shared read-only table 5210 indicates that the shared read-only table 5210 is part of a shared read-only implementation.

As represented by the cell 5114, a conversion is performed to change an implementation of the shared read-only table type 5108 to an implementation of the split table type 5106 in the second system 5204. In the conversion from the first system 5202 to the second system 5204, the read-only view 5208 is dropped (e.g., processing operation 5114*a*). For example, the read-only view 5208 is not included in a tenant container 5214 in the second system 5204. A writable table 5216 (e.g., "/W/T1") is created in the tenant container 5214 (e.g., processing operation 5114b). A union view 5218 is created in the tenant container 5214 for the writable table 5216 and a shared table 5220 in a shared container 5221 (e.g., processing operation 5114c, with the shared table 5220 corresponding to the shared table 5210). The writable table 5216, the union view 5218, and the shared table 5220 are an implementation of the split table type 5106 in the second system 5204. A ":W" indicator in the "T1:W" label for the shared table 5220 and in the "/W/T1:W" label for the writable table 5216 respectively indicate that the shared table 5220 and the writable table 5216 are part of a split table implementation. If a table structure change is to be performed for the table as well as the sharing type change, the table structure change can be performed on the local table after the sharing type change has completed.

Figure 53:
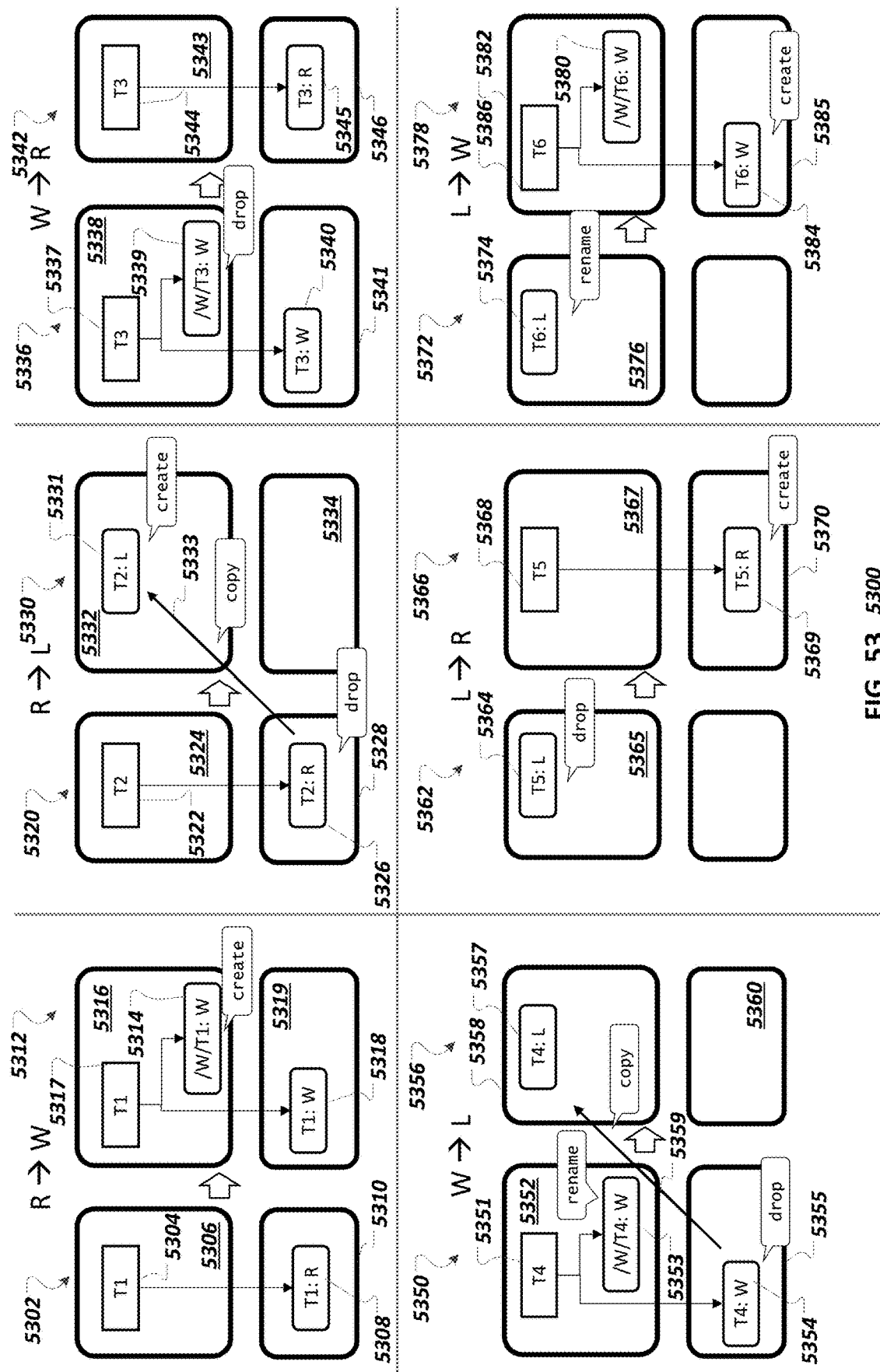
FIG. 53 illustrates conversions between various table types.

FIG. 53 illustrates conversions between various table types. The conversions between table types include a conversion from the shared read-only type 5108 ("R") to the split table type 5106 ("W"). For example, a prior-version system 5302 includes an implementation of a shared read-only type, as a read-only view 5304 in a tenant container 5306 and a shared table 5308 in a shared container 5310. A current-version system 5312 illustrates content of the prior-version system 5302 after a conversion from the shared read-only type 5108 ("R") to the split table type 5106 ("W"). The read-only view 5304 has been dropped, a writable table 5314 has been created in a tenant container 5316 (the tenant container 5316 being a post-conversion illustration of the tenant container 5306), and a union view 5317 has been created in the tenant container 5316 to provide access to the writable table 5314 and a shared table 5318 in a shared container 5319 (with the shared table 5318 corresponding to the shared table 5308 and the shared container 5319 being a post-conversion illustration of the shared container 5310).

Referring again to FIG. 51, as indicated in a cell 5116, a conversion from the shared read-only table type 5108 to the local table type 5110 (e.g., R→L) can include processing operations of dropping a view 5116a, creating a table 5116b, and copying data from a shared table 5116c. For example and as shown in FIG. 52, the tenant container 5206 includes a read-only view 5222 on a shared table 5224 that is included in the shared container 5212, with the read-only view 5222 and the shared table 5224 being an implementation of the shared read-only table type 5108 in the first system 5202. If a table structure change is to be performed for the table as well as the sharing type change, the table structure change can be performed on the local table after the sharing type change has completed.

As represented by the cell 5116, an implementation of the shared read-only table type 5108 is changed to be an implementation of the local table type 5110 in the second system 5204. In the conversion from the first system 5202 to the second system 5204, the read-only view 5222 is dropped (e.g., processing operation 5116a). For example, the read-only view 5222 is not included in the tenant container 5214 in the second system 5204. A local table 5226 (e.g., "T2") is created in the tenant container 5214 (e.g., processing operation 5116b). Data is copied from the shared table 5224 to the created local table 5226. The local table 5226 is an implementation of the local table type 5110 in the second system 5204, as indicated by a ":L" in the "T2:L" label for the local table 5226. In some implementations, the shared table 5224 is dropped after data is copied to the local table 5226.

FIG. 53 includes another illustration of a conversion from the shared read-only table type 5108 ("R") to the local table type 5110 ("L"). For example, a prior-version system 5320 includes an implementation of a shared read-only type, as a read-only view 5322 in a tenant container 5324 and a shared table 5326 in a shared container 5328. A current-version system 5330 illustrates content of the prior-version system 5320 after a conversion from the shared read-only type 5108 ("R") to the local table type 5110 ("L"). The read-only view 5322 has been dropped, a local table 5331 has been created in a tenant container 5332 (the tenant container 5332 being a post-conversion illustration of the tenant container 5324), data has been copied from the shared table 5326 to the local table 5331 (e.g., as illustrated by an arrow 5333), and the shared table 5326 has been dropped after completion of the data copy operation (e.g., there is no shared table in a shared container 5334 that is a post-conversion illustration of the shared container 5328).

Referring again to FIG. 51, as indicated in a cell 5118, a conversion from the split table type 5112 to the shared read-only 5104 table type (e.g., W R) can include processing operations of dropping a local table 5118a, dropping a union view 5118b, and creating a view to a shared table 5118c. For example and as shown in FIG. 52, the tenant container 5206 includes a union view 5228 and a local table 5230 and the shared container 5212 includes a shared table 5232, with the union view 5228, the local table 5230, and the shared table 5232 being an implementation of the split table type 5108 in the first system 5202.

As represented by the cell 5118, an implementation of the split table type 5112 is changed to be an implementation of the shared read-only type table type 5104 in the second system 5204. In the conversion from the first system 5202 to the second system 5204, the local table 5230 is dropped (e.g., processing operation 5118a) and the union view 5228 is dropped (e.g., processing operation 5118b). For example, the local table 5230 and the union view 5228 are not included in the tenant container 5214 in the second system 5204. In some implementations, if the local table 5230 includes content, data from the local table 5230 can be stored in a quarantine table for analysis and potential data retrieval after the deployment. A read-only view 5234 is created in the tenant container 5214 to a shared table 5236 included in the shared container 5221, with the shared table 5236 corresponding to the shared table 5232. The read-only view 5234 and the shared table 5236 are an implementation of the shared read-only table type 5104 in the second system 5204.

FIG. 53 includes another illustration of a conversion from the split table type 5112 ("W") to the shared read-only table type 5104 ("R"). For example, a prior-version system 5336 includes an implementation of the split type, as a union view 5337 in a tenant container 5338 that provides access to a local table 5339 in the tenant container 5338 and a shared table 5340 in a shared container 5341. A current-version system 5342 illustrates content of the prior-version system 5336 after a conversion from the split table type 5112 ("W") to the shared read-only table type 5104 ("R"). The local table 5339 and the union view 5337 have been dropped (e.g., the local table 5339 and the union view 5337 do not appear in a tenant container 5343 (the tenant container 5343 being a post-conversion illustration of the tenant container 5338). A read-only view 5344 has been created in the tenant container 5343 to provide access to a shared table 5345 in a shared container 5346 (with the shared table 5345 corresponding to the shared table 5340).

Referring again to FIG. 51, as indicated in a cell 5120, a conversion from the split table type 5112 to the local table type 5210 (e.g., W→L) can include processing operations of copying data from a shared table to a local table 5120*a* and establishing one table (e.g., as a local table) 5120*b*. For example and as shown in FIG. 52, the tenant container 5206 includes a union view 5238 and a writable table 5240 and the shared container 5212 includes a shared table 5242, with the union view 5238, the writable table 5240, and the shared table 5242 being an implementation of the split table type 5108 in the first system 5202. If a table structure change is to be performed for the table as well as the sharing type change, the table structure change can be performed on the local table after the sharing type change has completed.

As represented by the cell 5120, an implementation of the split table type 5112 can be changed to be an implementation of the local table type 5110 in the second system 5204. In the conversion from the first system 5202 to the second system 5204, data is copied from the shared table 5242 to the writable table 5240 (e.g., processing operation 5220*a*). At processing operation 5220*b*, one table is established as a local table in the tenant container 5214 (e.g., processing operation 5220*b*). For example, the shared table 5242 and the union view 5238 can be dropped. For example, the shared table 5242 and the union view 5238 are not included in the tenant container 5214 in the second system 5204. The writable table 5240 can be renamed, in the tenant container 5214, e.g., from an alternative name (e.g., "/W/T4") to a "standard" name (e.g., "T4"), as shown for a writable table 5244. The writable table 5244 is an implementation of the local table type 5110 in the second system 5204.

FIG. 53 includes another illustration of a conversion from the split table type 5112 ("W") to the local table type 5110 ("L"). For example, a prior-version system 5350 includes an implementation of the split type, as a union view 5351 in a tenant container 5352 that provides access to a local table 5353 in the tenant container 5351 and a shared table 5354 in a shared container 5355. A current-version system 5356 illustrates content of the prior-version system 5350 after a conversion from the split table type 5112 ("W") to the local table type 5110 ("L"). The writable table 5353 has been renamed from "/W/T4" to "T4", as illustrated by a local table 5357 in a tenant container 5358 (the tenant container 5358 being a post-conversion illustration of the tenant container 5352). Data has been copied from the shared table 5354 to the local table 5357, as illustrated by an arrow 5359. After data has been copied, the shared table 5354 has been dropped. The union view 5351 has also been dropped. For example, the shared table 5354 does not appear in a shared container 5360 in the current-version system 5356 and the union view 5351 does not appear in the tenant container 5358.

Referring again to FIG. 51, as indicated in a cell 5122, a conversion from the local table type 5102 to the shared read-only table type 5104 (e.g., L→R) can include processing operations of dropping a local table 5122*a* and creating a view to a shared table 5122*b*. For example and as shown in FIG. 52, the tenant container 5206 includes a local table 5246 that is an implementation of the local table type 5110 in the first system 5202.

As described in the cell 5122, the local table 5246 is dropped (e.g., processing operation 5122*a*). For example, the local table 5246 is not included in the tenant container 5214 in the second system 5204. In some implementations, if the local table 5426 includes content, data from the local table 5426 can be stored in a quarantine table for analysis and potential data retrieval after the deployment. A read-only view 5248 is created to access a shared table 5250 in the shared container 5221. The shared table 5250 may already exist in the shared container 5221 (e.g., to service other tenants) or may be created in the shared container 5221. The read-only view 5248 and the shared table 5250 are an implementation of the shared read-only table type 5104 in the second system 5204.

FIG. 53 includes another illustration of a conversion from the local table type 5110 ("L") to the shared read-only table type 5104 ("R"). For example, a prior-version system 5362 includes an implementation of the local type, as a local table 5364 in a tenant container 5365. A current-version system 5366 illustrates content of the prior-version system 5362 after a conversion from the local table type 5110 ("L") to the shared read-only table type 5104 ("R"). The local table 5364 has been dropped (e.g., the local table 5364 does not appear in a tenant container 5367 in the current-version system 5366 (the tenant container 5367 being a post-conversion illustration of the tenant container 5365). A read-only view 5368 has been created in the tenant container 5367 to provide access to a shared table 5369 in a shared container 5370 included in the current-version system 5366. The shared table 5369 may have already existed in the shared container 5370 (e.g., to service other tenants) or have been created in the shared container 5370 as part of the conversion.

Referring again to FIG. 51, as indicated in a cell 5124, a conversion from the local table type 5102 to the split table type 5106 (e.g., L→W) can include processing operations of copying current data according to key patterns to a writable table 5124*a*, dropping an old table 5124*b*, and creating a union view 5124*c*. For example and as shown in FIG. 52, the tenant container 5206 includes a local table 5252 that is an implementation of the local table type 5110 in the first system 5202.

As described in the cell 5124, data is copied from the local table 5252 to a writable table 5254 in the tenant container 5214 (e.g., processing operation 5124*a*). For example, the table 5252 can be temporarily renamed (e.g., to "/OLD/T6"), the writable table 5254 can be created (e.g. with name "/W/T6"), and data can be copied from the local table 5252 to the writable table 5254 according to defined key patterns. After data has been copied, the local table 5252 can be dropped (e.g., processing operation 5124*b*). A union view 5256 can be created for the writable table 5254 and a shared table 5258 in the shared container 5221 (e.g., processing operation 5124*c*). The shared table 5258 may already exist in the shared container 5221 (e.g., to service other tenants) or may be created in the shared container 5221. The union view 5256, the shared table 5258, and the writable table 5254 are an implementation of the split table type 5106 in the second system 5204. If a table structure change is to be performed for the table as well as the sharing type change, the table structure change can be performed on the writable table 5254 before the union view 5256 is created.

FIG. 53 includes another illustration of a conversion from the local table type 5110 ("L") to the split table type 5106 ("W"). For example, a prior-version system 5372 includes an implementation of the local type, as a local table 5374 in a tenant container 5376. A current-version system 5378 illustrates content of the prior-version system 5372 after a conversion from the local table type 5110 ("L") to the split table type 5106 ("W"). Instead of copying data from the local table 5374 to a new writable table, as described above for the local table 5252 and the writable table 5254, the local table 5374 can be renamed (e.g., from "T6" to "/W/T6"), as illustrated by a writable table 5380 in a tenant container 5382 (the tenant container 5382 being a post-conversion illustration of the tenant container 5376). A shared table 5384 has been created in a shared container 5385 in the current-version system 5378. A union view 5386 has been created in the tenant container 5382, to provide access to the writable table 5380 and the shared table 5384.

Figure 54:
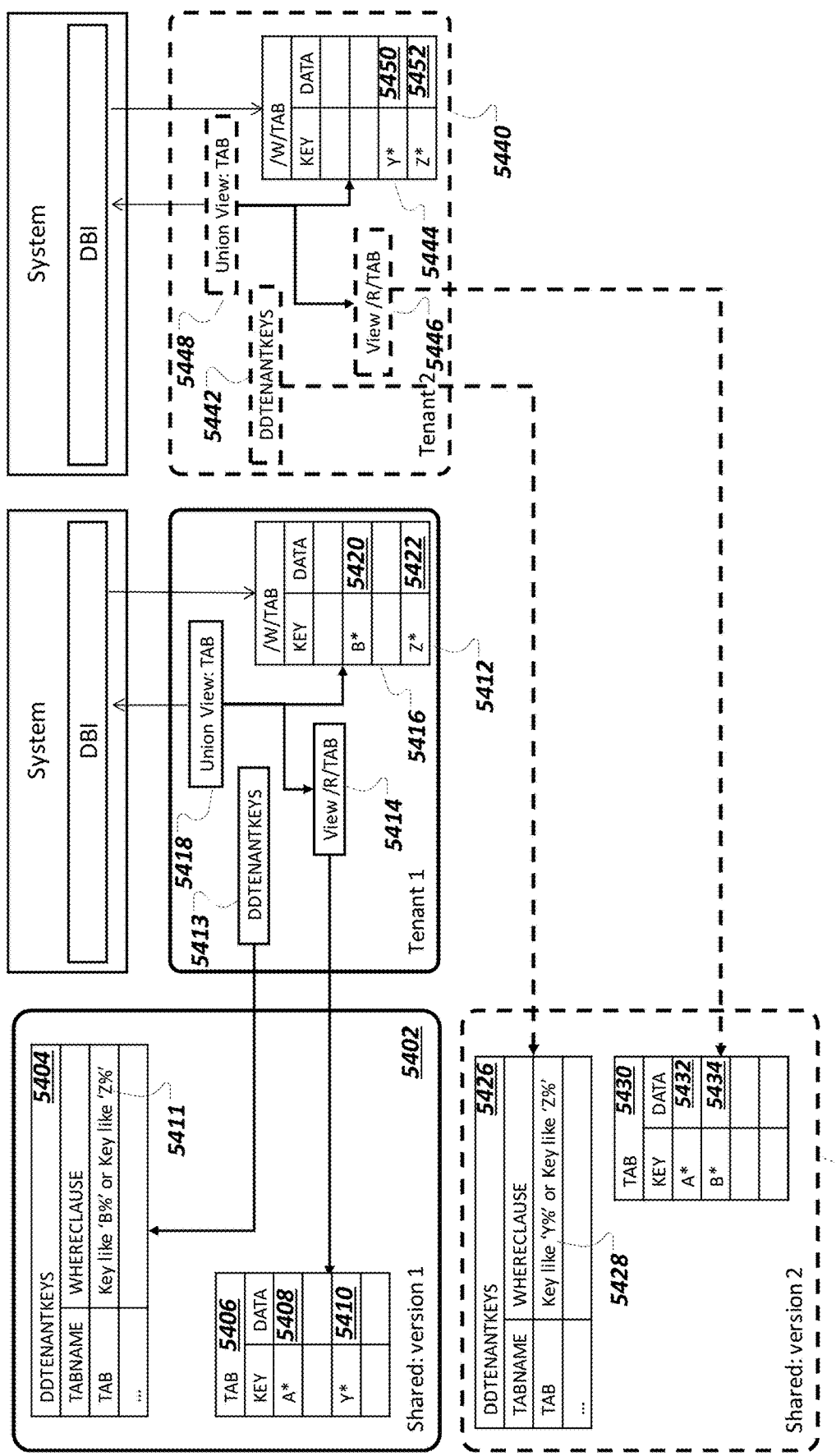
FIG. 54 illustrates a system for changing tenant keys when exchanging a shared database container.

FIG. 54 illustrates a system 5400 for changing tenant keys (e.g., split definition) when exchanging a shared database container. The changing of tenant keys can be performed by a split definition change infrastructure. The split definition change infrastructure includes a mechanism to store split definitions per table in an active and inactive state. The split definition change infrastructure can compute and execute DML (Data Manipulation Language) statements to copy data and delete data so that tables are in accordance with the split definition. As described above, a split definition (also referred to as a key pattern), can be defined using a WHERE clause, which defines records with can be stored in a local table portion of a mixed table, in a tenant database container.

The system 5400 includes a version-one shared database container 5402 that includes a tenant keys table 5404 and a read-only table 5406 that is a read-only portion of a mixed table named "TAB". The read-only table 5406 includes a record 5408 with a key that starts with "A" and a record 5410 with a key that starts with "Y". The keys of the records 5408 and 5410 are in compliance with a WHERE clause 5411 included in the tenant keys table 5404. The WHERE clause 5411 defines keys that are allowed to be written for tenants, and a complement of the WHERE clause 5411 defines keys that are allowed to be stored in the read-only table 5406. The key values of "A*" and "Y*" for the records 5408 and 5410, respectively, match a complement of the WHERE clause 5411 of "NOT (Key like 'B %' or Key like 'Z %'). In other words, the keys for the records 5408 and 5410 do not start with either "B" or "Z".

A version-one tenant database container 5412 for a first tenant includes a view 5413 to the tenant keys table 5404, a view 5414 to the read-only table 5406, a writable table 5416 that is a writable portion of the "TAB" mixed table, and a union view 5418 to the writable table 5416 and the read-only table 5406 (through the view 5414). The writable table 5416 includes a record 5420 with a key that starts with "B" (e.g., matching the WHERE clause 5411) and a record 5422 with a key that starts with "Z" (e.g., also matching the WHERE clause 5411).

During a deployment, developer(s) and/or administrator (s) may determine that the WHERE clause 5411 is now incorrect. For example, a determination may be made that records with keys that start with "Y" should no longer be shared (e.g., it may be desired that tenants are able to store local records with keys that start with "Y"). As another example, a determination may be made that records that start with "B" should now be shared (e.g., a determination may be made that tenant applications do not write local records that start with "B").

A version-two shared database container 5424 has been prepared for deployment of a version two of the system 5400. The version-two shared database container 5424 includes an updated tenant keys table 5426 that includes an updated WHERE clause 5428 that indicates that tenants are allowed to write, to the mixed table named "TAB", records that have keys that start with either "Y" or "Z". An updated read-only table 5430 includes records to be shared for the mixed table named "TAB". For example, the updated read-only table 5430 includes a record 5432 with a key starting with "A" (which may be a copy of the record 5408) and a record 5434 with a key starting with "B" (which may be a record that was previously provided to, but editable by tenants, but is now to be read-only and shared). The records 5432 and 5434 have keys that match the complement of the updated WHERE clause 5428. The record 5434 may be the same as or different than the record 5420. For example, the first tenant may have modified the record 5420 after the record 5420 was first provided to the first tenant.

An upgrade process can be used to upgrade tenant database containers to version two of the system 5400. For example, a version-two tenant database container 5440 has been upgraded to version two and is now connected to the version-two shared database container 5424. The version-two tenant database container 5440 includes a view 5442 to the updated tenant keys table 5426, an updated writable table 5444, an updated view 5446 to the updated read-only table 5430, and an updated union view 5448. The updated writable table 5444 includes a record 5450 with a key starting with "Y" (e.g., compatible with the updated WHERE clause 5428) and a record 5452 with a key starting with "Z" (e.g., also compatible with the updated WHERE clause 5428).

For purposes of the discussion below, assume that the contents of the version-two tenant database container 5440 was the same as the version-one tenant database container 5412 before the version-two tenant database container 5440 was upgraded to version two, and accordingly, that the version-one tenant database container 5412 can be, for purposes of discussion, a pre-deployment view of the version-two tenant database container 5440.

A deployment tool can determine what to change in the version-one tenant database container 5412 during an upgrade of the version-one tenant database container 5412 to version two. The deployment tool can identify records in the read-only table 5406 that are to be moved from the read-only table 5406 to the writable table 5416 (e.g., records that used to be shared and that are no longer to be shared). The deployment tool can execute the following insert statement, to move records from the read-only table 5406 to the writable table 5416 (assuming the name of the shared database container 5402 is "shared_old" and that "<new-_where_condition>" is the updated WHERE clause 5428): INSERT INTO /W/TAB (SELECT * FROM shared_old-.TAB WHERE (<new_where_condition>)). The insert statement can result in the moving of the record 5410 to the writable table 5416 (e.g., as illustrated in the updated writable table 5444 by the record 5450), since the key "Y*" of the record 5410 matches the updated WHERE clause 5411.

The deployment tool can identify records to delete in the writable table 5416 (e.g., records that are no longer allowed to be stored locally as editable records by the first tenant). For example, the deployment tool can execute the following statement to delete records from the writable table 5416: DELETE FROM /W/TAB WHERE NOT (<new_where-_condition>). The delete statement can result in deletion of the record 5420 from the writable table 5416, since the key "B*" of the record 5420 does not match the updated WHERE clause 5428. For example, a similar record may have been deleted from the updated writable table 5444 during the upgrade of the updated writable table 5444 (e.g., the updated writable table 5444 does not include any records that start with "B"). The record 5420 can be moved to a quarantine location upon being deleted.

Example Methods

Figure 55:
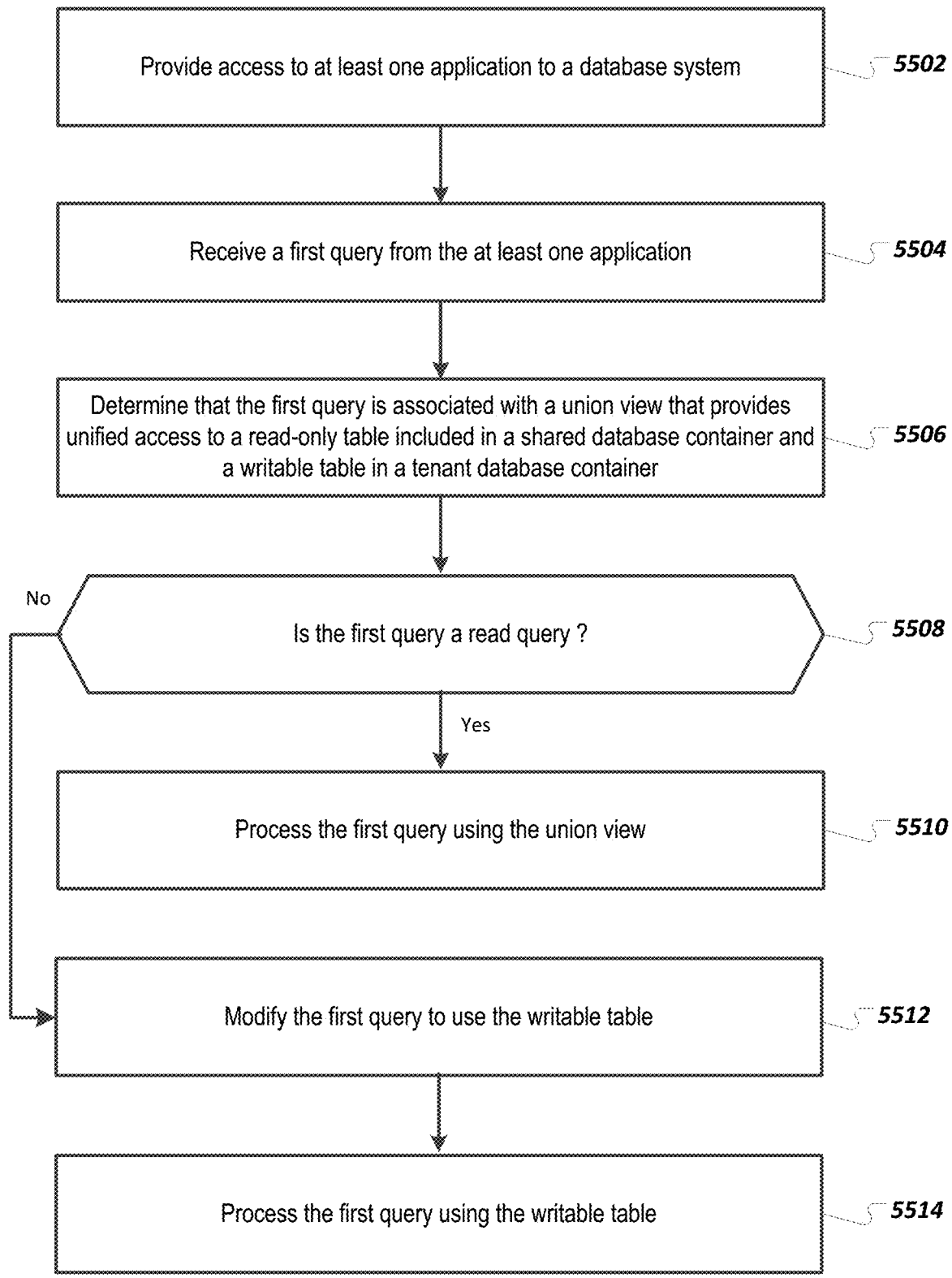
FIG. 55 is a flowchart of an example method for redirecting a write query.

FIG. 55 is a flowchart of an example method 5500 for redirecting a write query. It will be understood that method 5500 and related methods may be performed, for example, by any suitable system, environment, software, and hardware, or a combination of systems, environments, software, and hardware, as appropriate. For example, one or more of a client, a server, or other computing device can be used to execute method 5500 and related methods and obtain any data from the memory of a client, the server, or the other computing device. In some implementations, the method 5500 and related methods are executed by one or more components of the system 100 described above with respect to FIG. 1. For example, the method 5500 and related methods can be executed by the write redirecter 128 of FIG. 1.

At 5502, access is provided to at least one application to a database system. The at least one application can include one or more tenant applications. Access can be provided by a database interface, for example.

At 5504, a first query is received from the at least one application. The first query can be to retrieve, add, or edit data in the database system.

At 5506, a determination is made that the first query is associated with a union view that provides unified read-only access to a read-only table included in a shared database container and a writable table in a tenant database container, in the database system.

At 5508, a determination is made as to whether the first query is a read query. A read query retrieves but does not modify or add data to the database system.

At 5510, in response to determining that the first query is a read query, the first query is processed using the union view. Processing the first query using the union view can include retrieving data from one or both of the read-only table and the writable table.

At 5512, in response to determining that the first query is not a read query (e.g., the first query is a write query), the first query is modified to use the writable table, rather than the union view. The write query is thus redirected to use the writable table rather than the read-only union view.

At 5514, the first query is processed using the writable table. Processing the first query using the writable table can include modifying or adding data to the writable table.

Figure 56:
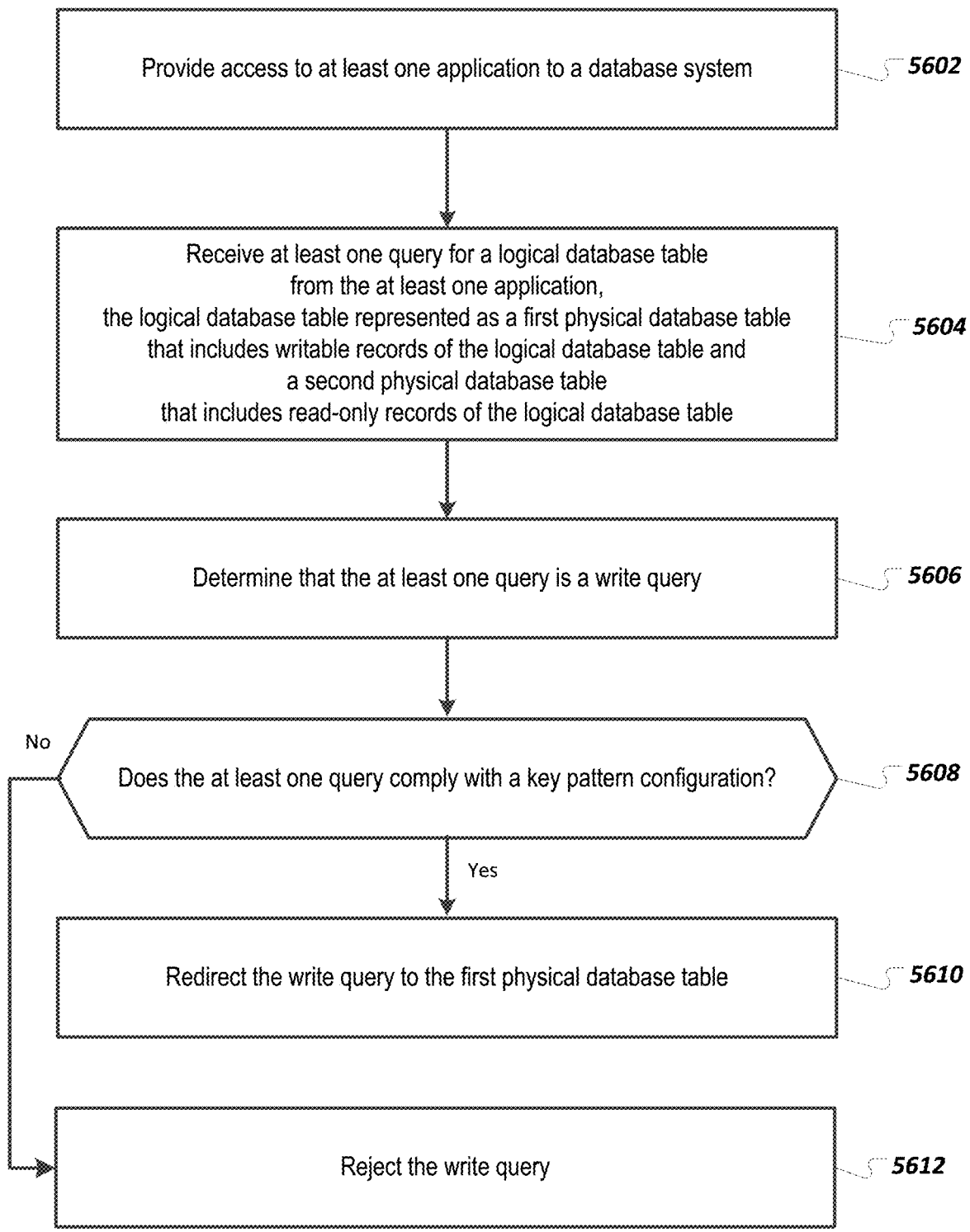
FIG. 56 is a flowchart of an example method for key pattern management.

FIG. 56 is a flowchart of an example method 5600 for key pattern management. It will be understood that method 5600 and related methods may be performed, for example, by any suitable system, environment, software, and hardware, or a combination of systems, environments, software, and hardware, as appropriate. For example, one or more of a client, a server, or other computing device can be used to execute method 5600 and related methods and obtain any data from the memory of a client, the server, or the other computing device. In some implementations, the method 5600 and related methods are executed by one or more components of the system 100 described above with respect to FIG. 1. For example, the method 5600 and related methods can be executed by the constraint enforcement system 126 of FIG. 1.

At 5602, access is provided to at least one application to a database system.

At 5604, at least one query for a logical database table is received from the at least one application. The logical database table is represented in the database system as a first physical database table that includes records of the logical database table that are allowed to be written by the at least one application and a second physical database table that includes records of the logical database table that are allowed to be read but not written by the at least one application.

At 5606, a determination is made that the at least one query is a write query. The write query is configured to modify or add data to the database system.

At 5608, a determination is made as to whether the at least one query complies with a key pattern configuration. The key pattern configuration describes keys of records that are included in or may be included in (e.g., added to) the first physical database table.

At 5610, in response to determining that the at least one query complies with the key pattern definition, the write query is redirected to the first physical database table. Redirecting can include modifying the write query to use the first physical database table rather than the logical database table.

At 5612, in response to determining that the at least one query does not comply with the key pattern configuration, the write query is rejected. Rejecting the write query can prevent records being added to the first physical database table that do not comply with the key pattern configuration.

Figure 57:
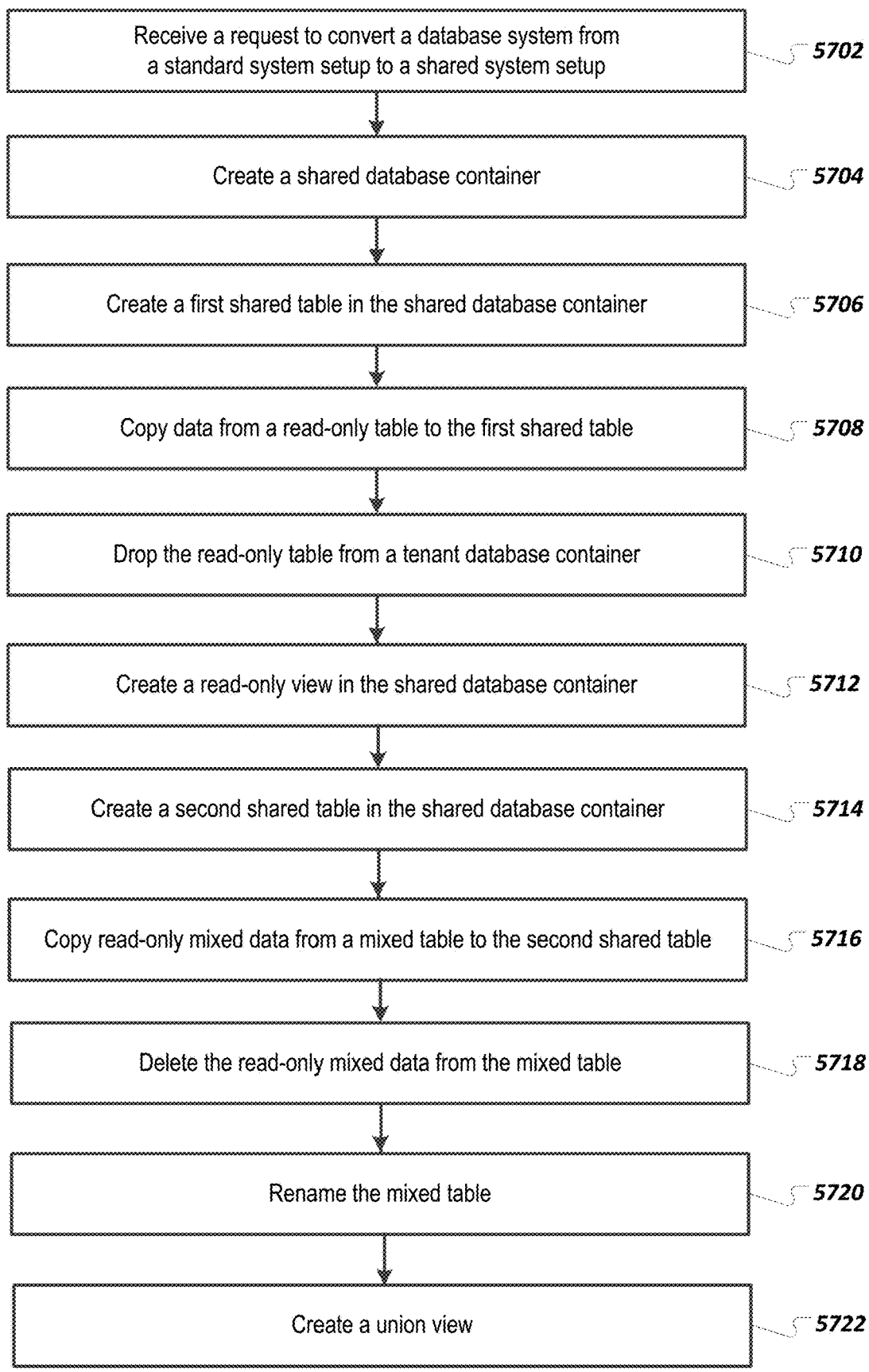
FIG. 57 is a flowchart of an example method for transitioning between system sharing types.

FIG. 57 is a flowchart of an example method 5700 for transitioning between system sharing types. It will be understood that method 5700 and related methods may be performed, for example, by any suitable system, environment, software, and hardware, or a combination of systems, environments, software, and hardware, as appropriate. For example, one or more of a client, a server, or other computing device can be used to execute method 5700 and related methods and obtain any data from the memory of a client, the server, or the other computing device. In some implementations, the method 5700 and related methods are executed by one or more components of the system 100 described above with respect to FIG. 1. For example, the method 5700 and related methods can be executed by the system sharing type modifier 148 of FIG. 1.

At 5702, a request is received to convert a database system from a standard system setup to a shared system setup. The database system includes a tenant database container. The tenant database container includes, before conversion of the database system from the standard system setup to the shared system setup: a read-only table for storing read-only data that is read but not written by application(s); a first writable table for storing writable data that is read and written by the application(s); and a mixed table for storing read-only mixed data that is read but not written by the application(s) and writable mixed data that is read and written by the application(s). Although a single read-only table, a single writable table, and a single mixed table are described, the tenant database container can include any combination of tables of various types.

At 5704, a shared database container is created, for storing shared content used by multiple tenants.

At 5706, a first shared table is created in the shared database container, for storing the read-only data that is read but not written by applications.

At 5708, data is copied from the read-only table to the first shared table.

At 5710, the read-only table is dropped from the tenant database container.

At 5712, a read-only view is created in the tenant database container, for providing read access to the first shared table.

At 5714, a second shared table is created in the shared database container, for storing the read-only mixed data.

At 5716, the read-only mixed data is copied from the mixed table to the second shared table.

At 5718, the read-only mixed data is deleted from the mixed table.

At 5720, the mixed table is renamed to be a second writable table.

At 5722, a union view is created to provide unified access to the second shared table and the second writable table.

Figure 58:
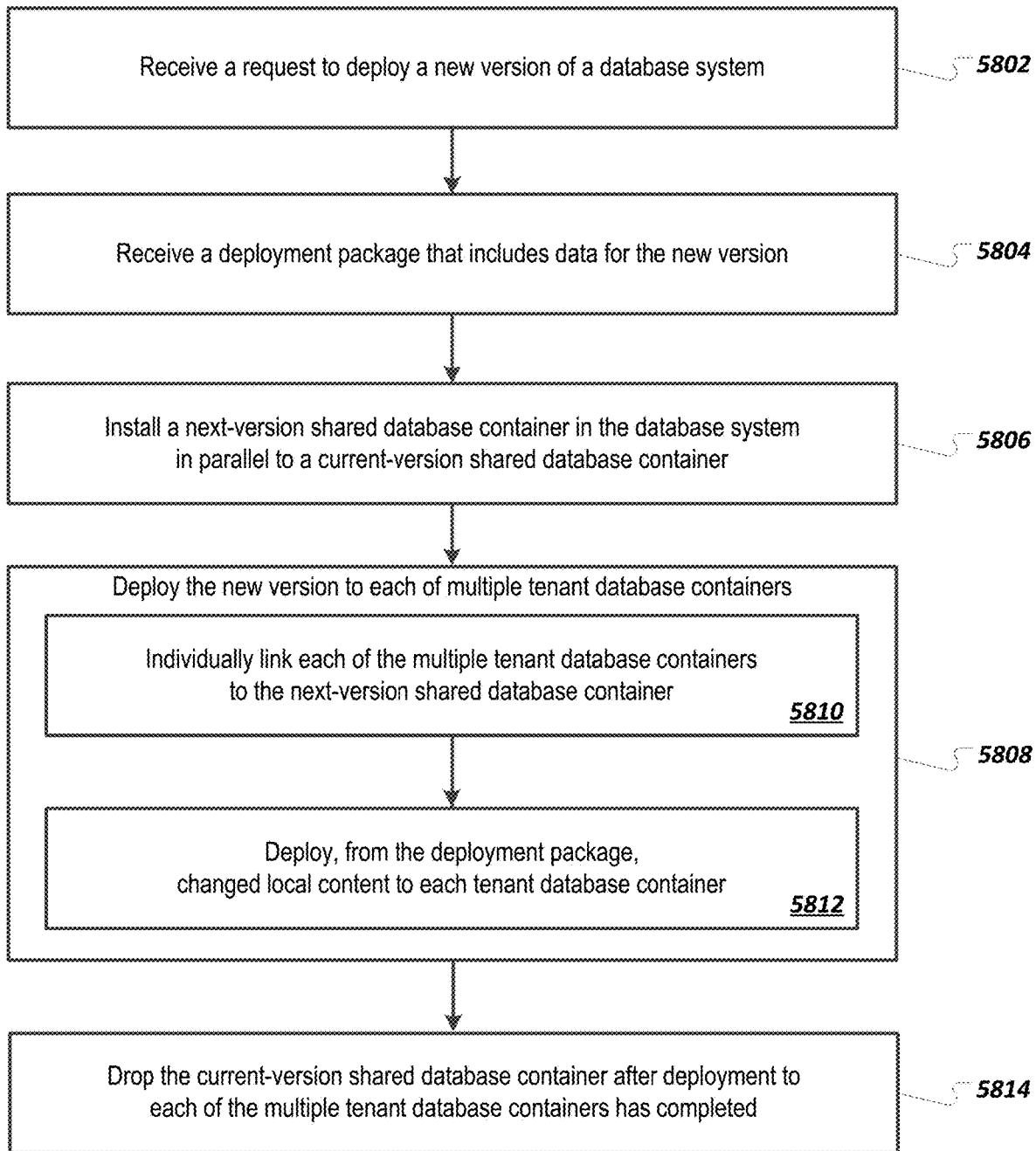
FIG. 58 is a flowchart of an example method for exchanging a shared database container.

FIG. 58 is a flowchart of an example method 5800 for exchanging a shared database container. It will be understood that method 5800 and related methods may be performed, for example, by any suitable system, environment, software, and hardware, or a combination of systems, environments, software, and hardware, as appropriate. For example, one or more of a client, a server, or other computing device can be used to execute method 5800 and related methods and obtain any data from the memory of a client, the server, or the other computing device. In some implementations, the method 5800 and related methods are executed by one or more components of the system 100 described above with respect to FIG. 1. For example, the method 5800 and related methods can be executed by the deployment tool 130 of FIG. 1.

At 5802, a request to deploy a new version of a database system is received.

At 5804, a deployment package is received that includes data for the new version of the database system.

At 5806, a next-version shared database container is installed in the database system in parallel to a current-version shared database container.

At 5808, the new version is deployed to each of multiple tenant database containers. Deploying the new version to each of the multiple tenant database containers includes individually linking, at 5810, each of the multiple tenant database containers to the next-version shared database container. The linking can include dropping at least one view in each respective tenant database container to shared content in the current-version shared database container and adding at least one new view in each respective tenant database container to the updated shared content in the next-version shared database container.

Deploying the new version to each of the multiple tenant database containers includes, at 5812, deploying, from the deployment package, changed local content to each tenant database container.

At 5814, the current-version shared database container is dropped, after deployment to each of the multiple tenant database containers has completed.

Figure 59:
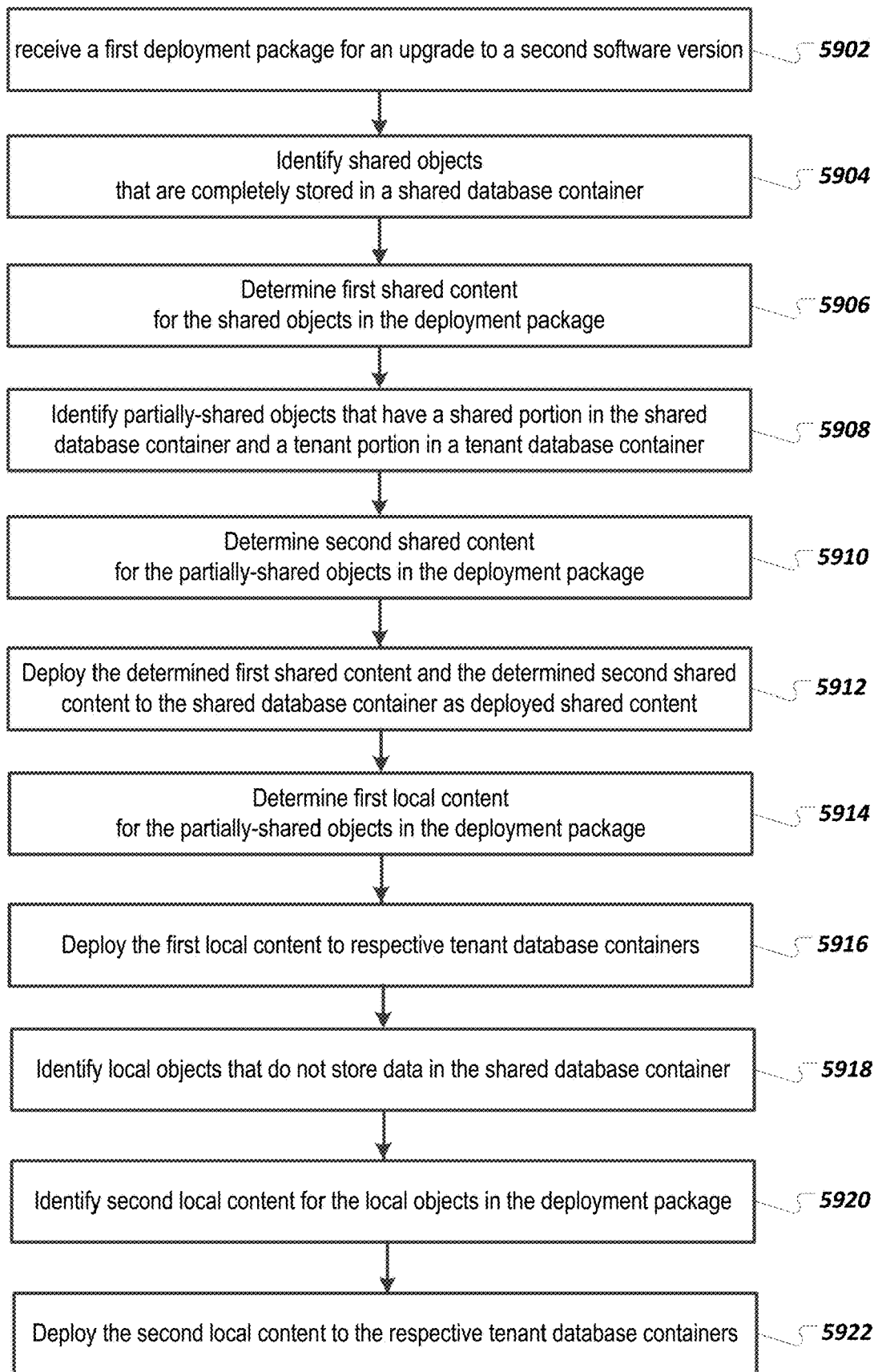
FIG. 59 is a flowchart of an example method for patching a shared database container.

FIG. 59 is a flowchart of an example method 5900 for patching a shared database container. It will be understood that method 5900 and related methods may be performed, for example, by any suitable system, environment, software, and hardware, or a combination of systems, environments, software, and hardware, as appropriate. For example, one or more of a client, a server, or other computing device can be used to execute method 5900 and related methods and obtain any data from the memory of a client, the server, or the other computing device. In some implementations, the method 5900 and related methods are executed by one or more components of the system 100 described above with respect to FIG. 1. For example, the method 5900 and related methods can be executed by the patching system 146 of FIG. 1.

At 5902, a first deployment package is received for an upgrade of a database system to a second software version. The upgrade can include deployment to a shared database container and one or more tenant database containers.

At 5904, shared objects that are completely stored in the shared database container are identified, from information in the deployment package.

At 5906, first shared content for the shared objects in the deployment package is determined.

At 5908, partially-shared objects that have a shared portion in the shared database container and a tenant portion in the tenant database container are identified.

At 5910, second shared content for the partially-shared objects in the deployment package is determined.

At 5912, the determined first shared content and the determined second shared content is deployed to the shared database container as deployed shared content.

At 5914, first local content for the partially-shared objects in the deployment package is determined.

At 5916, the first local content is deployed to respective tenant database containers.

At 5918, local objects that do not store data in the shared database container are identified.

At 5920, second local content for the local objects in the deployment package is identified.

At 5922, the second local content is deployed to the respective tenant database containers.

Figure 60:
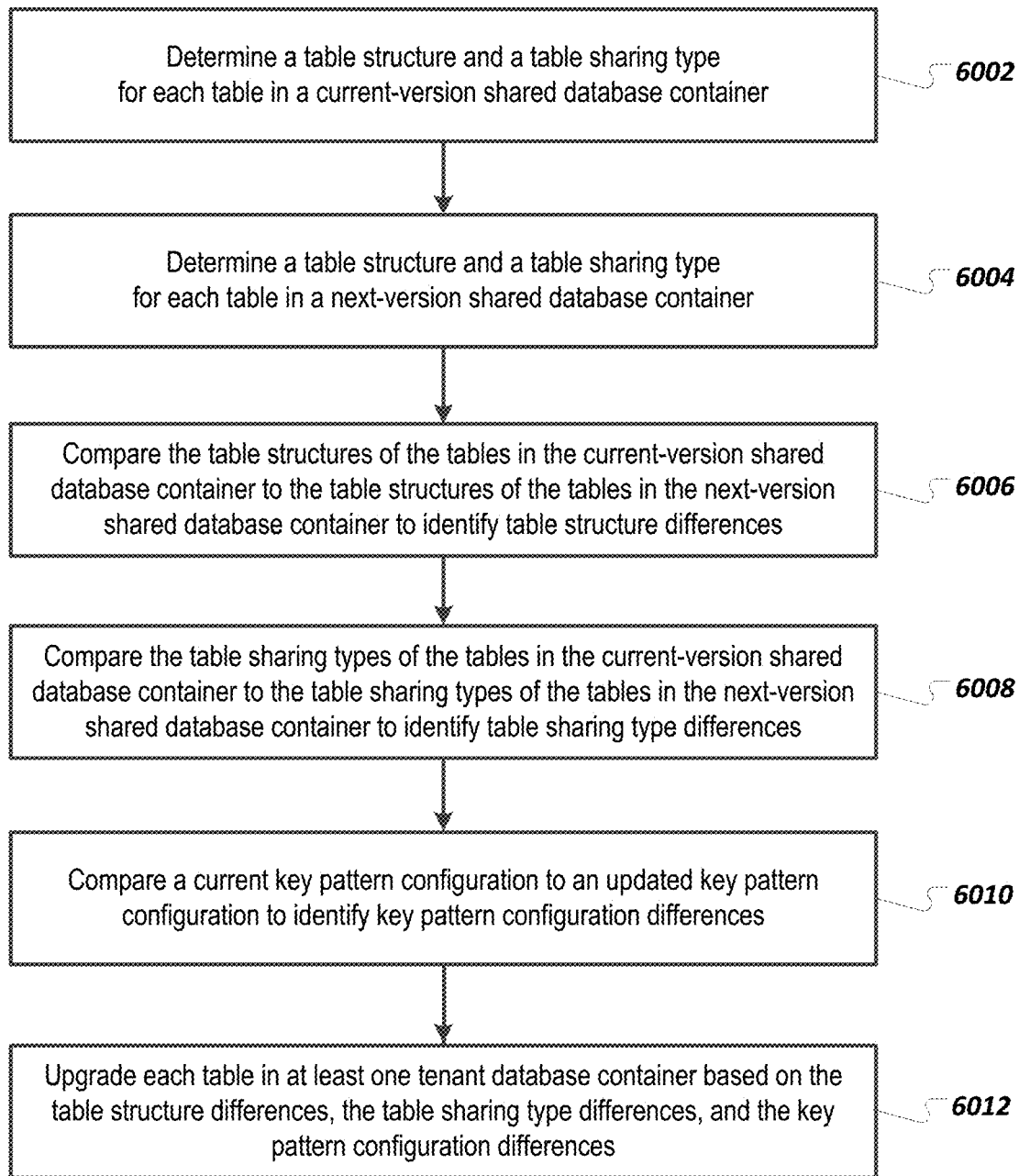
FIG. 60 is a flowchart of an example method for deploying different types of changes to a database system.

FIG. 60 is a flowchart of an example method 6000 for deploying different types of changes to a database system. It will be understood that method 6000 and related methods may be performed, for example, by any suitable system, environment, software, and hardware, or a combination of systems, environments, software, and hardware, as appropriate. For example, one or more of a client, a server, or other computing device can be used to execute method 6000 and related methods and obtain any data from the memory of a client, the server, or the other computing device. In some implementations, the method 6000 and related methods are executed by one or more components of the system 100 described above with respect to FIG. 1. For example, the method 6000 and related methods can be executed by the change management system 134 of FIG. 1.

At 6002, a table structure and a table sharing type are determined for each table in a current-version shared database container.

At 6004, a table structure and a table sharing type are determined for each table in a next-version shared database container.

At 6006, the table structures of the tables in the current-version shared database container are compared to the table structures of the tables in the next-version shared database container to identify table structure differences.

At 6008, the table sharing types of the tables in the current-version shared database container are compared to the table sharing types of the tables in the next-version shared database container to identify table sharing type differences.

At 6010, a current key pattern configuration associated with the current-version shared database container is compared to an updated key pattern configuration associated with the next-version shared database container to identify key pattern configuration differences.

At 6012, each table in at least one tenant database container is upgraded to a next version based on the table structure differences, the table sharing type differences, and the key pattern configuration differences.

Figure 61:
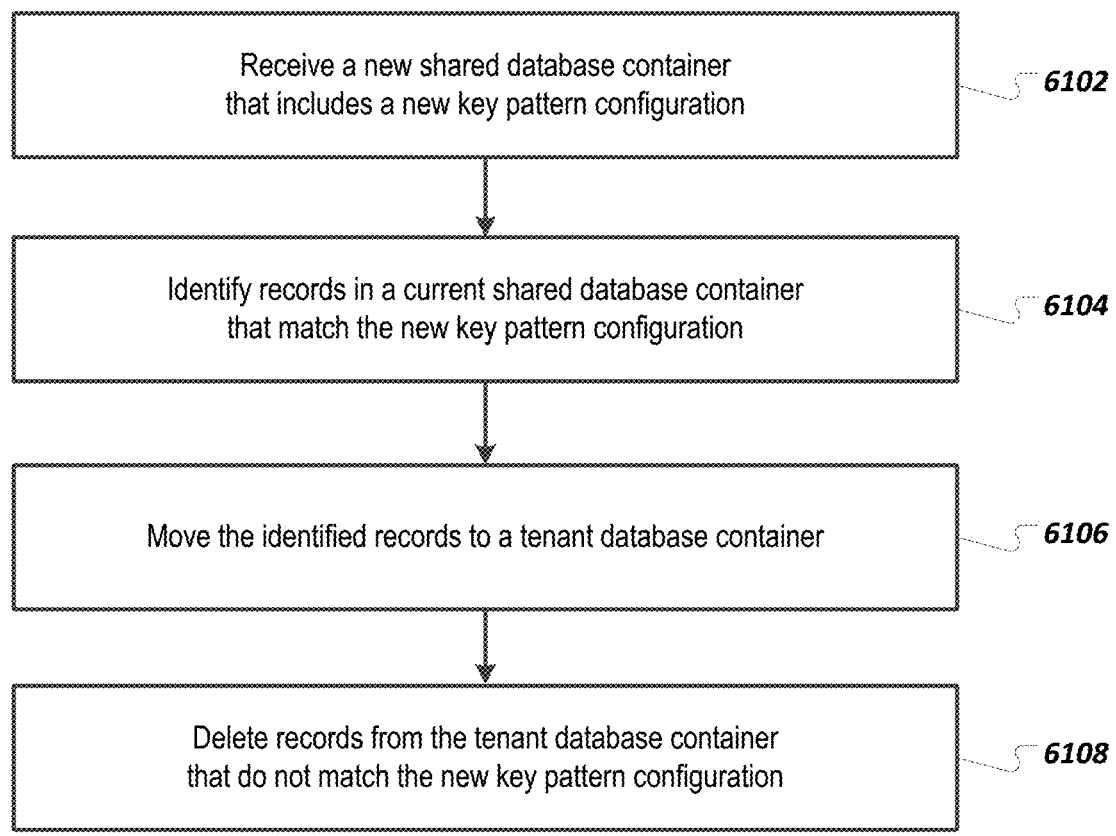
FIG. 61 is a flowchart of an example method for changing key pattern definitions.

FIG. 61 is a flowchart of an example method 6100 for changing key pattern definitions. It will be understood that method 6100 and related methods may be performed, for example, by any suitable system, environment, software, and hardware, or a combination of systems, environments, software, and hardware, as appropriate. For example, one or more of a client, a server, or other computing device can be used to execute method 6100 and related methods and obtain any data from the memory of a client, the server, or the other computing device. In some implementations, the method 6100 and related methods are executed by one or more components of the system 100 described above with respect to FIG. 1. For example, the method 6100 and related methods can be executed by the split definition change infrastructure of FIG. 1.

At 6102, a new shared database container that includes a new key pattern configuration is received. The new shared database container is a new version of a current shared database container for storing data accessible to multiple tenants. The new key pattern configuration is a new version of a current key pattern configuration for a logical split table. The logical split table includes a read-only-portion table in the current shared database container and a writable portion in a tenant database container. They current key pattern configuration describes keys of records included in the writable-portion. The new shared database container includes an updated read-only-portion for the logical split table that includes records that match a complement of the new key pattern configuration.

At 6104, records that match the new key pattern configuration are identified in the read-only-portion of the logical split table in the current shared database container.

At 6106, the identified records are moved, from the read-only-portion of the logical split table in the current shared database container to the writable-portion of the logical split table included in the tenant database container.

At 6108, records that do not match the new key pattern configuration are deleted from the writable-portion of the logical split table in the tenant database container.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   one or more computers;
   a non-transitory computer-readable medium coupled to the one or more computers, the computer readable medium having instructions stored thereon which, when executed by the one or more computers, cause the one or more computers to perform operations:
   wherein the computer-readable medium comprises a database system, wherein the database system comprises:
      at least one tenant database container, wherein each tenant database container is accessible by a single tenant; and
      a shared database container accessible by multiple tenants; and
   wherein the tenant database container includes, before a conversion of the database system from a standard system setup to a shared system setup:
      a read-only table for storing read-only data that is read but not written by at least one application;
      a first writable table for storing writable data that is read and written by the at least one application; and
      a mixed table for storing read-only mixed data that is read but not written by the at least one application and writable mixed data that is read and written by the at least one application; and
   wherein the shared database container includes, after the conversion of the database system from the standard system setup to the shared system setup:
      a first shared table for storing the read-only data; and
      a second shared table for storing the read-only mixed data; and
   wherein the tenant database container includes, after the conversion of the database system from the standard system setup to the shared system setup:
      the first writable table;
      a read-only view to provide access to the first shared table;
      a second writable table for storing the writable mixed data; and
      a union view to provide unified access to the second shared table and the second writable table; and
   wherein the operations comprise converting the database system from the standard system setup to the shared system setup, wherein converting the database system comprises:
      creating the shared database container;
      creating the first shared table in the shared database container;
      copying data from the read-only table to the first shared table;
      dropping the read-only table from the tenant database container;
      creating the read-only view in the tenant database container;
      creating the second shared table in the shared database container;
      copying the read-only mixed data from the mixed table to the second shared table;
      deleting the read-only mixed data from the mixed table;
      renaming the mixed table to be the second writable table; and
      creating the union view in the tenant database container.

2. The system of claim 1, wherein the converting the database system from the shared system setup to the standard system setup.

3. The system of claim 1, wherein converting the database system from the shared system setup to the standard system setup comprises:
   dropping the read-only view from the tenant database container;
   creating the read-only table in the tenant database container;
   copying data from the first shared table in the shared database container to the read-only table;
   copying data from the second shared table to the second writable table;
   dropping the union view from the tenant database container; and
   renaming the second writable table to be the mixed table.

4. The system of claim 1, wherein the operations comprise converting the database system from the standard system setup to a simulated system setup.

5. The system of claim 4, wherein, in the simulated system setup, the tenant database container includes, after conversion, the first shared table, the second shared table, the read-only view, the second writable table, and the union view.

6. The system of claim 5, wherein converting the database system from the standard system setup to the simulated system setup comprises:
renaming the read-only table to be the first shared table;
creating the read-only view to provide read-only access to the first shared table;
renaming the mixed table to be the second read-only table;
creating the second writable table;
moving records now eligible to be written by the at least one application from the second read-only table to the second writable table; and
creating the union view on the second shared table and the second writable table.

7. The system of claim 4, wherein the operations comprise converting the database system from the simulated system setup to the shared system setup.

8. The system of claim 7, wherein converting the database system from the simulated system setup to the shared system setup comprises:
moving the first shared table to the shared database container;
recreating the read-only view to the first shared table;
moving the second shared table to the shared database container;
recreating the union view on the second shared table and the second writable table.

9. A method for converting a database system from a standard system setup to a shared system setup, the method comprising:
identifying a tenant database container in the database system that is accessible by a single tenant, wherein the tenant database container includes:
a read-only table for storing read-only data that is read but not written by at least one application;
a first writable table for storing writable data that is read and written by the at least one application; and
a mixed table for storing read-only mixed data that is read but not written by the at least one application and writable mixed data that is read and written by the at least one application;
creating a shared database container in the database system that is accessible by multiple tenants;
creating a first shared table in the shared database container;
copying data from the read-only table to the first shared table;
dropping the read-only table from the tenant database container;
creating a read-only view in the tenant database container;
creating a second shared table in the shared database container;
copying the read-only mixed data from the mixed table to the second shared table;
deleting the read-only mixed data from the mixed table;
renaming the mixed table to be the second writable table; and
creating a union view in the tenant database container that provides unified access to the second shared table and the second writable table.

10. The method of claim 9, further comprising converting the database system from the shared system setup to the standard system setup.

11. The method of claim 10, wherein converting the database system from the shared system setup to the standard system setup comprises:
dropping the read-only view from the tenant database container;
creating the read-only table in the tenant database container;
copying data from the first shared table in the shared database container to the read-only table;
copying data from the second shared table to the second writable table;
dropping the union view from the tenant database container; and
renaming the second writable table to be the mixed table.

12. The method of claim 9, further comprising converting the database system from the standard system setup to a simulated system setup.

13. The method of claim 12, wherein, in the simulated system setup, the tenant database container includes, after conversion from the standard system setup to the simulated system setup, the first shared table, the second shared table, the read-only view, the second writable table, and the union view.

14. The method of claim 13, wherein converting the database system from the standard system setup to the simulated system setup comprises:
renaming the read-only table to be the first shared table;
creating the read-only view to provide read-only access to the first shared table;
renaming the mixed table to be the second read-only table;
creating the second writable table;
moving records now eligible to be written by the at least one application from the second read-only table to the second writable table; and
creating the union view on the second shared table and the second writable table.

15. The method of claim 12, further comprising converting the database system from the simulated system setup to the shared system setup.

16. The method of claim 15, wherein converting the database system from the simulated system setup to the shared system setup comprises:
moving the first shared table to the shared database container;
recreating the read-only view to the first shared table;
moving the second shared table to the shared database container;
recreating the union view on the second shared table and the second writable table.

17. The computer-readable media of claim 9, wherein the operations further comprise converting the database system from the standard system setup to a simulated system setup and wherein converting the database system from the standard system setup to the simulated system setup comprises:
renaming the read-only table to be the first shared table;
creating the read-only view to provide read-only access to the first shared table;
renaming the mixed table to be the second read-only table;
creating the second writable table;

moving records now eligible to be written by the at least one application from the second read-only table to the second writable table; and creating the union view on the second shared table and the second writable table.

18. One or more non-transitory computer-readable media storing instructions which, when executed by at least one processor, cause the at least one processor to perform operations comprising:

identifying a tenant database container in the database system that is accessible by single tenant, wherein the tenant database container includes:
- a read-only table for storing read-only data that is read but not written by at least one application;
- a first writable table for storing writable data that is read and written by the at least one application; and
- a mixed table for storing read-only mixed data that is read but not written by the at least one application and writable mixed data that is read and written by the at least one application;

creating a shared database container in the database system that is accessible by multiple tenants;

creating a first shared table in the shared database container;

copying data from the read-only table to the first shared table;

dropping the read-only table from the tenant database container;

creating a read-only view in the tenant database container;

creating a second shared table in the shared database container;

copying the read-only mixed data from the mixed table to the second shared table;

deleting the read-only mixed data from the mixed table;

renaming the mixed table to be the second writable table; and creating a union view in the tenant database container that provides unified access to the second shared table and the second writable table.

19. The computer-readable media of claim 18, wherein the operations further comprise converting the database system from the shared system setup to the standard system setup.

20. The computer-readable media of claim 19, wherein converting the database system from the shared system setup to the standard system setup comprises:

dropping the read-only view from the tenant database container;

creating the read-only table in the tenant database container;

copying data from the first shared table in the shared database container to the read-only table;

copying data from the second shared table to the second writable table;

dropping the union view from the tenant database container; and renaming the second writable table to be the mixed table.

\* \* \* \* \*